(12) United States Patent
Nakano et al.

(10) Patent No.: US 8,074,290 B2
(45) Date of Patent: Dec. 6, 2011

(54) SYSTEM, APPARATUS, METHOD AND COMPUTER PROGRAM FOR TRANSFERRING CONTENT

(75) Inventors: Takehiko Nakano, Kanagawa (JP); Hisato Shima, Tokyo (JP)

(73) Assignee: Sony Corporation, Tokyo (JP)

( * ) Notice: Subject to any disclaimer, the term of this patent is extended or adjusted under 35 U.S.C. 154(b) by 1239 days.

(21) Appl. No.: 11/646,465

(22) Filed: Dec. 28, 2006

(65) Prior Publication Data
US 2007/0162753 A1 Jul. 12, 2007

(30) Foreign Application Priority Data

Jan. 11, 2006 (JP) ............... P2006-004129
Mar. 6, 2006 (JP) ............... P2006-060268
Oct. 2, 2006 (JP) ............... P2006-271240

(51) Int. Cl.
*G06F 7/04* (2006.01)
(52) U.S. Cl. ............... 726/33; 726/32; 726/31
(58) Field of Classification Search ............... None
See application file for complete search history.

(56) References Cited

U.S. PATENT DOCUMENTS

| | | | | |
|---|---|---|---|---|
| 5,784,463 | A * | 7/1998 | Chen et al. ............... | 713/171 |
| 6,236,971 | B1 | 5/2001 | Stefik et al. | |
| 6,372,974 | B1 | 4/2002 | Gross et al. | |
| 6,424,718 | B1 * | 7/2002 | Holloway ............... | 380/277 |
| 7,062,045 | B2 * | 6/2006 | Riddick et al. ............... | 380/44 |
| 7,134,145 | B1 | 11/2006 | Epstein | |
| 7,337,332 | B2 * | 2/2008 | Tsuria et al. ............... | 713/193 |
| 7,865,739 | B2 * | 1/2011 | Lutnaes ............... | 713/193 |
| 2001/0000360 | A1 * | 4/2001 | Shibata ............... | 713/202 |
| 2002/0114462 | A1 * | 8/2002 | Kudo et al. ............... | 380/203 |
| 2003/0172131 | A1 * | 9/2003 | Ao ............... | 709/219 |
| 2004/0019640 | A1 * | 1/2004 | Bartram et al. ............... | 709/205 |
| 2004/0107343 | A1 * | 6/2004 | Kokubo ............... | 713/168 |
| 2004/0158634 | A1 * | 8/2004 | Saito et al. ............... | 709/225 |

(Continued)

FOREIGN PATENT DOCUMENTS

EP 0 715 247 A1 6/1996

(Continued)

OTHER PUBLICATIONS

Schneier "Applied Cryptography" 1996, Wiley and Sons, Second Edition pp. 176-177 and 513-514.*

(Continued)

*Primary Examiner* — Edan Orgad
*Assistant Examiner* — Brian Olion
(74) *Attorney, Agent, or Firm* — Finnegan, Henderson, Farabow, Garrett & Dunner, L.L.P.

(57) ABSTRACT

A content transfer system for transferring content between a source device transmitting the content and a sink device receiving the content, includes a content specifying unit for specifying the content to be transferred between the source device and the sink device, an authentication unit for performing an authentication exchange key process between the source device and the sink device, a content transfer unit for performing a content transfer process by encrypting and transferring the content specified by the content specifying unit from the source device to the sink device using the key exchanged by the authentication unit, and a content transfer finalizing unit for performing a content transfer finalizing process by validating the content at the sink device and invalidating the original content at the source device in response to the end of the content transfer process performed by the content transfer unit, the content thus being moved from the source device to the sink device.

72 Claims, 32 Drawing Sheets

U.S. PATENT DOCUMENTS

| | | | |
|---|---|---|---|
| 2005/0050181 A1* | 3/2005 | Morioka | 709/221 |
| 2005/0204110 A1 | 9/2005 | Mihara et al. | |
| 2005/0220444 A1 | 10/2005 | Ohkita et al. | |
| 2005/0257056 A1 | 11/2005 | Morita et al. | |

FOREIGN PATENT DOCUMENTS

| | | |
|---|---|---|
| EP | 1 202 497 | 5/2002 |
| JP | 08-263438 | 10/1996 |
| JP | 11-252093 | 9/1999 |
| JP | 2001-160262 | 6/2001 |
| JP | 2002-245718 | 8/2002 |
| JP | 2003-101529 | 4/2003 |
| JP | 2003-110546 | 4/2003 |
| JP | 2004-056776 | 2/2004 |
| JP | 2005-158056 | 6/2005 |
| JP | 2005-250567 | 9/2005 |
| JP | 2005-293731 | 10/2005 |
| JP | 2006-004129 | 1/2006 |
| WO | WO 00/67256 | 11/2000 |
| WO | WO 03-005208 | 1/2003 |
| WO | WO 2005/039100 | 4/2005 |
| WO | WO 2005-122577 | 12/2005 |

OTHER PUBLICATIONS

Schneier, "Applied Cryptography", 1996, pp. 184-185.*

"Mapping DTCP to IP" DTCP vol. 1, Supplement E (Informational version) pp. 1, 31, Revision 1.1, (2005).

"Content Directory: 1 Service Template Version 1.01" for UPnP™ Version 1.0 Status: Standardized DCP, pp. 1-13, (2002).

"Digital Transmission Content Protection Specification vol. 1 (Informational Version)"; Digital Transmission Content Protection Specification, vol. 1, Jul. 25, 2000, pp. 1-81.

OMA Digital Rights Management: "OMA Digital Rights Management, DRM Specification Version 2.0" DRM Specification, Jul. 16, 2004.

Extended European Search Report for European Patent Application No. 07000272.0, issued by the European Patent Office on May 10, 2011, 14 pages.

Sakamoto, et al., "A Digital HDTV Receiver with Home Networking Function and Digital Content Storage," IEEE Transactions on Consumer Electronics, vol. 51, No. 3, Aug. 2005, pp. 831-835.

Ritchie, et al., "UPnP AV Architecture: 0.83," Microsoft Corporation, Jun. 12, 2002, 22 pages.

Abstract of Technical Report and Abstract of Revision, ARIB TR-B14: Terrestrial Digital Television Broadcasting Operation Rules Jan. 24, 2002.

Abstract of Technical Report and Abstract of Revision, ARIB TRB15: Wideband CS Digital Broadcasting Operation Rules, Oct. 26, 1999.

Digital Transmission Content Protection Specification vol. 1 (Informational Version) Revision 1.4 pp. 1, 11012, 35-39, Feb. 28, 2005.

Digital Transmission Protection License Agreement, Adopter Agreement—May 2005, pp. 1, (B-1)-(B-7), (B-12)-(B-13).

DTCP vol. 1, Supplement E (V1SE) Mapping DTCP to IP (Informational Version) Revision 1.1 pp. 1, 8-16, Feb. 28, 2005.

* cited by examiner

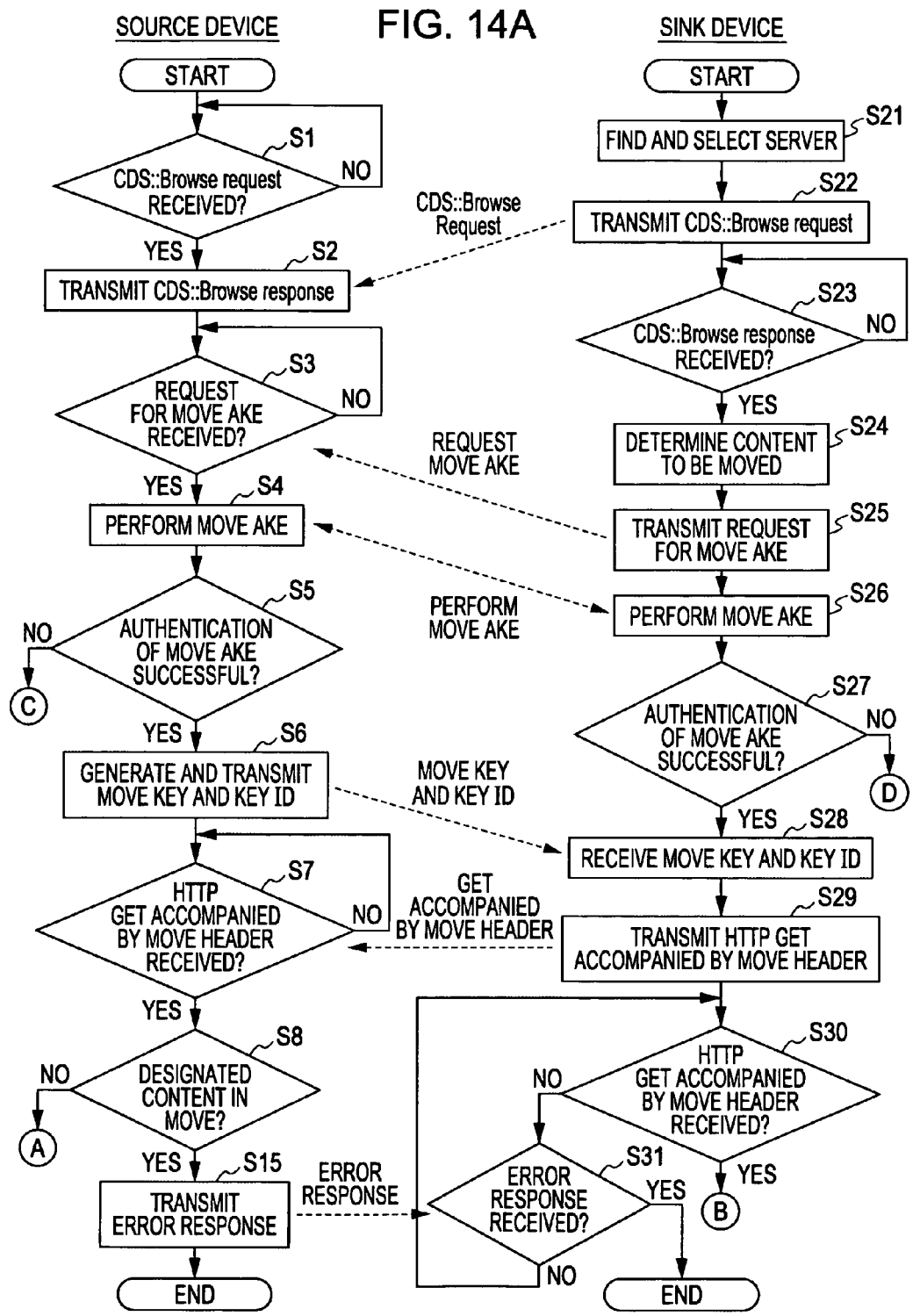

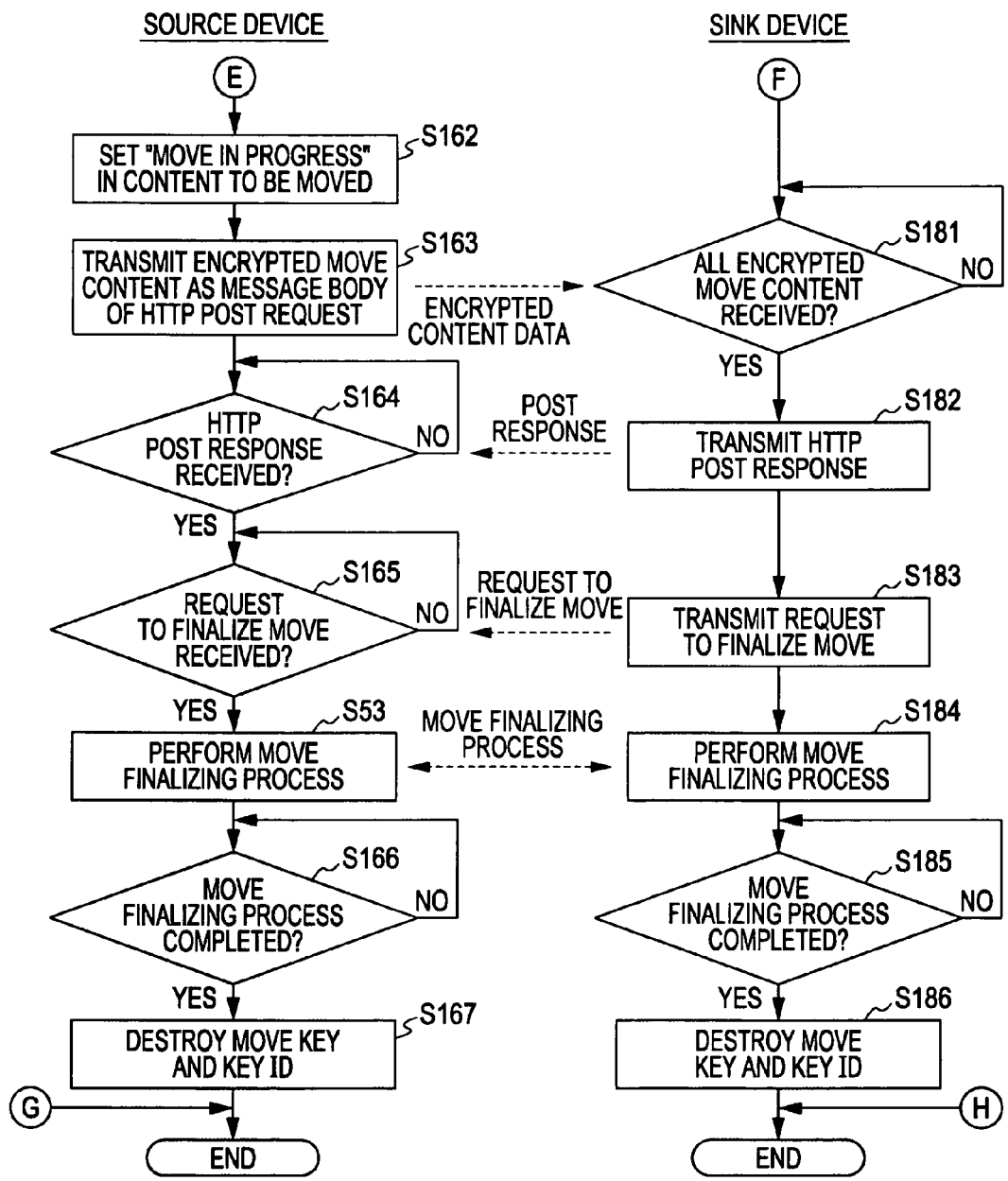

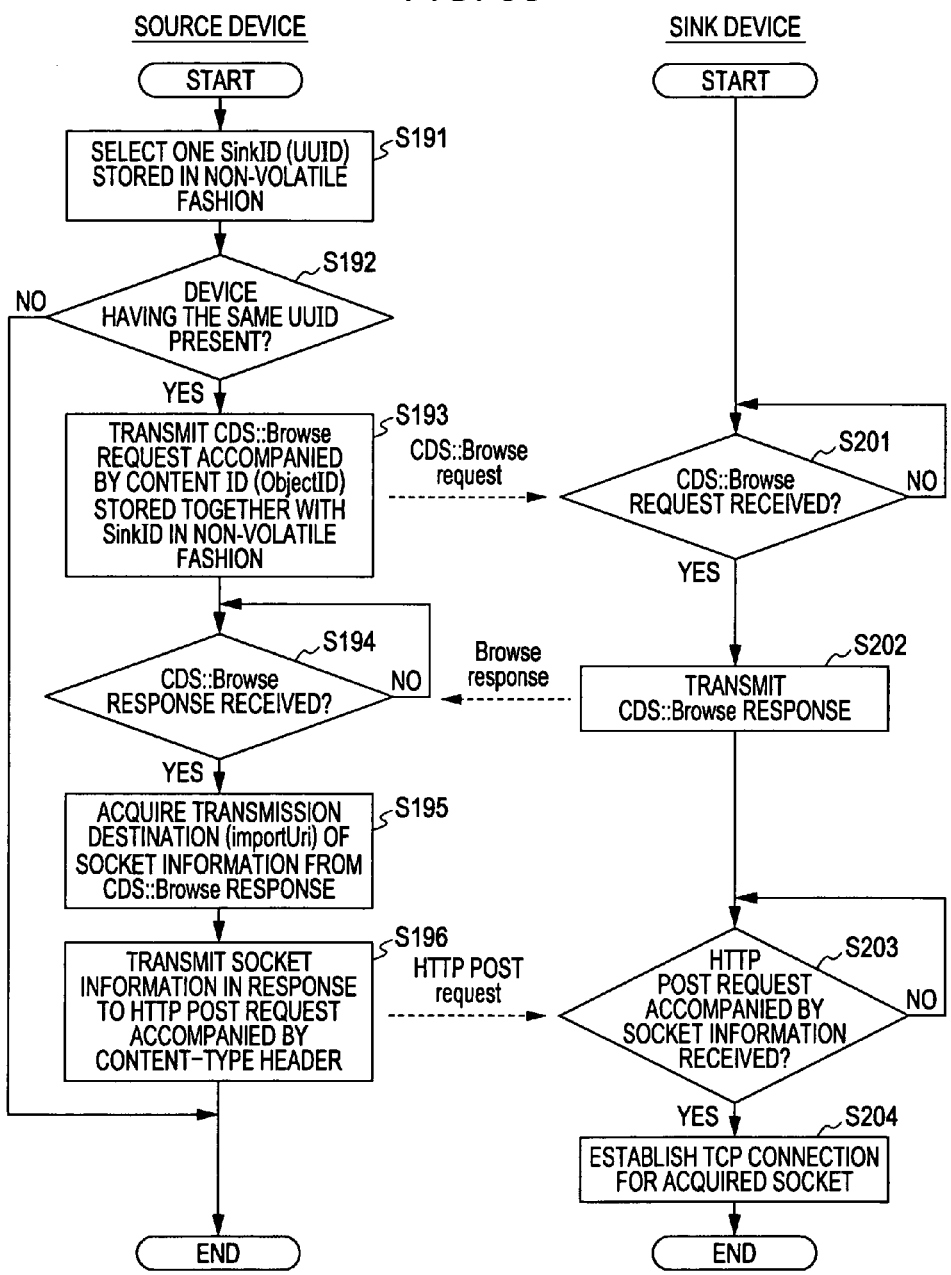

SYSTEM, APPARATUS, METHOD AND COMPUTER PROGRAM FOR TRANSFERRING CONTENT

CROSS REFERENCES TO RELATED APPLICATIONS

The present invention contains subject matter related to Japanese Patent Application JP 2006-004129 filed in the Japanese Patent Office on Jan. 1, 2006, JP 2006-060268 filed in the Japanese Patent Office on Mar. 6, 2006, and JP 2006-271240 filed in the Japanese Patent Office on Oct. 2, 2006, the entire contents of which are incorporated herein by reference.

BACKGROUND OF THE INVENTION

1. Field of the Invention

The present invention relates to a system, device, method, and computer program for transferring content such as digital audio-visual data between devices and, in particular, to a system, device, method, and computer program for encrypting and transferring the content between the devices in a copy controlled manner for copyright protection and any other purposes.

The present invention relates particularly to a system, device, method, and computer program for performing content transfer procedure of a encrypted content between information devices meeting the digital transmission content protection (DTCP) specification and, more particularly to a system, device, method, and computer program for moving content from a source device to a sink device using DTCP move function.

2. Description of the Related Art

With information technology in widespread use, most of audio-visual (AV) contents become digital, and recording media such compact disks (CDs) and digital versatile disks (DVDs) for recording and reproducing digital contents are widely used. Recently, various devices for digitally recording contents, such as a hard disk drive (HDD) recorder and an HDD mounted DVD recorder are commercially available for home use. Distribution and delivery service of contents such as video and music via networks become active. Content delivery is performed between remote places via a network without actually transferring media such as CD and DVD.

Digital content data is subject to unauthorized manipulation, for example, can be relatively easily copied or tampered. Protection of the content from unauthorized use is necessary while permitting the content to be used personally or at home. In the Japanese domestic market, analog broadcast TV receivers are currently rapidly replaced with digital broadcast TV receivers in view of the decommissioning of the terrestrial analog TV broadcasting service expected in 2011. It is thus vitally important to technically protect digital AV contents in home applications.

In Japan, digital broadcast technical standards have been formulated chiefly by the Association of Radio Industries and Businesses (ARIB) in Japan. The ARIB has adopted MPEG 2 system (ISO/IEC 13818-1 Generic Coding of Moving Pictures and Associated Audio: Systems Recommendation H. 222.0) for digital satellite broadcast, digital terrestrial broadcast, and digital cable-television broadcast service. The ARIB has required that a "one-generation copy control function" (such as copy once) be introduced to protect contents and has formulated strict copyright protection clauses in standards (Operational Guide-lines for Terrestrial Digital Broadcasting System ARIB TR-B14, and Operation Guide-lines for BS (Broadcasting Satellite)/Broadband CS (Communications Satellite) Digital Broadcasting System ARIB TR-B15).

Available as world standards for protection of digital content is the digital transmission content protection (DTCP) specification standardized by the digital transmission licensing administrator (DTLA), for example. That specification formulates a mechanism that allows content to be transmitted in a manner such that the copyright of the content is protected with copying controlled (DTCP Specification Volume 1 (Informational Version) Revision 1.4 (http://www.dtcp.com/).

The DTCP specification defines an authentication protocol for content transmission between devices, and a transmission protocol of encrypted content. The DTCP specification satisfied devices prevents a compressed content easy to handle, such as a moving picture experts group (MPEG) content, from being output in an decrypted state thereof, performs key exchange required to decrypt the encrypted content in accordance with an authentication and key exchange (AKE) algorithm, and limits a range of devices performing key exchange in accordance with an AKE command.

A server (source device) as a content supplier and a client (sink device) as a content receiver shares a key through an authentication procedure in response to the transmission and reception of an AKE command, and encrypts a transmission path using that key, and transmits the content. An unauthorized client cannot acquire a encrypt key and thus cannot enjoy the content without successfully being authenticated by the server.

The DTCP defines the transmission of digital contents over a home network using an IEEE 1394 transmission path. Recently, a movement to distribute digital AV contents via an IP network in home applications, such as digital living network alliance (DLNA), shifts into high gear. DTCP-IP technology coping with the IP network (DTCP mapping to IP) is actively developed.

The DTCP-IP is a standard in which the DTCP is applied to the IP network. The DTCP-IP is different from the original DTCP defined based on IEEE 1394 standards in that the IP network is used in the transmission path, and that content transmission protocols used over the IP network, such as the hyper text transfer protocol (HTTP) or the real-time transfer protocol (RTP), are used to transmit encrypted contents. For example, when content is transmitted in accordance with the HTTP algorithm, a source device becomes an HTTP server and a sink device becomes an HTTP client. A TCP/IP connection is produced for HTTP, and an encrypted content is downloaded (for uploading, the source device becomes an HTTP client and the sink device becomes an HTTP server).

When a home network is connected to an external IP network such as the Internet via a router, data can be eavesdropped, tampered, or illegally copied. The data can be easily used in an unauthorized manner by setting up an unauthorized proxy composed of a personal computer over a transmission path between the source device and the sink device. For this reason, a further method is provided in the DTCP-IP technology to transmit contents over the network while protecting the contents, for example, the range of use of contents may be limited to a given individual or a given home by setting a limit on the time to live (TTL) of AKE commands, namely, the number of hops of an IP router (DTCP Volume 1 Supplement E (VLSE) Mappings DTCP to IP (Informational Version) Revision 1.1 (http://www.dtcp.com/).

To transmit contents in a copyright protected manner, content attributes related to content protection need to be specified. The DTCP-IP provides two mechanisms to allow copy control information incidental to the content to be transmitted, namely, extended encryption mode indicator (E-EMI)

described in a header portion of a packet for content transmission (PCP) and embedded copy control information (CCI).

The embedded CCI is copy control information transmitted as part of content stream to be encrypted (i.e., embedded in a payload of the packet). If the content stream is tampered, erroneous decryption results. The integrity of the embedded CCI is thus assured. On the other hand, E-EMI is described in a header portion of a plain text and provides copy control information related to the content stream. E-EMI permits easy access while maintaining security. E-EMI is composed of a 4-bit field describing encrypt mode, and the value of E-EMI shows seven types of copy control information. The definitions of bit values are listed in the following Table 1. Unused nine E-EMI values are reserved for future use.

TABLE 1

| E-EMI values | Encrypt mode | Copy Control Information |
| --- | --- | --- |
| 1100 | A0 | Copy never (CN) |
| 1010 | B1 | Copy-one-generation (COG) (recordable on cognizant device) |
| 1000 | B0 | Copy-one-generation (COG) (recordable on non-cognizant device) |
| 0110 | C1 | Move mode (audio visual) |
| 0100 | C0 | No-more-copies (NMC) |
| 0010 | D0 | Copy-free with EPN asserted (CF/EPN) |
| 0000 | N.A. | Copy-free (CF) |

A device operating as a source device selects a correct encrypt mode in accordance with characteristics of a content stream, and sets up E-EMI based on the encrypt mode. A device operating as a sink device selects the correct encrypt mode specified by E-EMI in the header of the packet of the transmitted content. Furthermore, the device as the sink device encrypts the received content as specified by one of E-EMI and embedded CCI and temporarily stores the encrypted content. When the device as the sink device operates as a source device, the device controls secondary content transfer operation in accordance with the copy control information. The types of copy control are listed below:

Copy free: the copyright is reserved but copy control using DTCP is not performed;

Copy never: Any contents are never copied;

Copy one generation: Copying is performed once (for one generation); and

No more copies: Copying is permitted no longer.

The no more copies state results when a content set in the copy one generation is copied (in a first generation). The DTCP-IP provides a move function as means for transferring a encrypted content with no more copies state set therein (DTCP Specification Volume 1 Supplement E(VISE) Mapping DTCP to IP (Informational Version) Revision 1.1 (http://www.dtcp.com/), and Digital Transmission Protection License Agreement, Adopter Agreement—May 2005). The move function in network communication means movement of data between devices, and generally no original data is left at the source device. With the move function in DTCP-IP, a sink device handles a received content by encrypting the received content with no more copies state set therewithin, and a source device has transmitted the content to the sink device on condition that the original content is deleted or the use of the original content is inhibited subsequent to transmission thereof. For example, if content of copy one generation is encrypted and recorded as a no more copies content in a source device as a personal video recorder (PVR), the move function allows the content to be encrypted in the copy one generation and then transmitted to a single sink device with the above condition satisfied.

In accordance with the current standards, the move transmission may be permitted using one of the C1 mode and the B1 mode in E-EMI. The sink device decrypts the content in accordance with the AKE algorithm using one of these modes, and records the decrypted content. The source device needs to invalidate the data at the moment of the transmission.

The number of entities of contents that are moved using the move function remains unchanged as the number of physical objects that are physically moved. In other words, it must be guaranteed that an identical content is not present in both the source device and the sink device at the same time (or that an identical content is not usable in both the source device and the sink device at the same time). When content is transmitted from the source device to the sink device in accordance with a plurality of message transfer procedures, the requirement that the source device delete the content or inhibit the use of the content must be consistently satisfied throughout all the message transfer procedures. In the transmission of the content, an "incremental move" needs to be performed in which the source device needs to successively make the data subsequent to transmission thereof unusable while the sink device needs to make successively the received data usable.

For example, Japanese Unexamined Patent Application Publication No. 2003-101529 discloses a content management device. The device divides content into a plurality of segments, encrypts the segments with different title keys, extracts a time varying key for use in decrypting the content, and successively overwrites the original title key in a title key area with the extracted time varying key, thereby making the decrypting of the content impossible. The original content with the copy thereof moved is safely and efficiently deleted.

When the incremental move sequence is interrupted between the source device and the sink device due to a failure during content transmission, the content can be fragmented at each of the source device and the sink device. The right of the content is safely assigned between the source device and the sink device if the transmission of the entire content is successfully completed. If any failure takes place in the middle of the transmission process, a portion of data already transmitted is present at the sink device with a portion of untransmitted data remaining at the source device. The content is thus fragmented. The failures that could happen in the incremental move transfer process include a connection error, a power failure in one device, a removal of a medium having the content stored thereon (a failure in a storage), a storage storing the content at the sink device becoming full, etc. The content fragmentation is not a rare happening.

If the movement of one content is performed through a plurality of message transfer procedures, a portion of data is incrementally deleted each time the source device has transmitted that portion to the sink device. In the event of an interruption of content transmission, neither the source device nor the sink device can restore the content. There may be no need for the user to worry about the content missing if the content is deleted or the use of the content is inhibited collectively after the end of the content transmission from the source device to the sink device. However, this arrangement fails to satisfy the requirement of DTCP-IP that the condition of the move function be consistently followed, and can expose the content to copyright violation.

Japanese Unexamined Patent Application Publication No. 2005-158056 discloses a content transfer system. In the disclosed content transfer system, a content move controller is arranged between a source device and a sink device, both performing content transfer via a general-purpose bus. The DTCP specification requires that an amount of reproducible content present in duplication in both the source device and the sink device during the move transfer process should not exceed a reproduction time of 1 minute. Upon detecting a failure in one of the source device and the sink device, the content move controller interrupts the move transfer process within one minute, and resumes the move transfer process on a portion remaining in a reproducible state at the source device. The disclosed content transfer system thus avoids content missing. In this case, however, the use of the content move controller leads to an increase in device costs. Any DTCP-IP device may operate as each of the source device and the sink device over a wireless local-area network (LAN), and the move transfer process may be initiated in an adhoc manner between the source device and sink device. In such a case, the content move controller cannot be installed, or the content move controller, if installed, presents a bottle neck in the transfer sequence.

Japanese Unexamined Patent Application Publication No. 2005-293731 discloses a content recording system. In the disclosed content recording system, a source device deletes an original content corresponding to a content transmitted to a sink device with reference to content recording status information returned from the sink device that has completed the reception of the content. The content recording system thus prevents the content at the source device from missing when the sink device fails to record the content normally. However, this system provides no sufficient preventive step to the fragmentation of the content taking place between the source device and the sink device in response to an interruption of the content transfer.

Japanese Unexamined Patent Application Publication No. 2005-250567 discloses a content data handling device. The content data handling device encrypts copy data with the copy encrypt key thereof and stores the encrypted copy data when the copyright protected data is moved to another device. If the moved data becomes destroyed in the event of a failure in the data transfer, the content data handling device invalidates the moved data while restoring the original data from the copy data. The missing of the original data is thus prevented while the copyright is protected. The content data handling device deletes the original data after the data is recorded on the destination or in parallel with the recording of the moved data on the destination. However, the content handling device pays little attention to the fragmentation of the content between the source device and the sink device in response to an interruption of the content transfer.

SUMMARY OF THE INVENTION

It is thus desirable to provide a system, device, method, and computer program for appropriately performing transfer procedure of encrypted content between DTCP information devices.

It is also desirable to provide a system, device, method, and computer program for appropriately moving content from a source device to a sink device through a move function.

It is also desirable to provide a system, device, method, and computer program for reliably performing a content move transfer process in a manner such that neither content fragmentation nor content missing takes place even when a failure occurs in a transmission path during content transmission.

In accordance with one embodiment of the present invention, a content transfer system for transferring content between a source device transmitting the content and a sink device receiving the content, includes a content specifying unit for specifying the content to be transferred between the source device and the sink device, an authentication unit for performing an authentication exchange key process between the source device and the sink device, a content transfer unit for performing a content transfer process by encrypting and transferring the content specified by the content specifying unit from the source device to the sink device using a key exchanged by the authentication unit, and a content transfer finalizing unit for performing a content transfer finalizing process by validating the content at the sink device and invalidating the original content at the source device in response to the end of the content transfer process performed by the content transfer unit, the content thus being moved from the source device to the sink device.

The term "system" refers to a logical set of a plurality of devices (or functional modules performing particular functions), and does not necessarily mean that the devices or the functional modules are housed in a single casing.

The present invention relates to a content transfer system for transmitting content requiring copyright protection over an IP network. More specifically, the present invention relates to a content transfer system for transmitting encrypted contents in a secure manner using a key shared through an authentication and key exchange process among information terminals complying with the digital transmission content protection—Internet protocol (DTCP-IP) specification.

The DTCP-IP specification provides a mechanism for transferring content in a copyright protected manner. For example, content transfer is performed with copy controlled. Two content transfer methods are available: a copy method and a move method. Content at a source device is copied to a sink device in the copy method while content at the source device is moved to the sink device in the move method. The DTCP-IP specification provides the move function. In the move function, the sink device encrypts the received content as a no more copies content, and the source device transmits the encrypted content in a no more copy state on condition that the original content is deleted subsequent to the transfer of the copy thereof or the use of the original content is inhibited subsequent to the transfer of the copy thereof.

The move function enjoys a no-copy content even the content is transferred to another device. The number of entities of contents that are moved using the move function remains unchanged as the number of physical objects that are physically moved. There is no problem with copyright protection.

In a move sequence, the source device must consistently satisfy the requirement that the content be deleted or the use of the content be inhibited. To this end, "incremental move" is performed so that the source device incrementally disables data subsequent to transmission thereof while the sink device incrementally sets received data to be usable. If the move sequence is interrupted by a failure in a transmission path or any other reason, the content may be fragmented or missing between the source device and the sink device. A user may miss the otherwise properly received content.

In accordance with the content transfer system of one embodiment of the present invention, the sink device incrementally records the content on a recording medium during the move operation, but the recorded content is set to be inhibited in use until a finalizing process of the content transmission has been successfully completed. When a verification of the finalizing process of the content transmission, namely, commitment is performed, the recorded content-on the sink device is validated to be ready for use while the source device deletes the original content or inhibits the use of the original content. In this manner, the presence of the no more copies content both at the source device and the sink device in duplication is avoided. Even if the move transfer is interrupted due to a failure in a transmission path, the content is not fragmented, and the content transfer resumes.

The move transfer in the content transfer method is equivalent to the movement of the entire content at a time between the source device and the sink device. This content transfer method may be called a "block move," different from the incremental move that incrementally sets the original data unusable at the source device while setting incrementally the received data usable at the sink device. In the block move, the same content is not present in duplication at the source device and the sink device in a transfer sequence. The block move is a content move transfer process satisfying the requirement defined in the DTCP.

The sink device cannot reproduce the recorded content until the finalizing process of the move has been successfully completed. But the received content may be reproduced (rendered) in parallel with the recording operation of the received content in the invalidated state thereof. If the block move satisfies the requirement of the DTCP, the decrypting and outputting of the content in parallel with the block move are equivalent to content streaming. More specifically, since the decrypted content is destroyed as it is output, no copying operation is performed. The DTCP specification requiring that no content reproducible on the source device and the sink device be present in duplication is satisfied.

Once the received content is decrypted at the sink device, the content is encrypted in no more copies status and then stored on a hard disk or any other recording medium. At the same time, the decrypted content is converted into a video signal and audio signal (in a rendering step) which are then output in video and sound from an audio-visual output unit such as a display. A user recognizes the content during the move transmission while enjoying the content on a real-time basis.

While the move transfer process is in progress, the source device locks the content currently being moved out of a move request from any other sink device. If the same content is moved to a plurality of sink devices in multiplication, the number of entities of content increases. In other words, copying is practically permitted, leading to a violation of copy control information of no more copies.

The incremental move is practiced through a move transfer defined in the DTCP-IP specification. The block move is not included in the DTCP specification disclosed in Japanese Patent Application No. 2006-4129 (filed Jan. 11, 2006) assigned to the same assignee of this patent application. When the block move is performed, an authenticator preferably determines whether each device supports the block move or preferably prevents spoofing of a move transfer when an authentication process is performed between the source device and the sink device. If one of the two devices fails to supports the block move, the content may be moved with mode switched to the known incremental move.

The content transfer system of one embodiment of the present invention can specify content to be moved using a content directory service (CDS) defined in the universal plug and play (UpnP®) standard. The specifying of the content is followed by an authentication process, a content transfer process, and a content transfer finalizing process to be performed between the source device and the sink device in accordance with the DTCP-IP specification.

For example, a user operates the sink device, thereby moving content by downloading the content from a source device operating as a server providing the content.

The sink device may acquire socket information for authentication and key exchange of the content to be moved based on information contained in a CDS::Browse response supplied from the source device in response to a CDS::browse request and determine whether the content is movable from the source device.

The sink device may acquire the encrypted content using a hyper text transfer protocol (HTTP) get method with a header containing header information indicating movement of the content.

The user may operate the source device, thereby moving content by uploading the content to the sink device operating as a server providing the content.

In this case, the source device may request the sink device to produce a destination location of the content using a CDS::CreateObject request.

Since an authentication process starts from the sink device, the source device needs to notify the sink device of the socket information to allow the sink device to establish a TCP connection for authentication and key exchange. For example, the source device may notify the sink device of the socket information for authentication and key exchange by including an attribute associated with the socket information into the CDS::CreateObject request. Alternatively, the source device may notify the sink device of the socket information for authentication and key exchange using header information contained in an HTTP method (containing no content).

The source device may transmit the encrypted using a HTTP post method with a header containing header information indicating content movement.

Key dedicated to content movement is exchanged between the source device and the sink device in accordance with an authentication and key exchange (AKE) procedure on a per content basis. When the source device receives from the sink device a get request requiring a plurality of transfers of a plurality of move contents, the source device rejects the request, and immediately invalidates the content transmitted through the move transfer process at the moment of the end of the move transfer process. The same content is thus prevented from being moved by a plurality of times (i.e., no copying operation is thus permitted in practice).

While the content is being moved to the sink device, the source device rejects another sink device's request to move the content. In this way, the same content is prevented from being moved (namely copied) to a plurality of sink devices.

The exchange key dedicated to content movement may be destroyed in each of the source device and the sink device in response to the end of the content movement and then the end of the content transfer finalizing process. In other words, the TCP connection made through the AKE procedure remains established until the end of the content transfer finalizing process.

The content transfer process may be canceled using the TCP connection established through the AKE procedure before the end of the content transfer process. The content transfer canceling process may be initiated in response to a request from at least one of the source device and the sink device. When the content transfer process is canceled, the content transferred to the sink device is invalidated.

The content transfer process may be aborted in response to a request from at least one of the sink device and the source device when communication is interrupted between the sink device and the source device before the end of the content transfer process. The operation of each of the source device and the sink device is identical to the operation performed when the content transfer is canceled.

The content transfer finalizing process is performed to acknowledge a successful ending of the content transfer between the source device and the sink device, namely, to assure commitment. The content at the sink device is thus validated while the original content at the source device is invalidated. The content movement is thus finalized. In the content transfer finalizing process, a first command indicating the end of content reception is transmitted from the sink device. In response to the first command, the source device shifts the original content to an interim invalid state. Upon receiving a first response from the source device in response to the first command, the sink device validates the received content in response to the first response and destroys the key dedicated to content movement stored on the sink device. Upon receiving a second command from the sink device indicating the validation of the content, the source device responds to the second command, thereby invalidating the original content at the source device and destroys the key dedicated to the content movement at the source device.

The content transfer system may include a content transfer finalizing process resuming unit for resuming the content transfer finalizing process if the process of the content transfer finalizing unit is interrupted regardless of a successful ending of the content transfer performed by a content transfer unit from the source device to the sink device. The resuming unit prevents the content transfer process from becoming useless while protecting the content at both the source device and the sink device from becoming invalidated.

The content transfer finalizing process resuming unit resumes the content transfer finalizing process by shifting the original content at the source device to an interim invalid state and by returning the first response from the source device to the sink device in response to the first command if the source device still stores the exchange key dedicated to the content movement and the information transmitted in the first response when the source device receives the first command indicating the end of the content reception from the sink device.

The content transfer finalizing process resuming unit may invalidate the original content at the source device, destroys the key dedicated to content movement and the information transmitted in the first response, stored on the source device, and returns a second response from the source device to the sink device in response to the second command in order to resume the content transfer finalizing process if the source device still stores the exchange key dedicated to content movement and the information transmitted in the first response when the source device receives the second command indicating the end of the content reception from the sink device.

The content transfer finalizing process resuming unit establishes a connection to the source device if the sink device still stores the exchange key dedicated to the content movement and the information transmitted in the first command, transmits the first command to the source device if the corresponding content is in an invalid state at the sink device, and transmits the second command if the corresponding content is already validated at the sink device.

The source device needs to notify the sink device of the socket information to establish the TCP connection for authentication and key exchange. If the content transfer is performed in a download fashion, the sink device transmits a CDS::Browse request to the source device, and acquires the socket information based on information contained in a CDS::Browse response from the source device, thereby establishing a TCP connection with the source device. If the content transfer is performed in an upload fashion, the source device notifies the sink device using header information of an HTTP post method (containing no content), and the sink device establishes a TCP connection to resume the content transfer finalizing process based on the socket information.

In the DTCP-IP specification, communication data can be easily tampered by setting up an unauthorized proxy composed of a personal computer over a transmission path between the source device and the sink device. One system initiates a block move after an authenticator verifies a capability of move method between the source device and the sink device. In such a system, the source device can spoof the source device's own non-supporting feature with the block move to the sink device although the source device is actually supporting, and can enforce the incremental move with the sink device. The sink device incrementally validates data each time, and the proxy cancels the content transfer process to the source device when the content transfer process is completed. The same effective content is present in both the source device and the sink device in violation of the DTCP-IP specification.

The content transfer system of one embodiment of the present invention may include an anti-spoofing unit for preventing a capability acknowledged between the source device and the sink device from being spoofed or preventing any means from spoofing a move mode at the sink device.

The anti-spoofing unit changes the method of generating a content encrypting key from the key exchanged by the authenticator, from content transfer method to content transfer method, namely, from the incremental move to the block move. The sink device performing the incremental move by spoofing cannot share the content encrypting key with the source device performing the block move, and cannot validate the content. Any content cannot be present at both the source device and the sink device in duplication.

The anti-spoofing unit changes the method of scrambling the key exchanged by the authenticator, from content transfer method to content transfer method, namely, from the incremental move to the block move. The sink device performing the incremental move by spoofing cannot descramble the key exchanged by the authenticator, and acquire a correct content encrypting key. Any content cannot be present at both the source device and the sink device in duplication.

The anti-spoofing unit may include information, relating to a content transfer method, in a communication message protected by electronic signature from the sink device to the source device in a challenge-response procedure for authentication and key exchange. The sink device may perform the incremental move by spoofing. Even if the source device attempts to perform the block move through the verification of the capability, the challenge-response procedure detects a spoof. The source device can thus generally stop the move or switch to the incremental move to respond to the sink device.

In accordance with one embodiment of the present invention, a computer readable program for causing a computer system as a DTCP source device to transmit content, includes a content specifying step of specifying the content to be transferred to a sink device, an authentication step of performing an authentication and key exchange (AKE) process with the sink device in accordance with an AKE procedure, a content transfer step of performing a content transfer process by encrypting and transferring the content specified in the content specifying step to the sink device using the key exchanged in the authentication step, and a content transfer finalizing step of performing a content transfer finalizing process by invalidating the original content in response to the end of the content transfer process in the content transfer step, the content thus being moved to the sink device.

In accordance with one embodiment of the present invention, a computer readable program for causing a computer system as a DTCP sink device to receive content, includes a content specifying step of specifying with a source device the content to be transferred, an authentication step of performing an authentication and key exchange (AKE) process with the source device in accordance with an AKE procedure, a content transfer step of performing a content transfer process by encrypting and transferring the content specified in the content specifying step from the source device using the key exchanged in the authentication step, and a content transfer finalizing step of performing a content transfer finalizing process by validating the received content in response to the end of the content transfer process in the content transfer step, the content thus being moved from the source device.

In accordance with embodiments of the present invention, the computer program is described in a computer readable format so that a predetermined process is performed on a computer system. The computer program is installed on the computer system and functions as each of the source device and the sink device in the above-described content transfer system in cooperation with the computer system. The content transfer system, constituting a DTCP based network, operates in the same manner as described above.

Embodiments of the present invention provide a system, device, method, and computer program for appropriately performing transfer procedure of encrypted content between DTCP based information devices.

Embodiments of the present invention provide a system, device, method, and computer program for appropriately moving content from a source device to a sink device through a move function.

Embodiments of the present invention provide a system, device, method, and computer program for reliably performing a content move transfer process in a manner such that neither content fragmentation nor content missing takes place even when a failure occurs in a transmission path during content transmission.

The content transfer system of one embodiment of the present invention performs a block move that moves an entire content at a time between the source device and the sink device in accordance with the requirement defined in the DTCP specification.

The block move is performed by performing the content transfer finalizing process, i.e., by validating the content at the sink device in response to the content transfer finalizing process and by invalidating the original content at the source device. Even if the content transfer finalizing process is interrupted due to a power failure in one of the devices, the content transfer system of embodiments of the present invention resumes the content transfer finalizing process later, thereby normally finalizing the move transfer process.

In the block move, an unauthorized proxy could be placed between the source device and the sink device. The unauthorized proxy could spoof a capability of the sink device, or a move transfer with any means, thereby performing copy transfer or permitting the same content to present in duplication. The anti-spoofing unit in the content transfer system of embodiments of the present invention prevents the capability verified between the source device and the sink device from being spoofed, thereby preventing the move mode at the sink device from being spoofed.

These and other features, and advantages of the present invention will become obvious from the following detailed description of the embodiments of the present invention in conjunction with the accompanying drawings.

BRIEF DESCRIPTION OF THE DRAWINGS

FIG. 14A is a flowchart of a process performed by each of the source device and the sink device when the source device moves the content to the sink device in a download fashion;

FIG. 32B is a continuation of the flowchart of FIG. 32A; and

FIG. 33 is a flowchart of a process that establishes a TCP connection between the source device and the sink device when the move transfer finalizing process is resumed after an interruption in the upload fashion.

DESCRIPTION OF THE PREFERRED EMBODIMENTS

The present invention relates to a content transfer system for encrypting and transmitting, in accordance with predetermined copy control information, content requiring protection for copyright purposes or any other purposes. One of specific examples of such systems is a content transmission using a hyper text transmission protocol (HTTP) protocol performed between digital transmission content-Internet protocol (DTCP-IP) devices. The embodiments of the present invention are described below with reference to the drawings.

The DTCP-IP content transfer system includes a source device transmitting content and a sink device receiving the content and reproducing or recording the content. The content transmission methods include a download transfer in which the source device operating as a server transmits content to the sink device operating as a client in response to a request from the sink device and an upload transfer in which the source device operating as a client transmits content to the sink device operating as a server in response to a request from the sink device.

Figure 1:
FIG. 1 illustrates an information communication system in accordance with a first embodiment of the present invention.

FIG. 1 illustrates an information communication system in accordance with a first embodiment of the present invention. The source device and the sink device construct a DTCP-IP AKE system. The source device as an authentication server complying with the DTCP-IP specification and the sink device as an authentication client complying with the DTCP-IP specification are connected to each other via a network. The network herein includes Ethernet®, the Internet, and other IP network.

Figure 2:
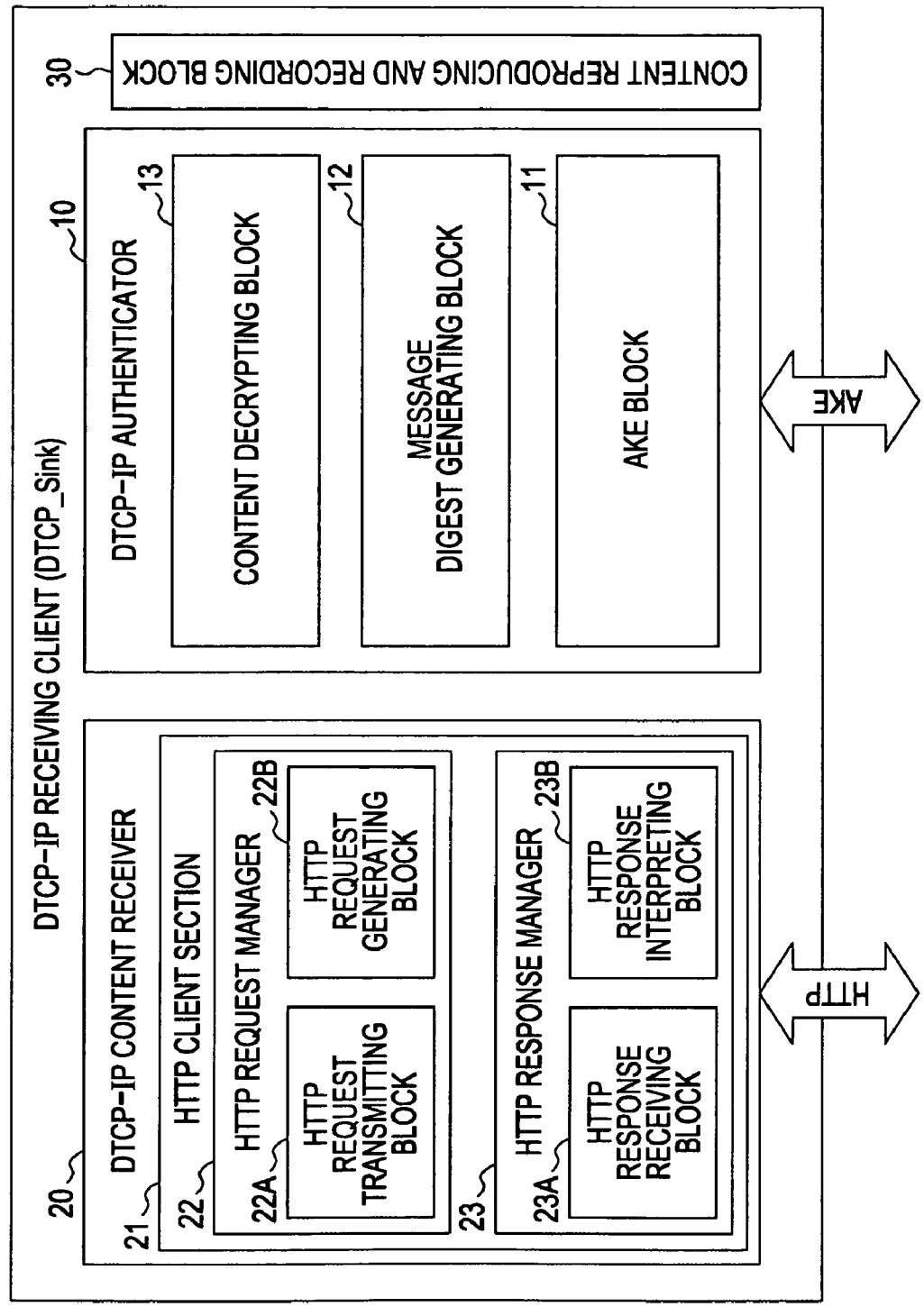
FIG. 2 illustrates a functional configuration of an information communication device functioning as a client (i.e., sink device) in the information communication system of FIG. 1.
Figure 3:
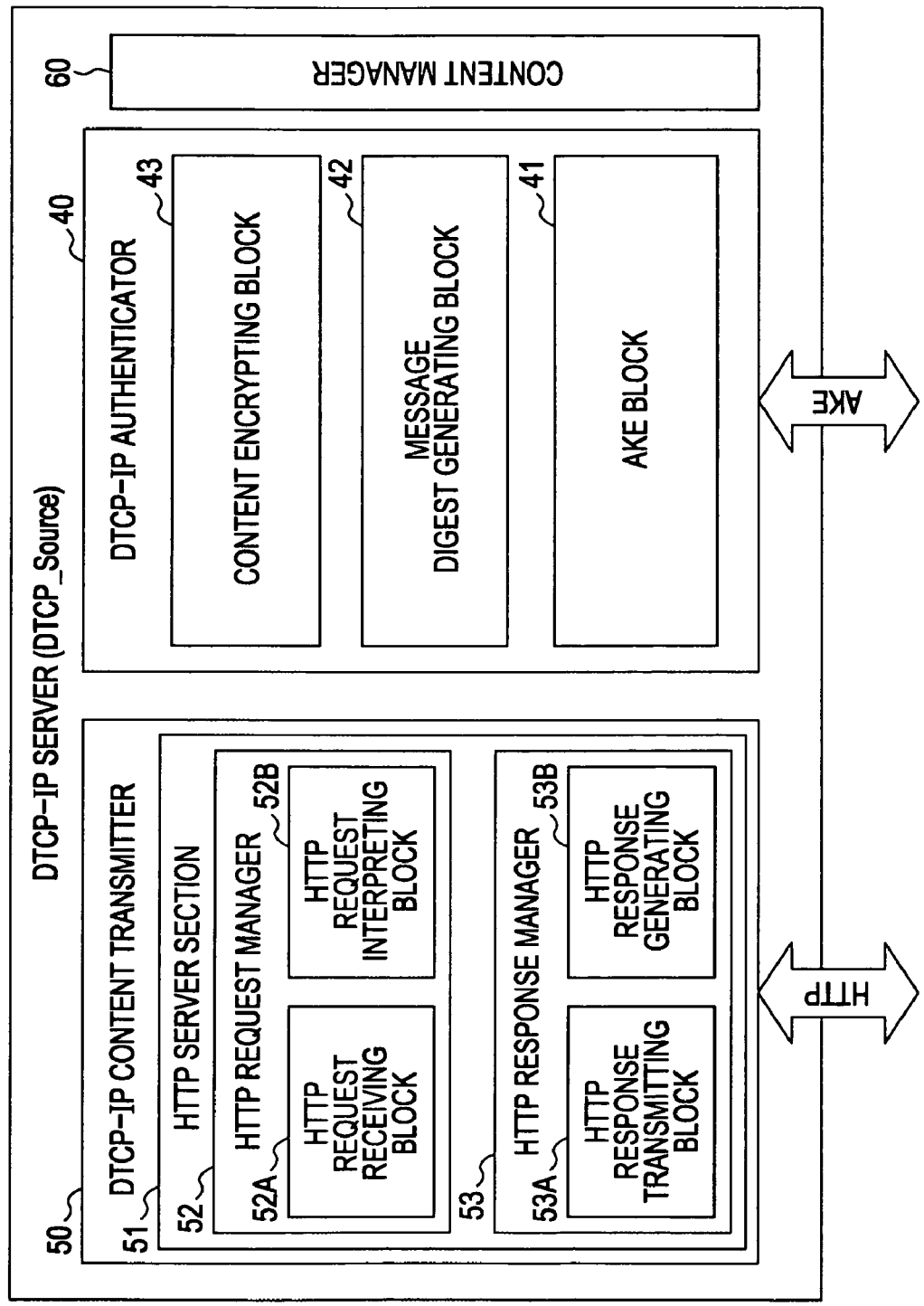
FIG. 3 illustrates a functional configuration of an information communication device functioning as a server (i.e., source device) in the information communication system of FIG. 1.

FIGS. 2 and 3 illustrate particularly a functional configuration for authentication and content transfer of a content transfer device functioning as each of the source device and the sink device in the content transfer system of FIG. 1. FIGS. 2 and 3 illustrate a functional configuration for download transfer in which the source device operating as the server downloads the content to the sink device operating as the client in response to the request from the sink device. The discussion of the functional configuration for upload transfer is omitted here. The source device and the sink device can establish a connection over the TCP/IP network such as the Internet, and perform an authentication process and a connection transfer process using the connection.

The sink device of FIG. 2 includes a DTCP-IP authenticator 10, a DTCP-IP content receiver 20, and a content reproducing and recording block 30. The sink device, operating as an HTTP client, receives content downloaded from the source device operating as an HTTP server.

The DTCP-IP authenticator 10 includes an AKE block 11, a message digest generating block 12, and a content decrypting block 13. Preferably, the DTCP-IP authenticator 10 features tamper resistance.

The AKE block 11 includes an AKE mechanism (at the sink device) in DTCP-IP. The AKE block 11 has a function of providing a parameter requested by the message digest generating block 12 to be discussed later. The AKE block 11 may define an AKE procedure dedicated to move, separate from an ordinary content transfer procedure such as copying, and uses a different scrambling method to prevent move mode spoofing.

In accordance with a specified algorithm, the message digest generating block 12 generates a message digest of the parameter. The algorithm for generating the message digest may be specified from algorithms prepared beforehand. The algorithms prepared beforehand may include algorithms related to one-way hash function, such as MD5 and SHA-1 (as MD6, SHA-1 is a modified version of MD4, but since SHA-1 can generate a hash value of 160 bits, SHA-1 has a strength advantage over MD series).

The message digest generating block 12 is closely arranged with the AKE block 11 so that the message digest generating block 12 can generate a message digest of the parameter which is held by the AKE block 11 and should not be disclosed to outside the DTCP-IP authenticator 10. The message digest generating block 12 can acquire the parameter by requesting the parameter from the AKE block 11. The message digest generating block 12 generates the digest of that parameter or a parameter given from the outside.

The content decrypting block 13 calculates a decrypting key $K_c$ using key $K_x$ exchanged through authentication and key exchange (AKE), and decrypts the encrypted content received from the source device with the decrypting key $K_c$. The content decrypted herein is transferred to the content reproducing and recording block 30. The same procedure is performed if the AKE process dedicated to move is defined.

During reproduction mode, the content reproducing and recording block 30 reproduces the content transferred from the content decrypting block 13, and during recording mode, the content reproducing and recording block 30 recodes the content onto a hard disk or any other recording medium (not shown). The recording operation of the content is performed under the control of copy control information inserted into a packet PCP for content transfer.

The DTCP-IP content receiver 20 is a process module performing a content transfer process with the source device subsequent to the AKE process. As shown, the DTCP-IP content receiver 20 includes an HTTP client section 21, and as an HTTP client, requests a content from an HTTP server (i.e., source device), and receives the content in reply from the HTTP server.

The HTTP client section 21 includes an HTTP request manager 22 and an HTTP response manager 23. The HTTP request manager 22 includes an HTTP request transmitting block 22A and an HTTP request generating block 22B.

The HTTP request generating block 22B generates a content transmission request (HTTP request) to be transmitted. The HTTP request transmitting block 22A transmits the HTTP request (i.e., an HTTP get request) generated by the HTTP request generating block 22B to the HTTP server (i.e., the source device).

The HTTP response manager 23 includes an HTTP response receiving block 23A and an HTTP response interpreting block 23B. The HTTP response receiving block 23A receives an HTTP response and the encrypted content returned from the server. The HTTP response interpreting block 23B checks the received HTTP response. If the check result is affirmative, the received encrypted content is transferred to the content decrypting block 13 in the DTCP-IP authenticator 10. If the check result is non-affirmative, an error response process is performed. The HTTP response from the source device includes at least one PCP.

The DTCP-IP authenticator 10 and the DTCP-IP content receiver 20 respectively establish a TCP/IP connection with a server, and independently perform an authentication process and a content transfer process.

A source device of FIG. 3 includes a DTCP-IP authenticator 40, a DTCP-IP content transmitter 50, and a content manager 60. The source device, operating as an HTTP server, downloads content to the sink device operating as an HTTP client.

The DTCP-IP authenticator 40 includes an AKE block 41, a message digest generating block 42, and a content encrypting block 43. Preferably, the DTCP-IP authenticator 40 is tamper resistant.

The AKE block 41 has an AKE mechanism (source device) defined in the DTCP-IP specification. The AKE block 41 has a function of providing a parameter (to be discussed later) requested by the message digest generating block 42. The AKE block 41 stores information related to the sink device. The number of pieces of information is equal to the number of devices authenticated. When content is requested by a client, the information stored on the AKE block 41 is used to determine whether that client has been already authenticated. The AKE block 41 defines an AKE procedure dedicated to move transfer, different from the AKE procedure for ordinary content transfer such as copying. By setting a different scrambling method, the spoofing of the move mode is prevented.

In accordance with a specified algorithm, the message digest generating block 42 generates a message digest of the parameter. The algorithm for generating the message digest may be specified from algorithms prepared beforehand. The algorithms prepared beforehand may include algorithms related to one-way hash function, such as MD5 and SHA-1 as previously discussed.

The message digest generating block 42 is closely arranged with the AKE block 41 so that the message digest generating block 42 can generate a message digest of the parameter which is held by the AKE block 41 and should not be disclosed to outside the DTCP-IP authenticator 40. The message digest generating block 42 can acquire the parameter by requesting the parameter from the AKE block 41. The message digest generating block 42 generates the digest of that parameter or a parameter given from the outside.

The content encrypting block 43 encrypts the content read from the content manager 60 in response to a request from the DTCP-IP content transmitter 50 using content key $K_c$ generated from a key $K_x$ exchanged through authentication and key exchange (AKE). The content encrypted here is supplied to the DTCP-IP content transmitter 50 in order to be transmitted to the client.

The content manager 60 manages the content to be protected using the DTCP-IP mechanism. The content manager 60 supplies the content in parallel with the reading process of the content encrypting block 43.

The DTCP-IP content transmitter 50 as an HTTP server, including an HTTP server section 51, receives a request (for example, an HTTP get request) from a client (i.e., sink device), and performs a process responsive to the request.

The HTTP server section 51 includes an HTTP request manager 52 and an HTTP response manager 53.

The HTTP request manager 52 includes an HTTP request receiving block 52A and an HTTP request interpreting block 52B. The HTTP request receiving block 52A receives an HTTP request from the client. The received HTTP request is then sent to the HTTP request interpreting block 52B to be checked. If the check result of the HTTP request interpreting block 52B is affirmative, the DTCP-IP authenticator 40 is notified of the information of the HTTP request.

The HTTP response manager 53 includes an HTTP response transmitting block 53A and an HTTP response generating block 53B.

The HTTP response generating block 53B generates an HTTP response to return an encrypted content if the check result of the HTTP request interpreting block 52B is affirmative. The HTTP response includes at least one PCP. If the check result of the HTTP request interpreting block 52B is non-affirmative, an HTTP response for returning an error is generated.

The HTTP response transmitting block 53A transmits the generated HTTP response to the client as a requesting source device. If the check result of the HTTP request interpreting block 52B is affirmative, the HTTP response transmitting block 53A transmits the content encrypted by the content encrypting block 43 in the DTCP-IP authenticator 40 in succession to an HTTP response header.

The DTCP-IP authenticator 40 and the DTCP-IP content transmitter 50 respectively establish a TCP/IP connection with a sink device, and independently perform an authentication process and a content transfer process.

The message digest generating block in the DTCP-IP authenticator in each of the DTCP sink device and the DTCP source device is neither a functional module defined the DTCP-IP specification, and nor directly related to the features of this invention.

Figure 4:
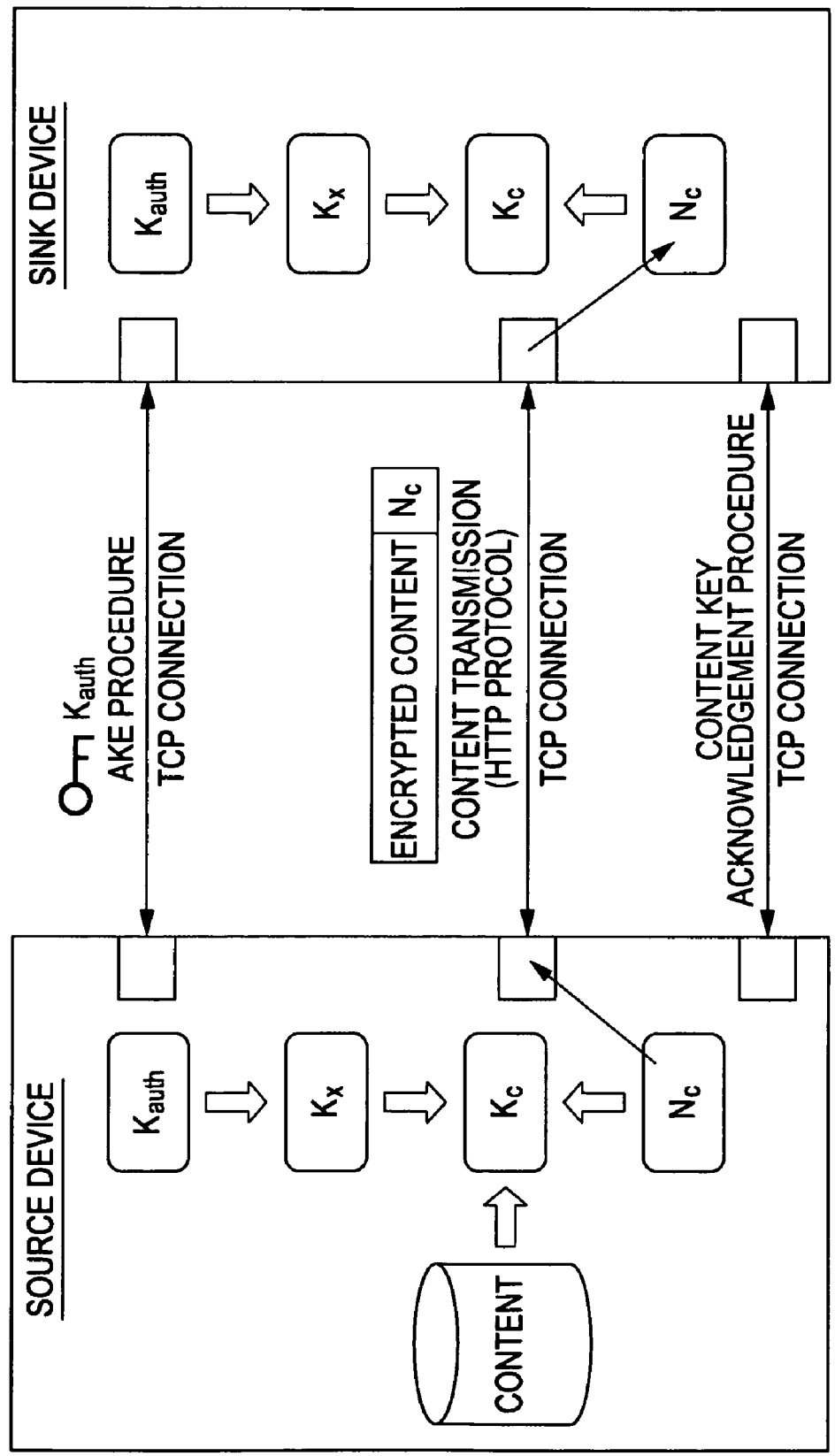
FIG. 4 illustrates a key exchange process in accordance with an authentication and key exchange (AKE) process between the source device and the sink device and a mechanism for transferring an encrypted content using the shared key exchanged in the AKE process.

The content transfer procedure in accordance with DTCP-IP is described below. FIG. 4 illustrates a mechanism for a AKE key exchange process and a content encrypting and transfer process with the key shared as a result of key exchange process, each process performed between the source device and the sink device. Two content transfer methods are available. In a copy based method, content on the source device is copied to the sink device while in a move based method, content on the source device is moved to the sink device with the original content not left on the source device. This section is described based on the copy based content transfer method. The move based content transfer method is performed using the move function. The AKE procedure for performing the move transfer will be described later.

The source device and the sink device establish one TCP/IP connection first to authenticate each other. This authentication is hereinafter referred to as DTCP authentication or authentication and key exchange (AKE). Each standard DTCP compliant device contains a device certificate issued by the digital transmission licensing administrator (DTLA) and embedded therewithin. In the DTCP authentication process, the devices authenticate each other as a standard DTCP compliant device so that an authentication key $K_{auth}$ is shared by the source device and the sink device.

Upon successfully completing the AKE process, the source device generates an exchange key $K_x$ serving as a seed of the content key $K_c$, encrypts the exchange key $K_x$ with the authentication key $K_{auth}$, and transmits the encrypted exchange key $K_x$ to the sink device. Each of the source device and the sink device performs a predetermined calculation process on the exchange key $K_x$, thereby generating the content key $K_c$ for use in the encrypting of the content during the content transfer. The calculation equation for generating the content key $K_c$ from the exchange key $K_x$ may be changed from content transmission method to content transmission method (i.e., the calculation equation may be changed from the copying transfer to the move transfer). A further description about this will be provided later.

After the authentication and key exchange process is completed between the DTCP compliant devices, the sink device requests content from the source device. The source device may notify beforehand the sink device of a content location as an access destination of the content on the source device through content directory service (CDS) defined by the UPnP®. To request the content, the sink device may use hyper text transmission protocol (HTTP) or real-time transport protocol (RTP).

As shown in FIG. 4, the sink device as an HTTP client requests the source device as an HTTP server to transfer the content from in a download fashion in accordance with the HTTP procedure, and the content transfer may be started using an HTTP get method, for example. If the source device as an HTTP client pushes the content to the sink device as an HTTP server in an upload fashion in accordance with the HTTP procedure (this case is not shown), the content transmission may be started using an HTTP post method, for example. To request the content in accordance with the real-time transport protocol (RTP), the source device becomes an RTP sender and the sink device becomes an RTP receiver before starting the content transfer.

When the content transfer is performed in accordance with HTTP, the HTTP client generates a TCP/IP connection for HTTP different from the TCP/IP connection for the AKE procedure, namely, for the DTCP authentication. In other words, each of the source device and the sink device holds socket information respectively for the AKE procedure and the content transmission. The socket information is a combination of an IP address and a port number. The sink device as the HTTP client requests the content on the HTTP server using an HTTP request using the get method in the same procedure as the ordinary HTTP. The HTTP server returns an HTTP response responsive to the request.

Data transmitted as the HTTP response is data into which the HTTP server, namely, the source device has encrypted the content with the key shared as a result of the AKE authentication. More specifically, the source device generates a nonce $N_c$ using a random number, and generates the content key $K_c$ based on the exchange key $K_x$, the nonce $N_c$, and extended encryption mode indicator (E-EMI) representing an encrypt mode. The source device encrypts the content requested from the sink device with the content key $K_c$, and transmits a transmission control protocol (TCP) stream that includes a protected content packet (PCP) containing a header composed of a payload (encrypted content), the nonce $N_c$, and the E-EMI. The IP protocol divides the TCP stream into packets, each packet having a predetermined size, and attaches a header to each IP packet, and delivers the IP packet to a designated IP address.

Upon the receipt of each IP packet from the source device, the sink device constructs these IP packets into the TCP stream and extracts the transmitted PCP. When the nonce $N_c$ and the E-EMI are extracted from the stream, the sink device calculates the content key $K_c$ using the nonce $N_c$, E-EMI, and the exchange key $K_x$, thereby decrypting the encrypted content. Subsequent to the decrypting process, the resulting plain text content may be reproduced or recorded. When the content transfer is completed using the HTTP protocol, the sink device disconnects the TCP connection used in the content transfer as appropriate.

Figure 5:
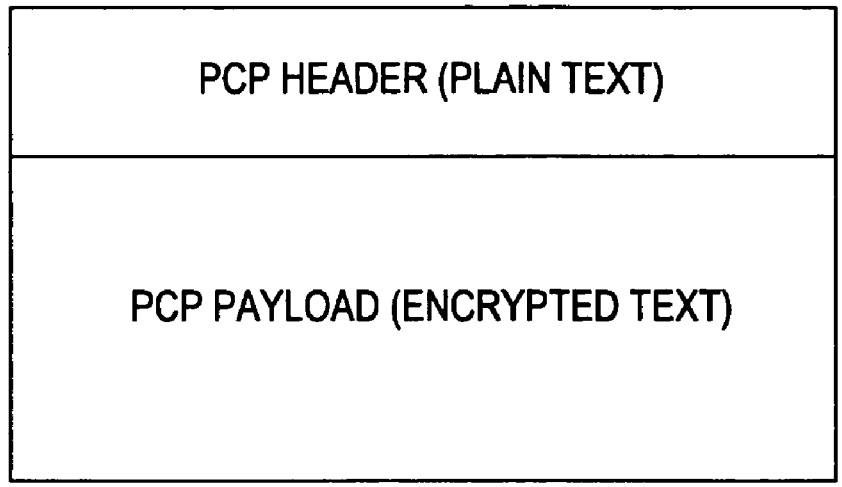
FIG. 5 diagrammatically illustrates a data structure of a protected content packet (PCP)

FIG. 5 diagrammatically illustrates a data structure of the packet PCP for use in the content transfer in accordance with DTCP-IP. As shown, the PCP is a packet containing a header containing the nonce $N_c$, and the payload composed of the encrypted packet. The HTTP response includes at least one PCP, and an RTP payload includes one PCP.

The PCP header includes a plain text containing the nonce $N_c$. The PCP payload includes the content encrypted with the content key $K_c$ determined by the nonce $N_c$ (no encrypting is required if "copy-free" is specified as copy control information).

Figure 6:
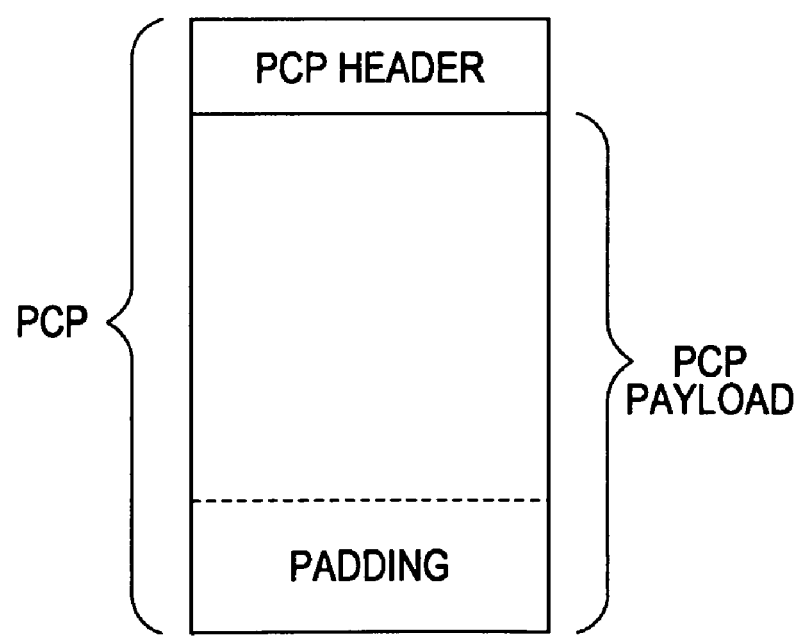
FIG. 6 illustrates a padding process to a PCP payload.

A data length of the PCP payload, namely, a value of a protected_content_length is regulated to be always a multiple of 16 bytes. If the value of the protected_content_length is not a multiple of 16 bytes, a padding operation is performed as necessary, and the content is thus followed by a pad of 1 to 15 bytes. FIG. 6 illustrates a padded PCP.

If the same key is repeatedly used over an extremely long TCP stream, the risk of cipher cracking increases. For this reason, DTCP-IP requires that the source device should update the nonce $N_c$, i.e., the content key $K_c$ every 128 MB (increments the nonce $N_c$ by one) in order to promote content security. When the nonce $N_c$ is periodically updated, the PCP is padded (a plurality of PCPs may be padded without updating the content key $K_c$).

DTCP-IP requires that a content key verification procedure should be initiated in response to the update of the nonce $N_c$. In the content key verification procedure, the sink device establishes another TCP/IP connection for content key verification different from the TCP/IP connection for content transfer, and performs the content key verification process with the source device. When the content key verification is required, the sink device establishes the TCP/IP connection as appropriate. For example, DTCP-IP Volume 1 Supplement E.8.6 defines "Content Key Confirmation" for the content key verification procedure. Using CONT_KEY_CONF subfunction, the sink device verifies the content key related to the current nonce $N_c$.

DTCP-IP provides the move function to allow the sink device to use the content that has been encrypted by the source device as no more copies content.

The move in network communications refers to the movement of data between devices. After the data is moved to a destination device, no original data is left on a source device in principle. In accordance with the move function defined in the DTCP-IP specification, the source device transmits content to the sink device on condition that the source device deletes the content or inhibits the use of the content subsequent to transmission while the sink device handles the received encrypted content as a no more copies content. The move transfer is permitted only between a single source device and a single sink device.

A move sequence performed between DTCP-IP based devices is described below. To permit a minimum level of interactions, a move transfer using one of an HTTP get method and an HTTP post method is recommended. This does not exclude the use of other method.

In accordance with the move sequence in DTCP-IP, the requirement that the source device delete the content or inhibit the use of the content needs to be consistently satisfied. To this end, the incremental move is performed in which the source device incrementally makes data unusable subsequent data transmission while the sink device incrementally makes received data usable. If the move sequence is interrupted due to a failure in a transmission path or any other reason, the content may be fragmented or missing between the source device and the sink device. As a result of the interruption, an otherwise appropriately received content is missing.

In the content transfer system of one embodiment of the present invention, the sink device successively records the content being moved while keeping the successively recorded data unusable until a successful ending of the move transfer. When the finalizing process of the move transfer, namely, a commitment process is performed, the recorded content is validated to be usable at the sink device while the original content is deleted or inhibited in use at the source device. In accordance with such a transfer procedure, the same no more copy content cannot be present at both the source device and the sink device in duplication. Even if the move transfer process is interrupted due to a transmission path failure, the content is not fragmented. The sink device can resume the content transfer.

The content move transfer is equivalent to a bulk movement between the source device and the sink device. The content move transfer may be referred to a block move, which is different from the incremental move transfer in which the source device incrementally makes data unusable subsequent transmission while the sink device incrementally makes received data usable. The block move does not permit the same content to be present at both the source device and the sink device in duplication, and is thus considered as satisfying the requirement in the DTCP-IP specification.

The sink device cannot reproduce the recorded content until the successful ending of the move transfer, but the received content may be reproduced (rendered) in parallel with the recording operation of the received content in the invalidated state thereof. If the block move satisfies the requirement of the DTCP, the rendering process of the content in parallel with the block move are equivalent to content streaming with the TCP/IP connection for the content streaming established. If the rendering process is performed in parallel with the block move, one line for the TCP/IP connection is sufficient. Communication paths are thus saved. Since each of the source device and the sink device can perform the move transfer process and the rendering process in a single content transfer process, workload on the system is reduced.

Figure 7:
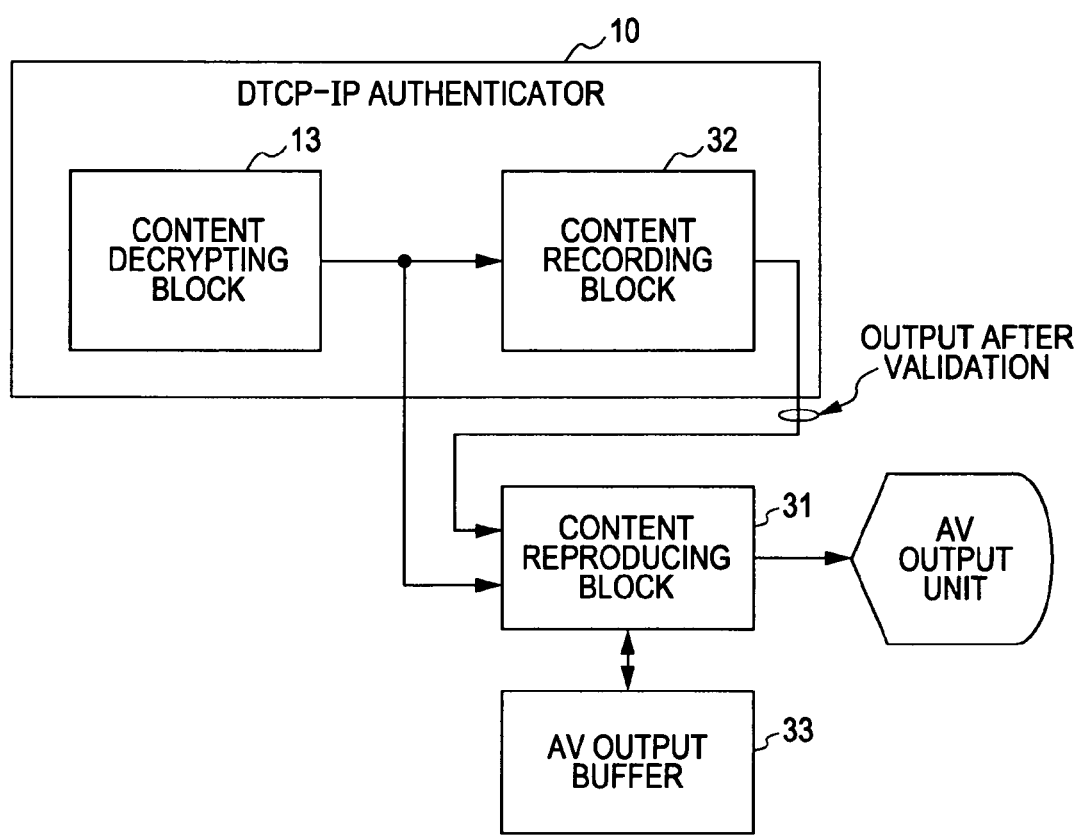
FIG. 7 illustrates a configuration of the sink device that performs a content move transfer process and a received content reproducing process in parallel.

To perform the content move transfer process and the received content reproducing process in parallel, the content reproducing and recording block 30 in the sink device of FIG. 2 may be divided into two independent modules, namely, a content reproducing block 31 and a content recorder 32. FIG. 7 is a functional block diagram of such content reproducing and recording block 30.

The content decrypting block 13 decrypts the encrypted content received from the source device using the content key $K_c$ of the content calculated from the exchange key $K_x$ exchanged in AKE, and supplies the decrypted content to each of the content reproducing block 31 and the content recorder 32.

The content recorder 32 performs a predetermined decrypt process on the content as a no more copies content, and stores the resulting content in an invalid state onto a hard disk or any other recording medium (not shown). The encrypted content stored by the content recorder 32 is not validated until the move transfer of the entire content is completed. The content cannot be read from the recording medium, thus cannot be decrypted for use (cannot be reproduced on the content reproducing block 31). By arranging the content recorder 32 as the content decrypting block 13 in the tamper-resistant DTCP-IP authenticator 10, leakage of decrypted content between the content decrypting block 13 and the content recorder 32 is controlled.

The content reproducing block 31 converts (renders) the content supplied from the content decrypting block 13 into video and audio signals, thereby outputting video and sound from an audio-visual unit such as a display. Since the data of the decrypted content disappears at the moment the content is output to the user, this mode of operation does not fall within the range of content copying operation, and does not violate the TCP rule that there should be no replayable content present at both the source device and the sink device in duplication.

By performing the reproducing process of the received content in parallel with the move transfer process, the user recognizes the content during the move transfer process while enjoying watching the content on a real-time basis.

If the content transfer between the source device and the sink device is performed faster than the reproducing operation performed on the content reproducing block 31, the content reproducing block 31 may include a local AV output buffer 33. In the parallel operation, the content directly supplied from the content decrypting block 13 may be accumulated on the AV output buffer 33 and then output for reproduction on a first-in first-out basis. The content reproducing block 31 can record and reproduce the content on a real-time basis. The AV output buffer 33 may be mounted as a buffer memory dedicated to the content reproducing block 31. Alternatively, a recording medium (not shown) such as a hard disk in the content recorder 32 and the AV output buffer 33 may be integrated into one recording medium so that the AV output content and the recording content may be integrated into one content.

The inventors of this invention arrange the system so that the move transfer between the source device and the sink device is performed in a download transfer and an upload transfer. The term download refers to a pull-based distribution in which a user operating the sink device pulls content from the source device. For example, the source device operates as an HTTP server while the sink device operates as an HTTP client, and the move sequence is executed using an HTTP get method. The upload refers to a push-based distribution in which a user operating the source device pushes content to the sink device. For example, the source device operates as an HTTP client while the sink device operates as an HTTP server, and the move sequence is executed using an HTTP post method. To permit a minimum level of interactions, a move transfer using one of an HTTP get method and an HTTP post method is recommended. This does not exclude the use of other method.

In the known DTCP-IP, the copy transfer is typically performed in the download transfer where a trigger for content transfer occurs at the sink device (see FIG. 4, for example). The block move transfer sequence for each of the download transfer and the upload transfer is described below.

Figure 8:
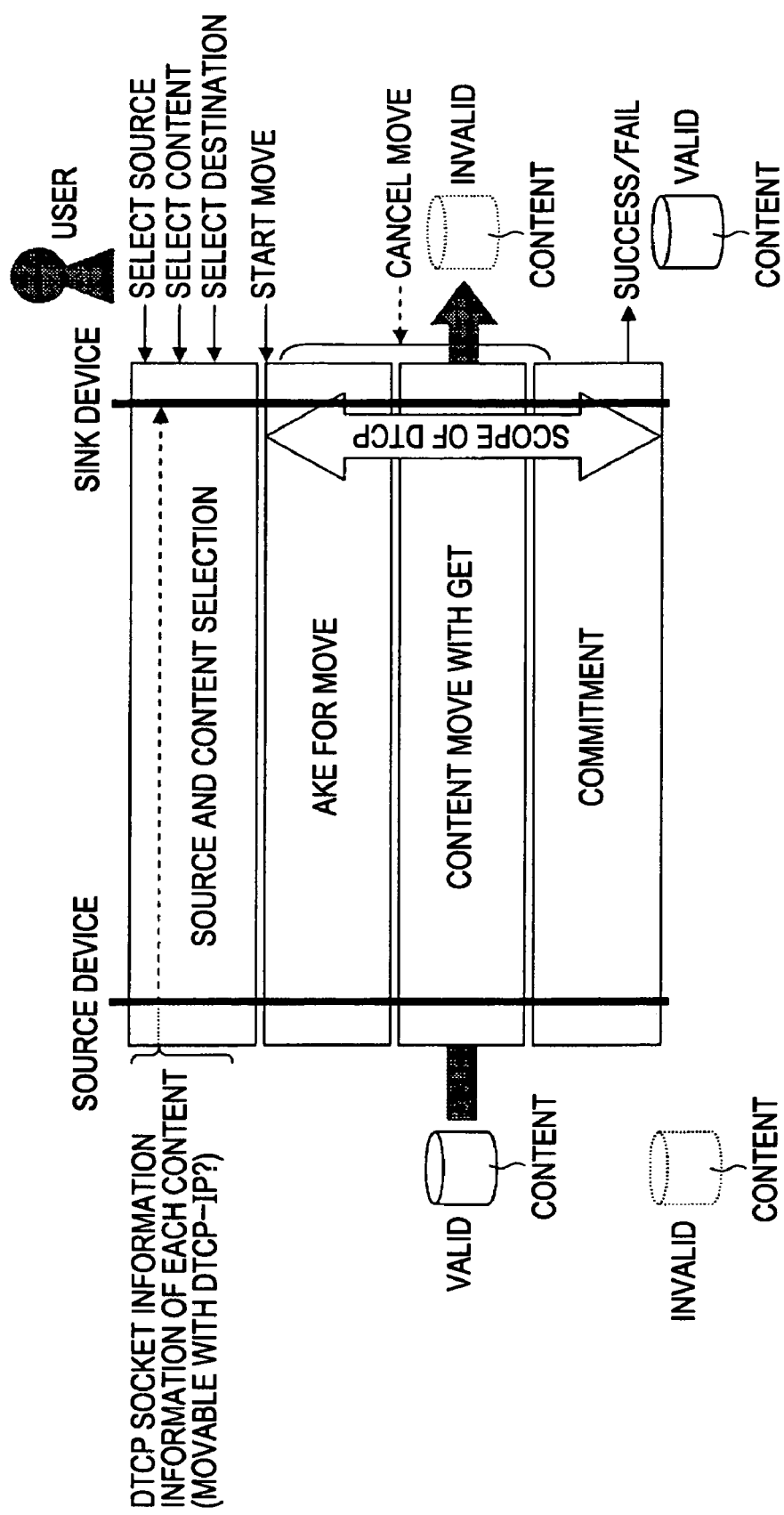
FIG. 8 illustrates an operational sequence of a move transfer performed in a download fashion between the source device and the sink device.

FIG. 8 illustrates an operational sequence for the block move performed in a download fashion between the source device and the sink device. As shown, the move transfer is performed in four phases including a selection phase of a source device and content, a move AKE phase, a content move transfer phase, and a move finalizing phase. The move AKE phase, the content move transfer phase, and the move finalizing phase are executed in the order sequence defined in the DTCP specification.

Figure 9:
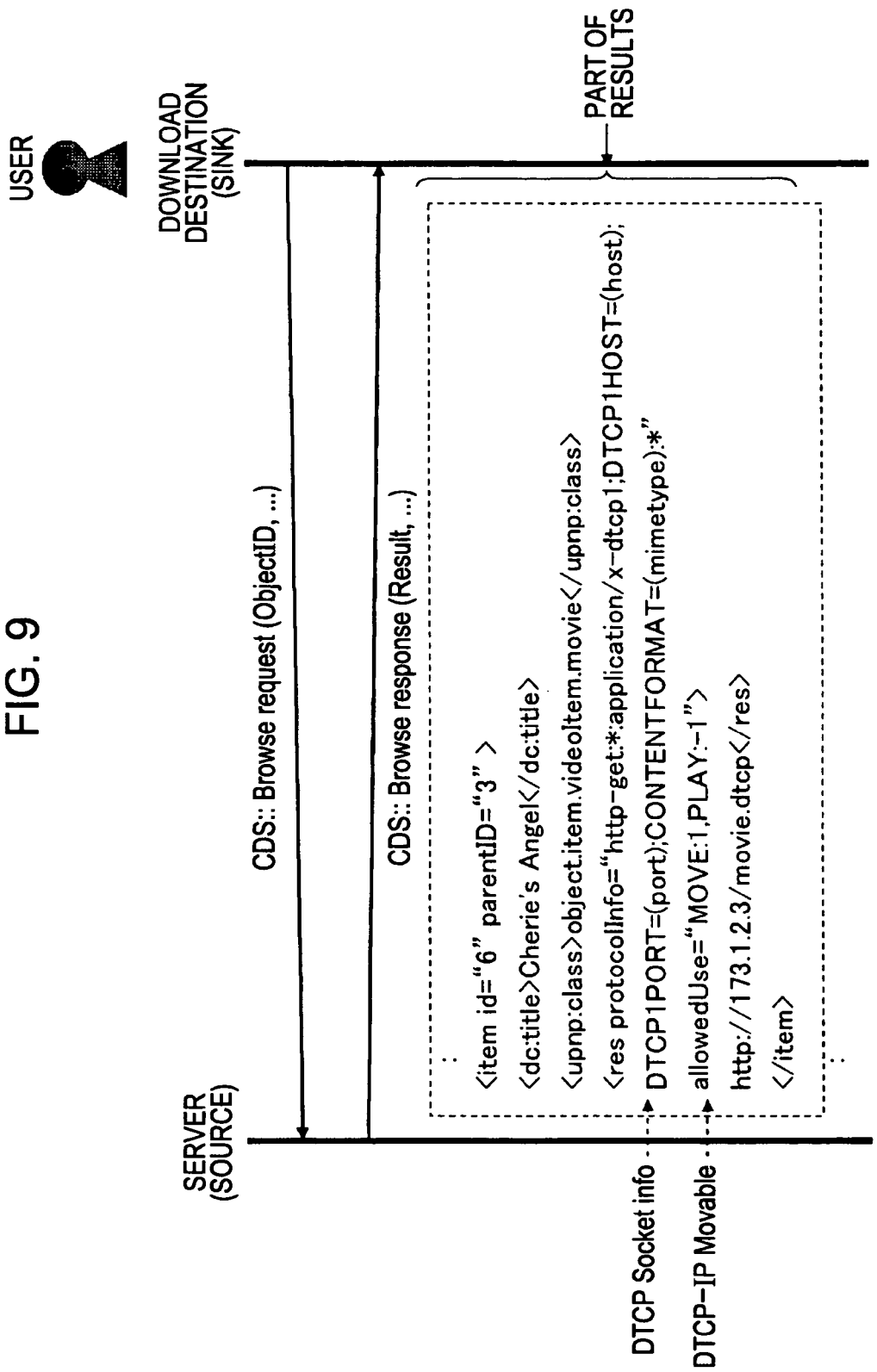
FIG. 9 illustrates an operational sequence that selects content to be moved between the source device and the sink device using a universal plug and play (UPnP®) based content directory service (CDS) when the move transfer is performed between the source device and the sink device in a download fashion.

The source device and content selection phase is performed on UPnP® basis. The sink device can acquire content information using content directory service (CDS). The CDS is one of major services of the UPnP® media server. Typically, using CDS, the sink device browses and searches contents, and edits metadata of contents. FIG. 9 illustrates an operational sequence between the source device and the sink device in this case.

The sink device issues a CDS::Browse request, and acquires content list information from a CDS::Browse response from the source device. As shown, the content is identified by item ID (identification) and parent ID in the response. A title of content, UPnP® class of the content, and response information responsive to the CDS::Browse request are described on a per content basis. Socket information (DTCP Socket Info) of each content is described in a third field of response attribute information (res protocolInfo attribute). Movable information indicating whether the content is movable through another response attribute information (res@allwedUse) is described, followed by a URL indicating a storage location of the content. The method of describing the movable information is not limited to this. For example, it is contemplated that response attribute information is defined in DTCP and used. The move transfer method may be specified by stating the block move or the incremental move.

As shown in FIG. 9, the source device describes, as the socket information, character string "DTCP1HOST=(host); DTCP1PORT=(port)" in a third field of the res protcolInfo attribute and in an allowedUse attribute, a character string "MOVE:1" indicating that the content is movable in accordance with DTCP-IP. The sink device can thus acquire the socket information of each content and information as to whether the content is movable, by reading from the shown response the values of the protocolInfo attribute and the allowedUse attribute in the res tag related to the content selected by the user.

In the DTCP specification, the res@allowedUse is not standardized and the operation method of "MOVE:1" is not defined in detail. Depending on definition in the future, these can become inappropriate. It is contemplated that instead of res@allowedUse, parameter "DTCP.COM_FLAGS param" may be arranged in a fourth field of res@protocolInfo to indicate the movability of the content move. The field DTCP.COM_FLAGS param has a length of 32 bits. The bit definition is as follows: if 1 is written on bit 30, 1 is also written on bit 31, and the sink device disregards backup bit fields:

bit 31: movable in accordance with DTCP;

bit 30: block move protocol satisfying the requirement defined in the DTCP specification is supported; and bits 29-0: backup bits.

The DTCP.COM_FLAGS param field is arranged at the fourth field of res@protocolInfo attribute, and 32 bit values are represented in hexadecimal number. When the DTCP.COM_FLAGS param field is used, a description example of the res@protocolInfo attribute is as follows:

<res protocolInfo="http-get:*:application/x-dtcp1; DTCP1HOST=(host); DTCP1Port=(port); CONTENTFORMAT=(mimetype): DTCP.COM_FLAGS=C0000000"> http://1.2.3.4/content?id=def-abc</res>

Upon receiving the CDS::Browse response from at least one source device, the sink device selects a source device, selects content to be moved from the selected source device, and selects a destination. In succession to the content selection at the sink device, the move transfer process of the selected content is performed.

Prior the move transfer, the move AKE process is performed to perform mutual authentication and share a key for move between the source device and the sink device. It is premised that the source device is prepared to receive AKE from the sink device before AKE trigger information is supplied from the sink device to the source device. In accordance with one embodiment, the mutual authentication process and the process for sharing a seed key serving as a source device of a content decrypting key between the source device and the sink device are performed in accordance with the AKE procedure in the standard DTCP-IP specification (as previously discussed with reference to FIG. 4). However, when the move is executed, an exchange key $K_{XM}$ different from the standard content transfer process is generated and that exchange key is destroyed each time the move transfer is performed. This arrangement makes it more difficult for third parties to perform copying operation of content by spoofing the move transfer as a copy transfer.

Figure 10:
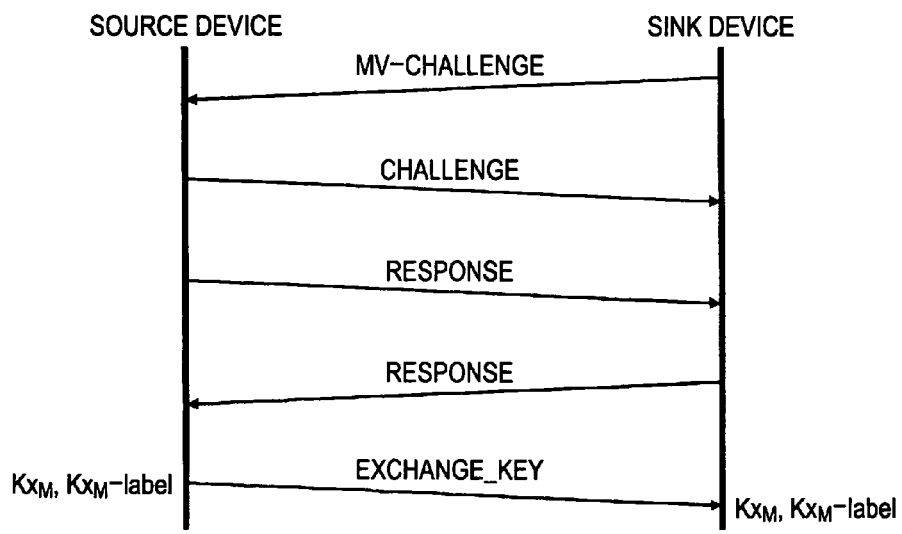
FIG. 10 illustrates an operational sequence in a move authentication and key exchange (AKE) procedure.

FIG. 10 illustrates an operational sequence of the move AKE process. As shown, the operational sequence is performed using a challenge response authentication procedure. In reply to the challenge request (MV-CHALLENGE) for move from the sink device, the source device generates the exchange key $K_{XM}$ for move at each move AKE. Through subsequent responses, the keys $K_{XM}$ and $K_{XM\_}$label are shared by the source device and the sink device. However, a scrambling method different from standard AKE procedure applies in an exchange key command, thereby preventing the move transfer from being spoofed as a copy transfer.

The generation method of the keys $K_{XM}$ and $K_{XM\_}$label is identical to the key generation method during the standard content transfer (as previously discussed with reference to FIG. 4), and the discussion thereof is omitted herein. The rule of destroying the keys $K_{XM}$ and $K_{XM\_}$label is identical to that of the keys $K_X$ and $K_{X\_}$label, and the discussion thereof is omitted herein.

Each time one move procedure is completed, the source device and the sink device destroy the keys $K_{XM}$ and $K_{XM\_}$label for the move procedure.

Figure 27:
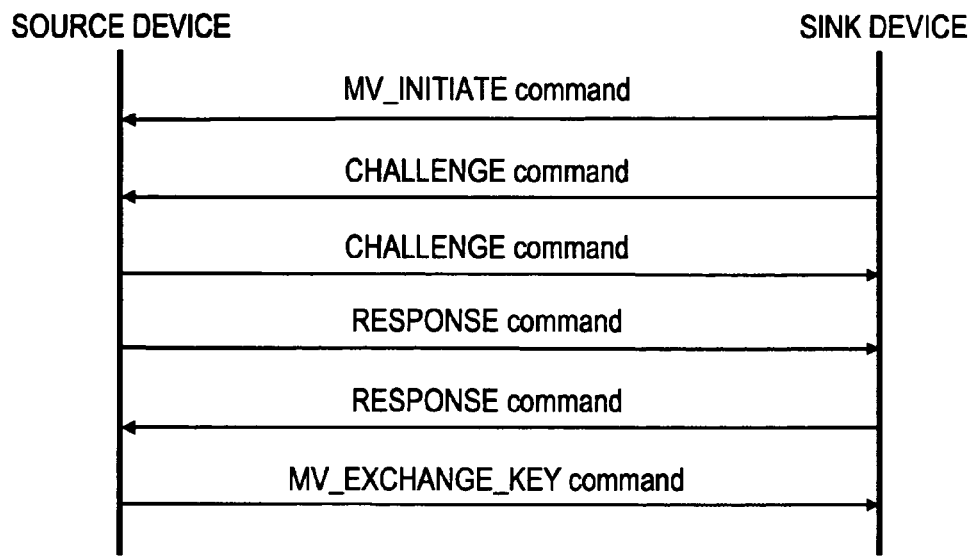
FIG. 27 illustrates another operational sequence in the move AKE procedure.

FIG. 27 illustrates another operational sequence for the move AKE procedure. As shown, the sink device initializes the move transfer using a move protocol for transmitting an MV-INITIATE command, thereby initiating a move RTT (round trip time)-AKE process. In the RTT-AKE, mutual authentication is performed using the challenge-response procedure in accordance with the standard AKE. Through the RTT, localization check is performed on the source device and the sink device, but this is not directly related to the present invention. Exchange keys are shared using an MV_EXCHANGE_KEY command.

As previously discussed, the content transfer system of one embodiment of the present invention provides the two types of move transfer, namely, the incremental move and the block move. The incremental move is executed using the move transfer standardized in the DTCP-IP specification. In contrast, the block move is not standardized in the current DTCP-IP specification. Preferably, whether a device supports the block move, namely, a device capability is verified when the move AKE procedure is performed.

Figure 16:
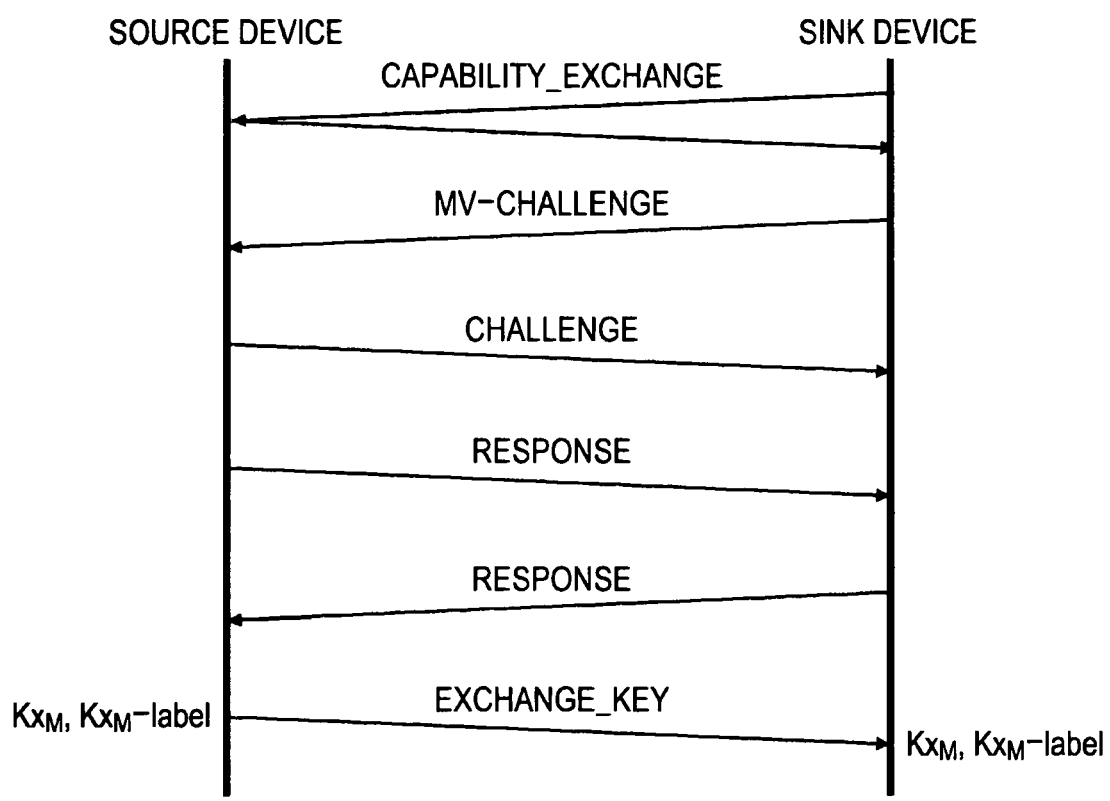
FIG. 16 illustrates an operational sequence of a move AKE process including a verification sequence of a capability.

FIG. 16 illustrates an operational sequence for the move AKE process including a capability verification sequence. As shown, the source device and the sink device exchange capability (CAPABILITY_EXCHANGE) before performing a challenge-response authentication process for move.

Figure 17:
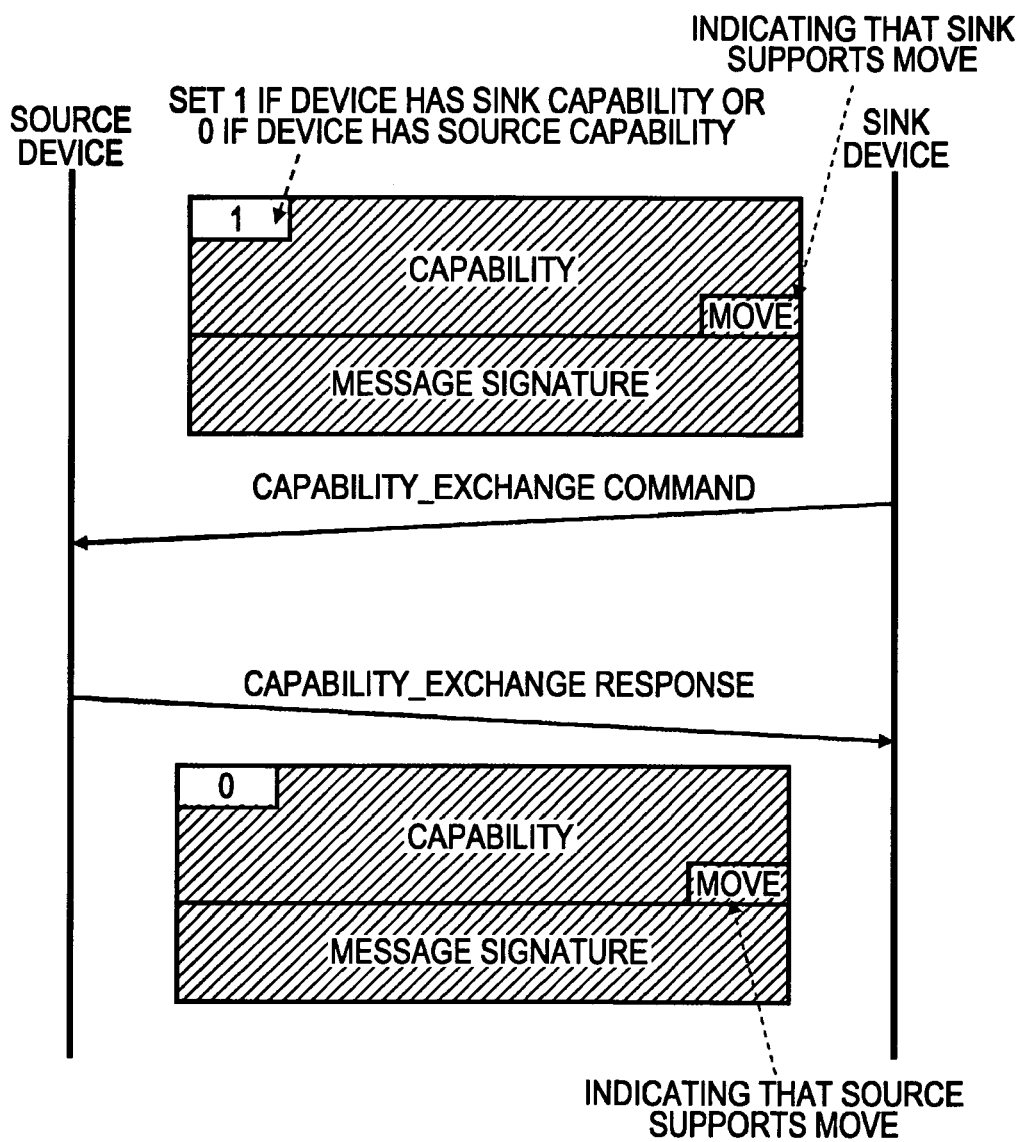
FIG. 17 illustrates in detail a capability exchange process of the operational sequence of FIG. 16.

FIG. 17 illustrates the capability exchange process of FIG. 16 more in detail. A message used in command/response includes a capability field containing a description of a capability of each device, and an electronic signature regarding the capability field.

A first one bit of the message is used to identify one of the source device and the sink device. If a device transmits a capability of a sink device, 1 is written on the first one bit. If a device transmits a capability of a source device, 0 is written on the first one bit. This arrangement prevents the sink device from transmitting the capability as if the capability of the source device, thereby controlling capability spoofing. The device compatibility with the move (or block move) is described on a trailing bit of the capability field.

The electronic signature field includes a sink device/source device bit at the front of the message, and an electronic signature that is determined using a secret key of each device related to the capability field. Upon the receipt of a CAPABILITY_EXCHANGE command, the source device examines the signature using a public key of the sink device, and upon receiving a CAPABILITY_EXCHANGE response, the sink device examines the signature using a public key of the source device.

For example, to request the content to be moved in the block mode, the sink device issues the CAPABILITY_EXCHANGE command, and in response, the source device returns the CAPABILITY_EXCHANGE response. If one of the two devices fails to support the block move, the content move transfer may be performed with the mode switched to the known incremental move.

The CAPABILITY_EXCHANGE sequence sufficiently serves as a preventive step against a move transfer mode spoof attack. If any other anti-spoofing measure has already been taken, secure information exchange procedure using the CAPABILITY_EXCHANGE sequence becomes unnecessary.

If the move AKE process has been successfully completed, the content move transfer process is initiated. When the content is moved from the source device in response to a user operation at the sink device, the source device operates as an HTTP server while the sink device operates as an HTTP client, and the sink device performs the download move transfer using the HTTP protocol. Each of the incremental move and the block move is performed in the same manner using the HTTP protocol to transfer the data entity of the content. More specifically, the sink device operating as an HTTP client requests the content using the HTTP get request. In response, the source device operating as an HTTP server moves the content selected in the content selection phase using the HTTP get response. In the known art, the get is an HTTP method to send a request to acquire information from a particular URI.

Figure 28:
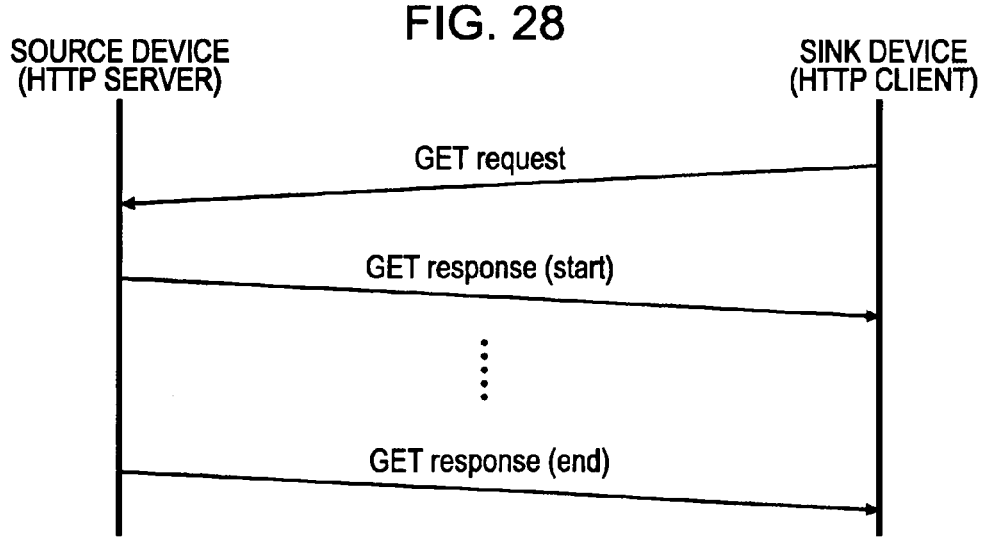
FIG. 28 illustrates an operational sequence in which the sink device requests content from the source device using a HTTP get request and the source device transfers the content using an HTTP get response.

FIG. 28 illustrates an operational sequence for moving the content in a download fashion using the HTTP protocol. When the RTT-AKE procedure of FIG. 27 is successfully completed, the sink device operating as an HTTP client transmits the HTTP get request, thereby initializing the move transfer process.

To move the content in a download fashion using the HTTP protocol, the source device sets the mode of E-EMI to C1, namely, the move mode (see the Table). Upon receiving the E-EMI mode other than C1, the sink device does not handle the received content as a move object.

The sink device transmits a HTTP get request having a header containing header information "MOVE.dtcp.com: <$K_{XM}$_label>" (or "BLKMOVE.dtcp.com" instead of "MOVE.dtcp.com"), thereby starting the download move transfer. Upon detecting the header information, the source device encrypts the requested content with the encrypting key $K_c$ obtained from the key $K_{XM}$ for move corresponding to the $K_{XM}$_label as a key ID, and transmits the HTTP get response with C1 set to the E-EMI.

Figure 14B:
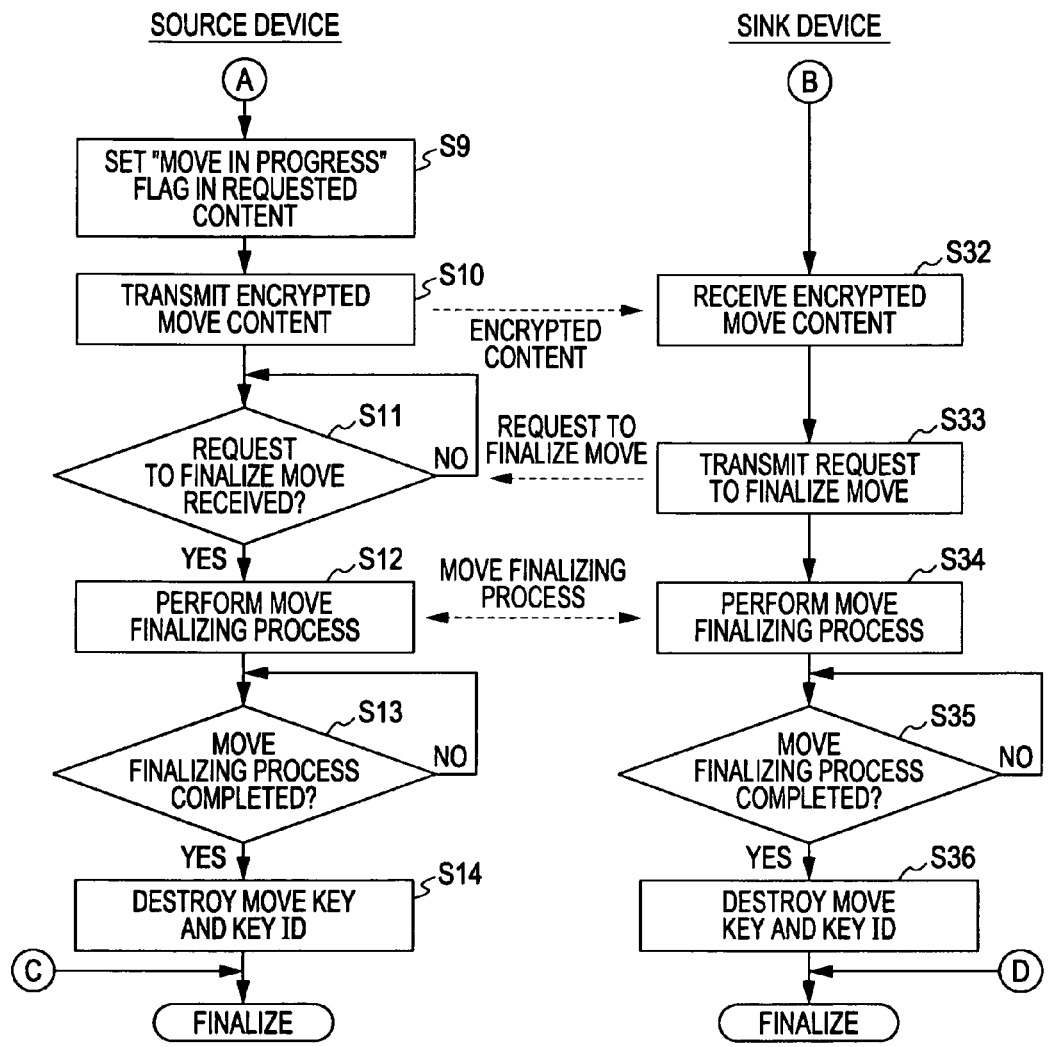
FIG. 14B is a continuation of the flowchart of FIG. 14A.

FIGS. 14A and 14B are flowcharts of the process of each of the source device and the sink device wherein the source device operating as an HTTP server transmits the content in the download move transfer to the sink device operating as an HTTP client.

The sink device detects the source device operating as the HTTP server and selects content to be moved (step S21). The sink device transmits the CDS::Browse request to the source device (step S22), and waits on standby for a response from the source device (step S23).

The source device waits on standby for a CDS::Browse request or any other request from a sink device (step S1). Upon receiving the request, the source device returns a CDS::Browse response (step S2), and waits on standby for a move AKE request (step S3).

Upon receiving a content list through the CDS::Browse response from the source, the sink device determines the content to be moved (step S24), and requests the source device to perform the move AKE process (step S25).

The move AKE sequence starts between the source device and the sink device and the move AKE process is executed (steps S4 and S26). When the move AKE process has successfully been completed (steps S5 and S27), the source device generates and transmits the key for move and the key ID to the sink device (step S6). The sink device receives the key for move and the key ID from the source (step S28). If the move AKE authentication fails between the source device and the sink device, both the source device and the sink device skip all subsequent steps and terminate the routine.

Upon completing the move AKE process successfully, the sink device transmits the HTTP get request having a header containing header information "MOVE.dtcp.com:<$K_{XM}$_label>" (or "BLKMOVE.dtcp.com" instead of "MOVE.dtcp.com"), thereby starting the download move transfer (step S29).

Upon receiving the HTTP get request accompanied by the move header from the sink device (step S7), the source device checks whether the move of the content thus requested is currently in progress to another sink device (step S8). If the move of the content is currently in progress, the source device returns an error response to the sink device (step S15).

The sink device waits on standby for the reception of the HTTP get response from the source device (step S30). If an error response indicating that the requested content cannot be moved is received (step S31), the routine here is terminated.

If the content requested for move by the sink device is not being moved to another sink device and can be moved to the requesting sink device, the source device sets a "move transfer in progress" flag in the content (step S9), encrypts the content with the key for move, and then transmits the encrypted content to the requesting sink device (step S10). When the "move transfer in progress" flag is set, the content is shifted to a lock state. Upon completing the encrypted content transfer process, the source device waits on standby for a request for a move finalizing process from the sink device (step S11).

Upon completing successfully the download of the encrypted content (step S32), the sink device transmits a request for a move finalizing process to the source device (step S33). The source device and the sink device perform the move finalizing process (steps S12 and S34). The sink device validates the content while the source device invalidates the original content. The operational sequence for the move transfer finalizing process performed between the source device and the sink device will be described later.

Upon completing the move finalizing process (steps S13 and S35), the source device and the sink device destroy the key for move and the key ID (steps S14 and S36) and thus terminate the routine.

During the download move transfer process of FIGS. 14A and 14B, the content to be moved is locked so that a move request from another sink device may not be accepted. The occurrence of multiple move transfers is thus controlled. To perform the download move, the source device operates as a server, and Table 2 below is used to manage each of stored contents. Table 2 lists the status of each content as to whether the content is being moved or not. A URI identifying content and a flag indicating whether the move of the content is in progress are associated with each other to permit the status of the content to be checked. The source device does not show in the downloading transfer the presence of content currently being moved in the CDS::Browse response to another sink device which requests the move of the content, thereby avoiding any failure (such as a transmission interruption due to the end of a move in the middle of reproduction).

TABLE 2

| Content #1 URI | Move in progress flag = OFF |
| Content #2 URI | Move in progress flag = OFF |
| Content #3 URI | Move in progress flag = ON |
| Content #4 URI | Move in progress flag = OFF |

Since the content is not yet validated at the sink device during the download move transfer process in the block move mode, the content received cannot be used except the one received for rendering purposes. The rendering mechanism has already been discussed with reference to FIG. 7.

Interruption processes for interrupting the move transfer, such as cancel or abort, can be initiated during the move AKE process and the content move transfer process. The interruption process will be described in detail later.

If the sink device has successfully downloaded the desired content from the selected source device using the HTTP get request, the move finalizing process, namely, the commitment process is performed to verify a successful ending of the content transfer between the source device and the sink device. In the finalizing process, the sink device validates the downloaded content while the source device deletes the original content. Furthermore, each of the source device and the sink device destroys the key exchanged in the content transfer. During the block move mode, the move transfer process equivalent to a bulk content move transfer is performed by performing the commitment process. Since the same content cannot be present at both the source device and the sink device in duplication during the block move mode, the block move is considered to satisfy the requirement ruled in the DTCP specification.

Figure 11:
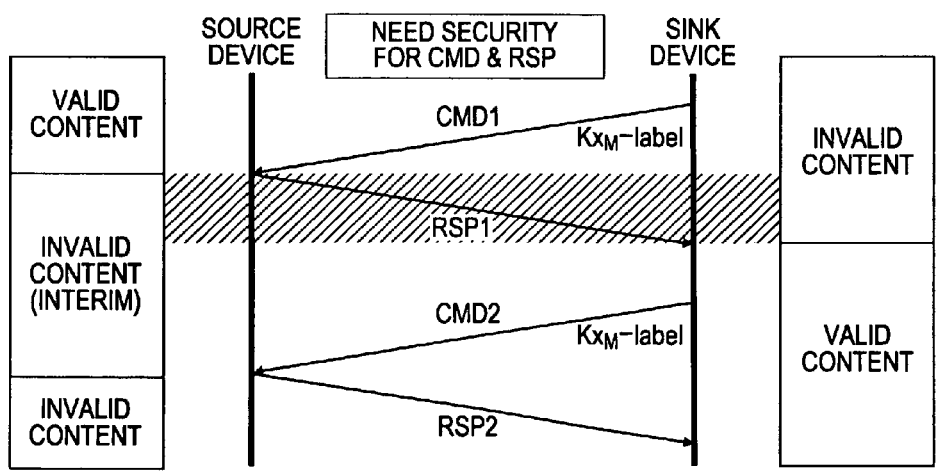
FIG. 11 illustrates an operational sequence of a move finalizing process performed between the source device and the sink device.

FIG. 11 illustrates an operational sequence of the move finalizing process performed between the source device and the sink device. The operation sequence is performed in each of steps S12 and S34 in the flowchart of FIG. 14B.

Upon receiving successfully the move content, the sink device then transmits a move finalizing command CMD1 (or MV_FINALIZE command) until a response is received from the source device.

On the other hand, upon receiving the move finalizing command CMD1 from the sink device, the source device returns a move finalizing response RSP1 to the sink device. The source device shifts the valid original content to an interim invalid state.

If the received RSP1 states that the source device has already completed the move transfer process, the sink device also completes the move transfer process. In response, the content moved from the source device is set from an invalid state to a valid state.

The sink device continuously transmits a next move finalizing command CMS2 (or MV_COMPLETE command) until a response is received from the source device. In response, the source device shifts the original content from the interim invalid state to an invalid state, and then returns a move finalizing response RSP2 to the sink device.

Figure 18:
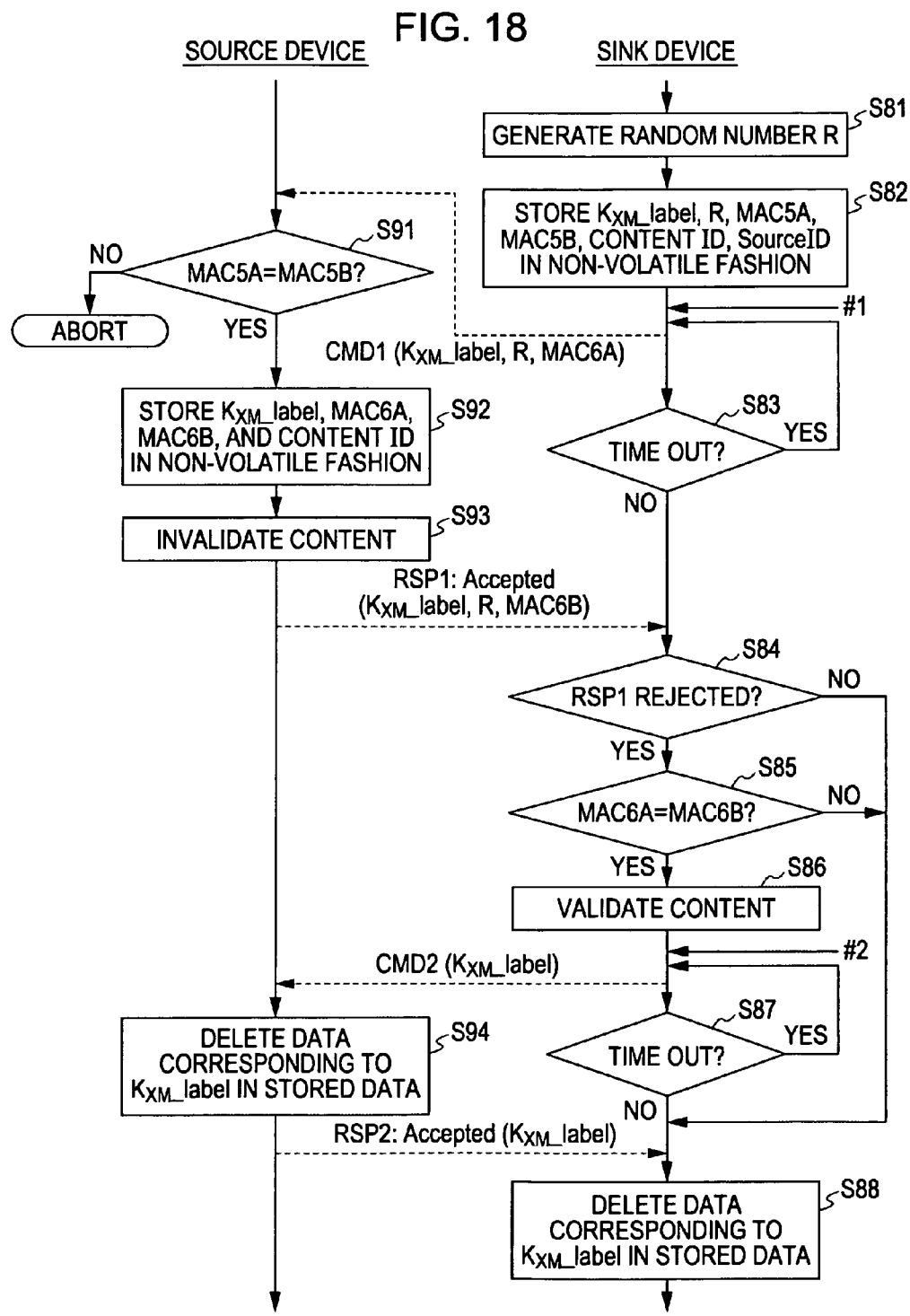
FIG. 18 specifically illustrates a process of each of the source device and the sink device in the download move transfer finalizing sequence of FIG. 11.

FIG. 18 is a flowchart illustrating a process of each of the source device and the sink device performed in the download move transfer finalizing sequence of FIG. 11.

The sink device generates a random number (step S81), and calculates message digests MAC5A and MAC6A by applying a predetermined calculation process on the random number. MAC5A is a value to be supplied to the source device and MAC6A is a value that is expected to be returned by the source device. Described below are the calculation equations of MAC5A and MAC6A where $K_{XM}$ corresponding to $K_{XM\_}$ label is used:

$$MAC5A = MAC5B = [SHA\text{-}1(MK+R)]_{msb80}$$

$$MAC6A = MAC6B = [SHA\text{-}1(MK+R)]_{lsb80}$$

$$MK = SHA\text{-}1(KX_M \| KX_M)$$

The sink device stores $K_{XM\_}$ label and the random number R, as a key ID, MAC5A, MAC6A, content ID of the moved content, and ID of the source device in a non-volatile fashion (step S82). By storing these pieces of data in a non-volatile fashion, a resume operation of the move transfer is allowed even if the content transfer finalizing process is interrupted due to a power failure, for example. Concurrent content invalidation at both the source device and the sink device is thus avoided.

The sink device transmits a move finalizing command CMD1 (or MV_FINALIZE command) including the $K_{XM\_}$ label and the random number R, and MAC5A to the source device. Until a response is received from the source device, the sink device continually transmits CMD1 each time reception time-out occurs (step S83).

Upon receiving the move finalizing command CMD1, the source device applies the predetermined calculation process on the random number R (as previously described), thereby calculating message digests MAC5B and MAC6B. MAC6B is a value to be supplied to the sink device, and MAC5B is a value that is expected to be acquired from the sink device. The source device matches MAC5B determined by the source device itself against MAC5A contained in CMD1, thereby checking the authenticity of the command (step S91). If the authenticity is not proved, the source device aborts the content transfer finalizing process. If there is a possibility that the sink device has sent CMD1 to an erroneous destination because of a change in the socket information of the source device, the source device may continuously wait on standby for CMD1 without aborting the process.

If the authenticity is proved, the source device stores $K_{XM\_}$label as the key ID, MAC6B, and the ID of the moved content in a non-volatile fashion (step S92). By storing these pieces of data in a non-volatile fashion, the resuming operation allowed even if the content transfer finalizing process is interrupted due to a power failure, for example. Concurrent content invalidation at both the source device and the sink device is thus avoided (as previously discussed).

The source device shifts the original content from the valid state to the interim invalid state (step S93), and then returns a move finalizing response RSP1 indicating an accepted CMD1.

Upon receiving the move finalizing response RSP1 from the source device, the sink device checks whether CMD1 has been rejected (step S84). If RSP1 is accepted, the sink device matches MAC6A held by the sink device against MAC6B contained in RSP1 (step S85). If both match each other, the content moved from the source device is shifted from the invalid state to the valid state (step S86).

The sink device then transmits a move finalizing command CMD2 (or MV_COMPLETE command) containing $K_{XM\_}$label as the key ID to the source device. The sink device continually transmits CMD2 each time reception time-out occurs until the sink device receives a response from the source device (step S87).

Upon receiving the move finalizing command CMD2, the sink device deletes data corresponding to $K_{XM\_}$label contained in CMD2 (step S94). The data herein includes $K_{XM\_}$label, MAC6B, and the content ID of the moved content stored in a non-volatile fashion in step S92. The source device returns a move finalizing response RSP2 to the sink device.

Upon receiving the move finalizing response RSP2, the sink device deletes data corresponding to $K_{XM\_}$label contained in RSP2 (step S88). The data herein includes $K_{XM\_}$label and the random number R, MAC5A, MAC6A, the content ID, and the source device ID stored in a non-volatile fashion in step S82.

The method of validating the content at the sink device subsequent to the end of the download move transfer is not limited to any particular method. If the content is validated at the sink device, the content encrypted and recorded in no more copies state by the content recorder becomes usable at the sink device (for example, the content encrypted at the recording may be decrypted). As a result, the encrypted content is supplied to the content reproducing block 31 to be converted (rendered) into vide and audio signals. Video and sound may thus be output from an AV unit such as a display. The sink device can now operate as a source device and move the no more copies content to another sink device in a download fashion, or in an upload fashion as will be described later.

The method of deleting the original content at the source device subsequent to the end of the download move transfer is not limited to any particular method. The entity of the content data may be deleted from the recording medium such as a hard disk having stored the content. Alternatively, the entity of the content recorded in the encrypted state may be left but the decrypting key may be inhibited in use.

Even if the entity of the content has been successfully moved from the source device to the sink device in a download fashion, the download move finalizing process of FIG. 11 can be interrupted due to a power failure in one of the devices. In such a case, the interruption of the download move finalizing process can disable each of the source device and the sink device from using the moved content. The content transfer system of one embodiment of the present invention permits a content move finalizing process resuming process to be performed, thereby finalizing the commitment process safely. The resuming process prevents an already performed portion of the content move transfer process from becoming useless while also preventing the content from becoming useless at both the source device and the sink device.

To allow the resumption of the download move finalizing process, each of the source device and the sink device stores data required to resume the download move finalizing process on a non-volatile memory such as NVRAM when the finalizing process of the download move transfer starts. When CMD1, namely, MV_FINALIZE command is issued, the sink device stores, in a non-volatile fashion, data to be transmitted in the command, including $K_{XM\_}$label, the random number R, MAC5A, MAC6A, the ID of the download moved content (corresponding to an object ID of CDS), the ID of the source device (corresponding to UUID of UpnP®) (see step S82 in FIG. 18). The source device stores, in a non-volatile fashion, $K_{XM\_}$label as the key ID, MAC5B, and MAC6B (see step S92 in FIG. 18). The resuming process is initiated by the sink device in principle.

By storing UUID defined in UPnP Device Architecture, the sink device can find a source device as a CDS request destination. By storing an object ID defined UPnP AV CDS2, the sink device can specify content to be moved. When an interrupted move transfer process is resumed, the sink device can acquire the socket information for the content to be moved by performing UPnP CDS process in the same way as in the initial selection of the content. For example, there are not problems even if the IP address of the source device has changed at the resumption subsequent to a power failure.

Figure 29:
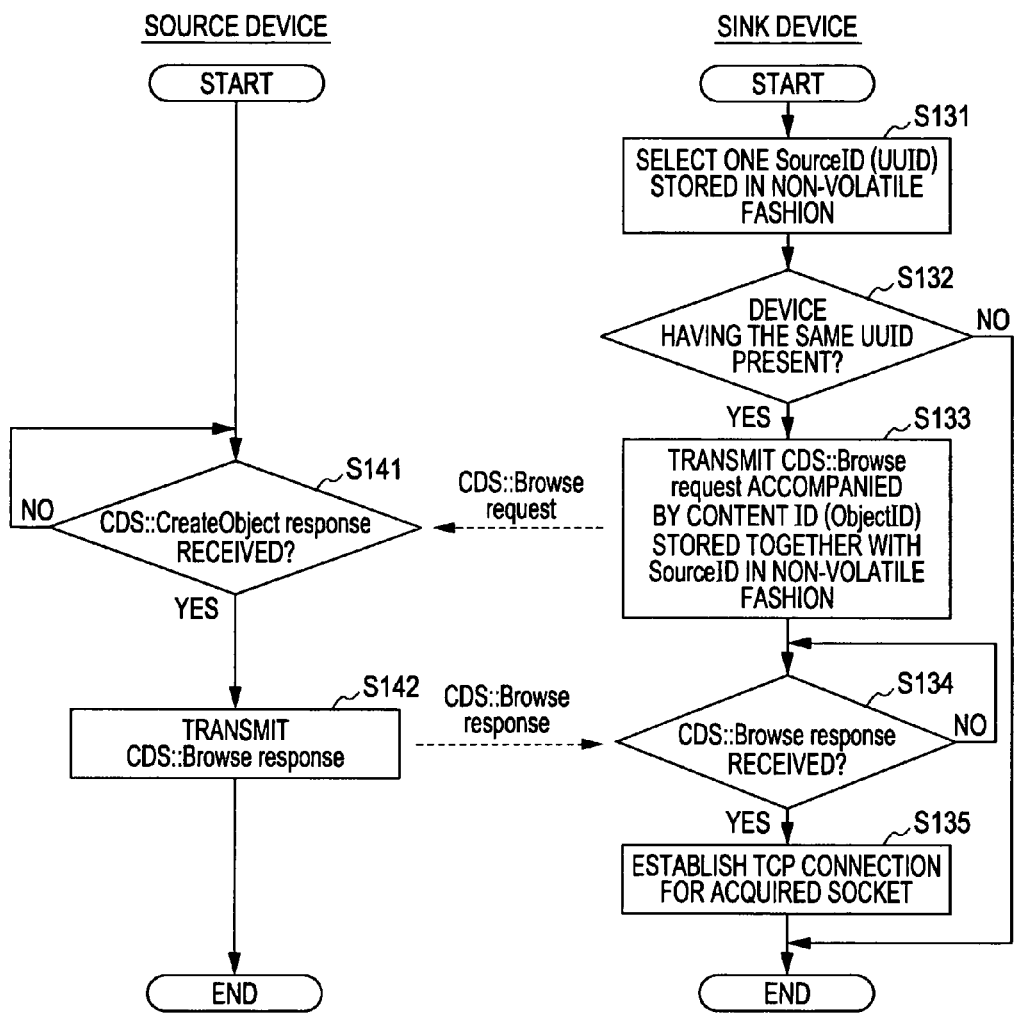
FIG. 29 is a flowchart illustrating a process that establishes a transmission control protocol (TCP) connection between the source device and the sink device when the move transfer finalizing process is resumed after an interruption in a download move sequence.

After acquiring the socket information of the content to be moved, the sink device establishes a TCP connection with the corresponding source. FIG. 29 is a flowchart illustrating a process that is performed to establish a TCP connection between the source device and the sink device when the move finalizing process is resumed.

The sink device selects one SourceID (UUID) from among IDs stored in a non-volatile fashion (step S131), and then checks whether any device having the same UUID is present using device finding protocol (SSDP) of UPnP (step S132). If any device having the same UUID is not present, subsequent steps are skipped to complete the routine.

If a device having the same UUID is present (yes in step S132), the sink device transmits to that device a CDS::Browse request with object ID specified (step S133).

Upon receiving the CDS::Browse request from the sink device (step S141), the source device returns a CDS::Browse response containing information representing that the content move transfer process of the corresponding content has not yet been completed (step S142).

An unfinished content move finalizing process may be indicated by not including attribute information representing that the content is movable, by not including a URL to which the HTTP get request should be transmitted, or by including attribute information that the move transfer process is in progress.

Upon receiving the CDS::Browse response (step S134), the sink device references the socket information contained in the message, and establishes a TCP connection for AKE command such as CMD1 or CMD2.

The sink device establishes the TCP connection for the AKE command, and references the K×M_label and the random number R, as the key ID, and MAC5A stored in a non-volatile fashion and then transmits CMD1 (MV_FINALIZE command) or CMD2 (MV_COMPLETE command) to the source device. In response, the source device returns the response RSP1 responsive to CMD1 or the response RSP2 responsive CMD2 using $K_{XM\_}$label and MAC6B stored in a non-volatile fashion. The finalizing process of the download move transfer is thus completed between the source device and the sink device.

Figure 19:
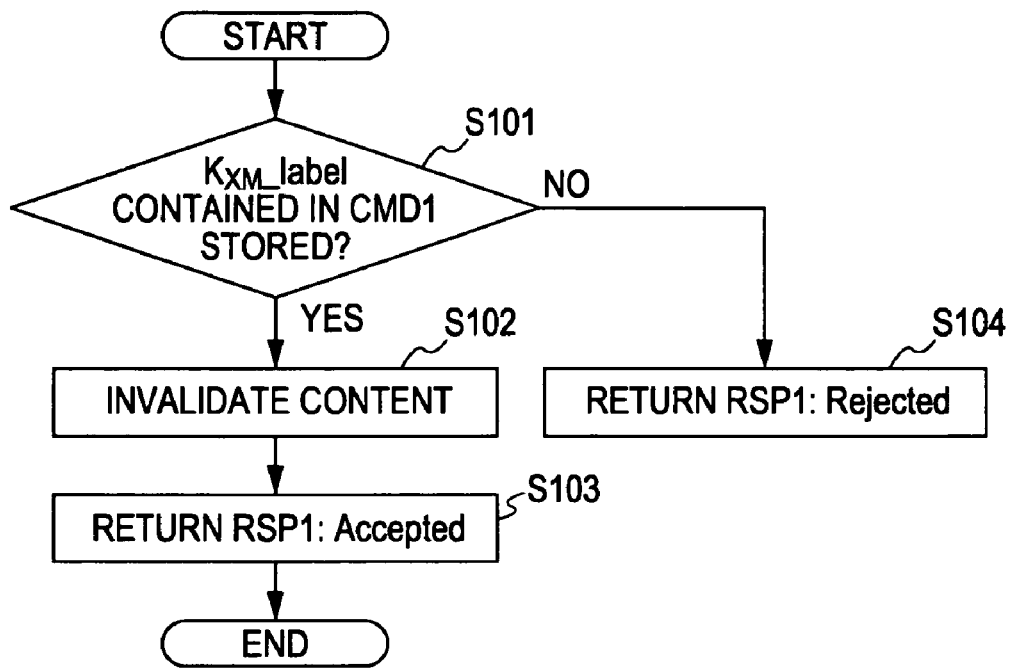
FIG. 19 is a flowchart illustrating a process to resume the download move transfer finalizing process, once interrupted, at the source device operating as an HTTP server.

FIG. 19 is a flowchart illustrating a process of the source device that receives a move finalizing command CMD1 from the sink device after the finalizing process of the download move transfer of FIGS. 11 and 18 is interrupted for any reason.

The source device determines whether the source device has stored the $K_{XM\_}$label contained in the move finalizing command CMD1 in a non-volatile fashion (step S101).

If $K_{XM\_}$label is not stored, the source device may possibly have completed the content move finalizing process or may be unrelated to CMD1. The source device thus returns a move finalizing response RSP1 indicating that the command is rejected (step S104).

Since the storage of $K_{XM\_}$label at the source device means that the content move finalizing process has been interrupted, the source device shifts the original content indicated by the content ID in CMD1 to an interim invalid state (step S102). The source device then returns the move finalizing process response RSP1 indicating that CMD1 has been accepted (step S103). The move finalizing process, subsequent to interruption, is resumed by the source device operating as an HTTP server.

Figure 20:
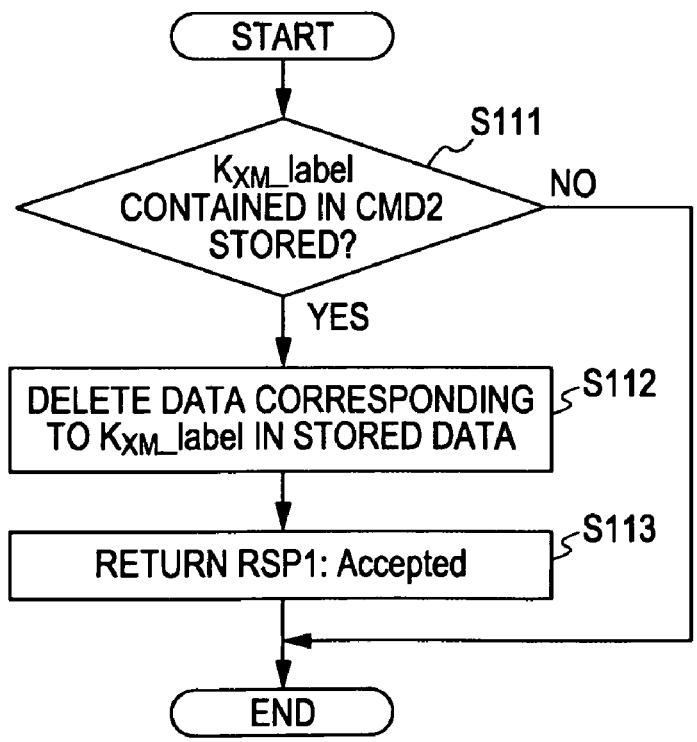
FIG. 20 is a flowchart illustrating a process to resume the download move transfer finalizing process, once interrupted, at the source device operating as the HTTP server.

FIG. 20 is a flowchart illustrating a process of the source device that receives the move finalizing command CMD2 from the source device after the finalizing process of the download move transfer of FIGS. 11 and 18 is interrupted for any reason.

The source device determines whether the source device has stored the $K_{XM\_}$label contained in the move finalizing command CMD2 in a non-volatile fashion (step S111).

If $K_{XM\_}$label is stored, the content move finalizing process may have been interrupted. The sink device deletes data stored in association with $K_{XM\_}$label (namely, MAC6B and the ID of the moved data)(step S112), and returns a move finalizing response RSP2 indicating that CMD2 has been accepted (step S113).

If $K_{XM\_}$label is not stored, the source device skips step S112, and returns a move finalizing response RSP2 indicating that CMD2 has been accepted, because the source device may have completed the content move transfer finalizing process or may be unrelated to CMD2. The move finalizing process, subsequent to the interruption, is resumed by the source device operating as an HTTP server.

Figure 21:
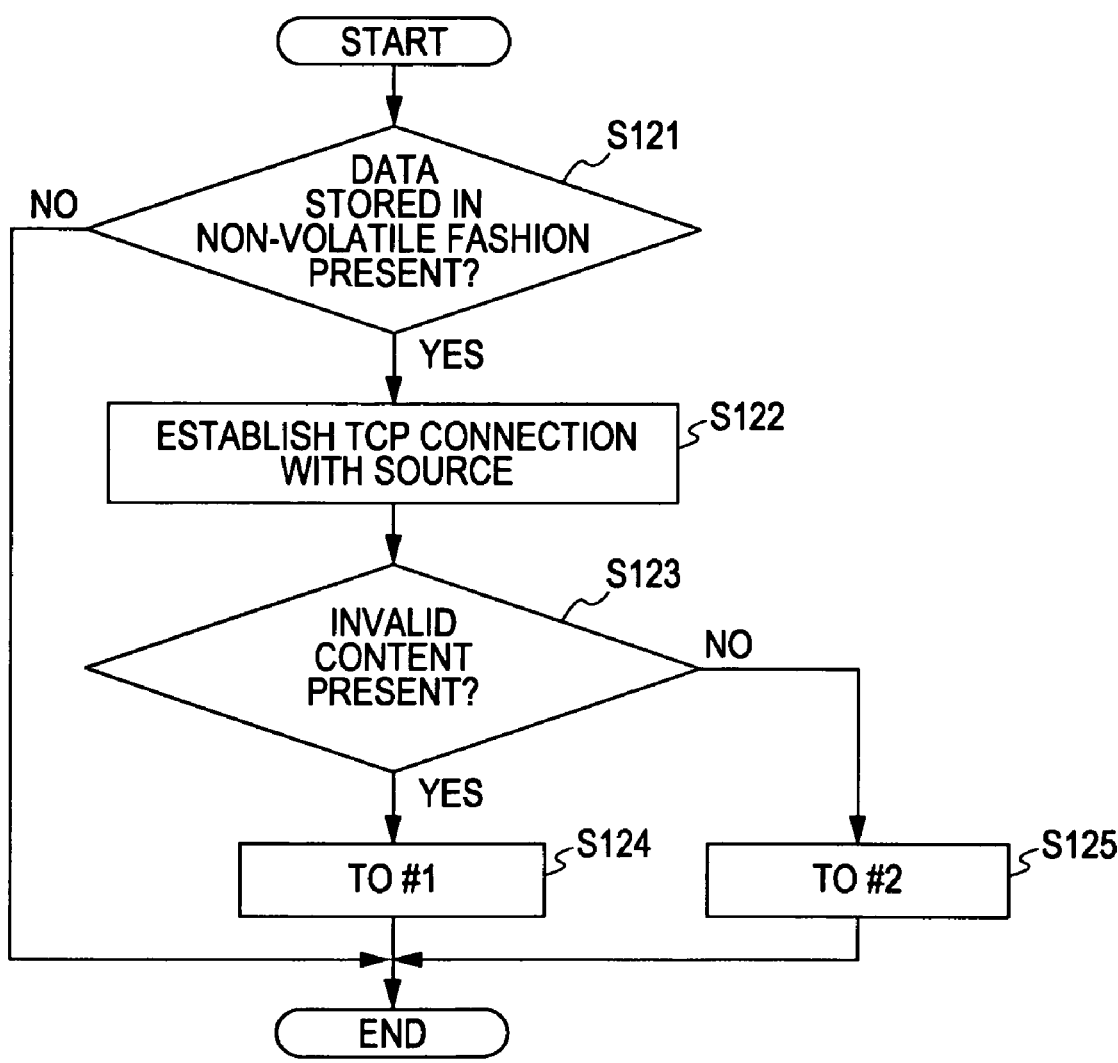
FIG. 21 is a flowchart illustrating a process to resume the download move transfer finalizing process, once interrupted, at the sink device operating as an HTTP client.

FIG. 21 is a flowchart illustrating a process of the sink device that resumes the move finalizing process after the finalizing process of the download move transfer of FIGS. 11 and 18 is interrupted for any reason.

The sink device detects the presence of the data stored in a non-volatile fashion in step S82, namely, $K_{XM\_}$label and the random number R as the key ID, MAC5A, MAC6A, the content ID, and the source ID (step S121). This means that the content move finalizing process is interrupted with the commitment process with the source device unfinished, and that these pieces of data are not deleted but remain.

To resume the content move finalizing process, the sink device establishes a TCP/IP connection with the corresponding source device (step S122).

The sink device determines whether the content indicated by the content ID is in an invalid state (step S123).

The content in an invalid (yes in step S123) means that the content move finalizing process is interrupted prior to the reception of the move finalizing response RSP1 from the source device. Processing jumps to an entry point #1 of the flowchart of FIG. 18 (step S124) to start the commitment process with the source device.

The content in a valid state (no in step S123) means that the content move finalizing process is interrupted prior to the reception of the move finalizing response RSP2 but subsequent to the commitment received from the source device. Processing jumps to an entry point #2 of the flowchart of FIG. 18 (step S125) to transmit the move finalizing command CMD2 to the source device. In this way, the move finalizing process, once interrupted, is resumed at the sink device operating as an HTTP client.

The resuming process of the move transfer sequence of FIGS. 19 through 21 prevents the content move transfer process from becoming useless while also preventing the content from being invalidated at both the source device and the sink device.

The source device returns the move finalizing response RSP2 or shifts the original content from the interim invalid state to a full invalid state in response to a user operation input for invalidation.

Figure 12:
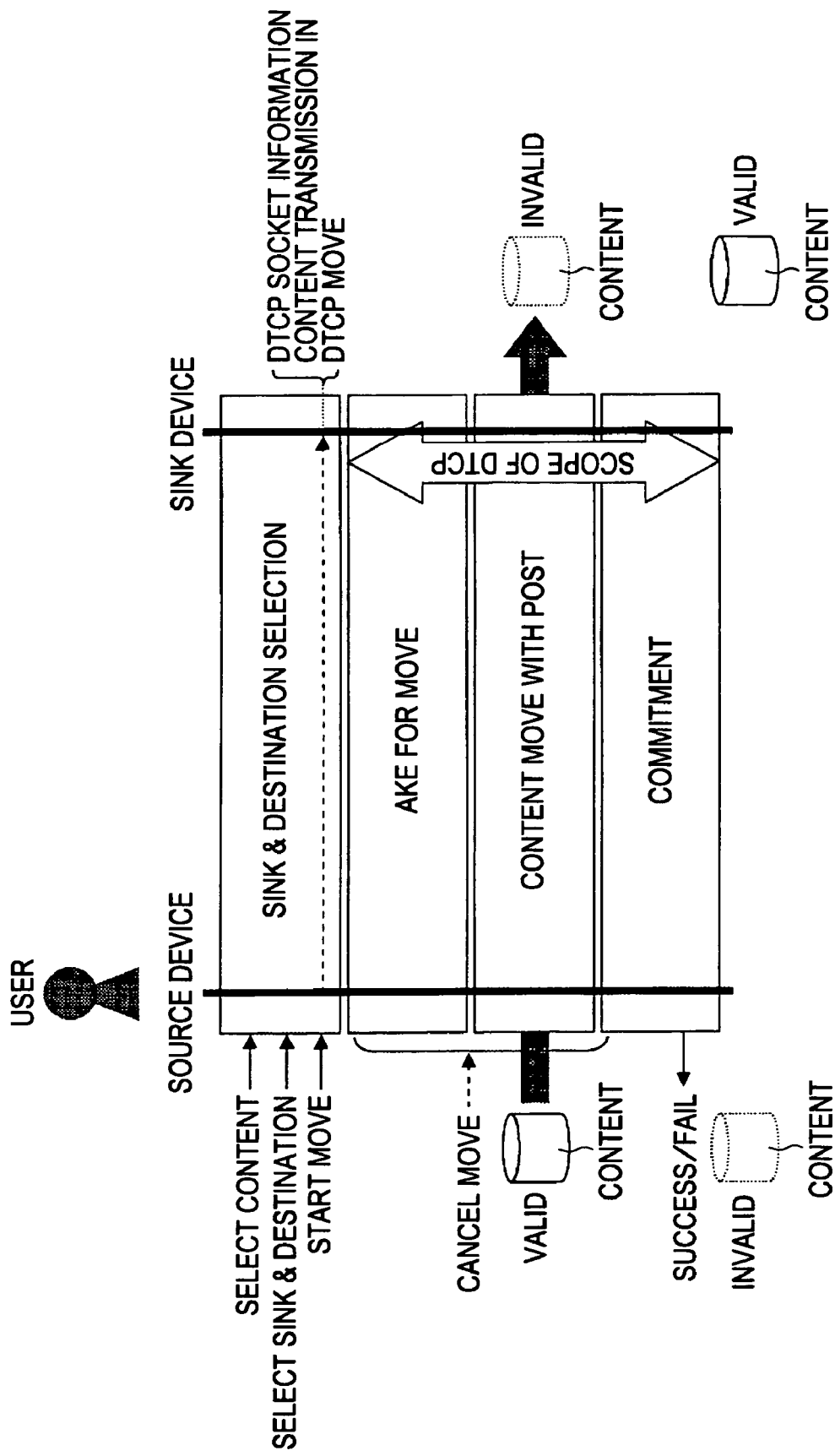
FIG. 12 illustrates an operational sequence that is performed when a move transfer is performed in an upload fashion between the source device and the sink device.

FIG. 12 illustrates an operational sequence of the block move performed between the source device and the sink device in an upload fashion. As the download move transfer process, the upload move transfer process is performed in four phases, namely, a selection phase of a source device and content, a move AKE phase, a content move transfer phase, and a move finalizing phase. The move AKE phase, the content move transfer phase, and the move finalizing phase are executed in the order sequence defined in the DTCP specification.

In the sink device and content selection phase, the user has selected the content and has selected the sink device as the content destination. The source device notifies the sink device of the socket information for authentication and key exchange of the content to be DTCP moved. In succession, the move transfer process of the selected content starts.

Figure 13:
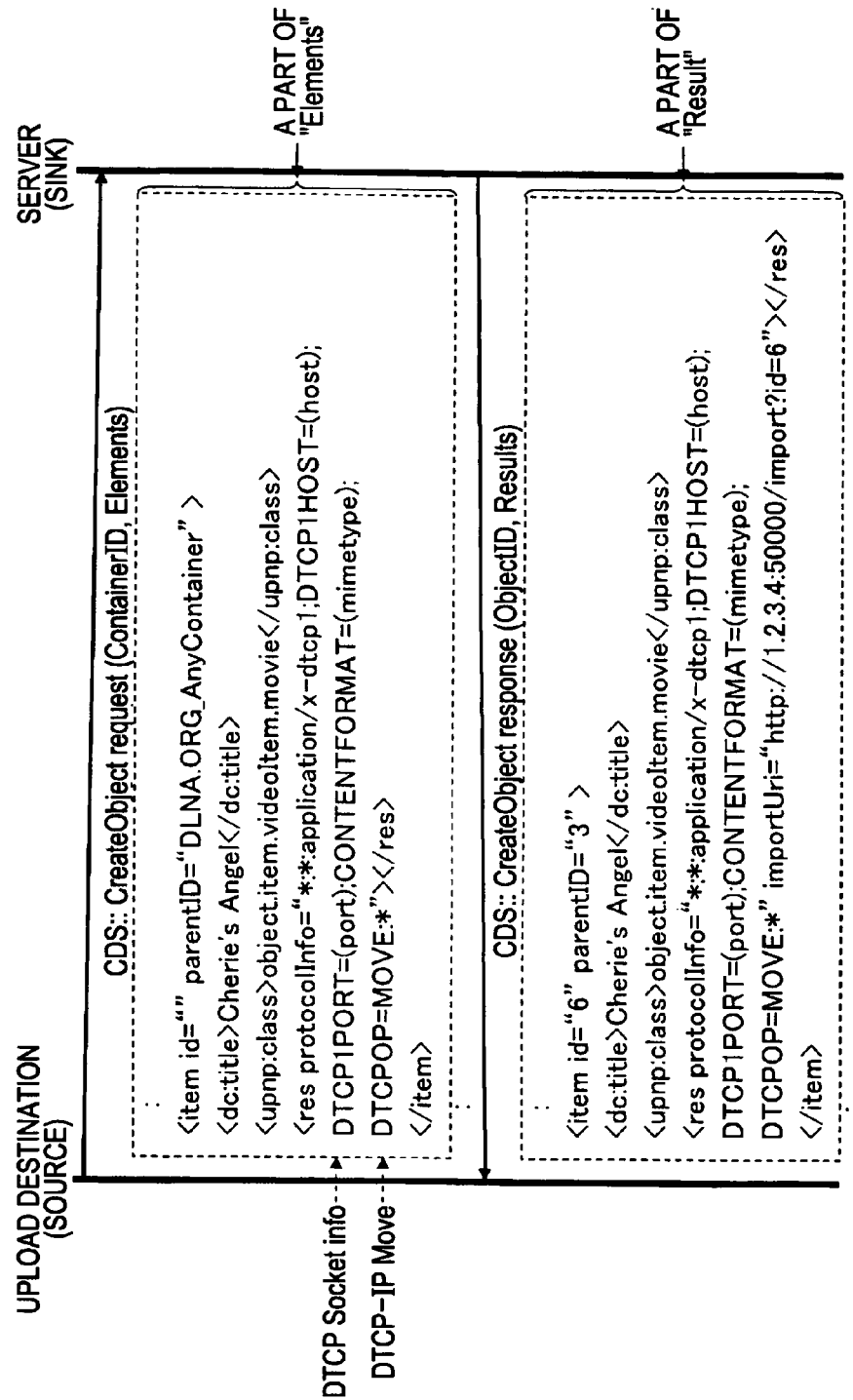
FIG. 13 illustrates an operational sequence in which the source device notifies the sink device of an upload of content using a UPnP based CDS when the move transfer is performed in an upload fashion between the source device and the sink device.

The source device notifies the sink device of the socket information using UPnP based CDS. FIG. 13 illustrates the operational sequence performed between the source device and the sink device in this case.

To request the sink device to perform the upload move transfer, the source device issues a CDS::CreateObject request to produce a storage location of the content to be transmitted. Within the range of the CDS::CreateObject request, the source device describes on a per content to be moved that the content move transfer is performed in accordance with the title of content, content UPnP® class, socket information for authentication and key exchange, and DTCP-IP move procedure. Item ID and parent ID for identifying the content, and content ID remain undermined in the request, but the sink device as an HTTP server determines the item ID, the parent ID, and the content ID. The sink device notifies the source device operating as an HTTP client of the item ID, the parent ID, and the content ID using a CDS::CreateObject response. As shown in FIG. 13, the source device writes a character string "DTCP1HOST=(host); DTCP1PORT=(port)" as the socket information at a third field of res protocolInfo attribute, and also a character string "DTCPOP=MOVE" indicating that the content is transmitted in accordance with the DTCP-IP move transfer sequence.

If attribute information temporarily used during the upload move transfer, such as DTCPOP, is contained in the res@protocolInfo attribute, such attribute information needs to be removed when the sink device as an HTTP-server transmits res@protocolInfo in the CDS::Browse request. As a result, processing becomes complicated. The attribute information may be transmitted in a new attribute separate from protocolInfo. More specifically, a res@dtcp:uploadInfo attribute may be arranged to indicate whether the content is to be moved. The res@dtco:uploadInfo attribute has a field of 32 bits, and the bit definition is as follows: if 1 is written on bit 30, 1 is also written on bit 31, and the sink device neglects backup bit fields:

bit 31: transmitted in move transfer in accordance with DTCP;
bit 30: block move protocol satisfying requirements ruled in the DTCP specification is used; and
bits 29-0: backup bits.

Here, 32 bits of the res@dtcp:uploadInfo attribute is represented in hexadecimal notation. The res@dtcp:uploadInfo attribute in the CDS::CreateObject request is described below:

<res protocolInfo="*:*:application/x-dtcp1; CONTENT-FORMAT=(mimetype):*">dtcp:uploadInfo="C0000000"/>

Upon receiving the CDS::CreateObject request, the sink device determines whether to move the socket information for authentication and key exchange of the source device serving as a content source and the content. To accept the upload move request from the source device, the sink device creates a storage location of the content (i.e., import destination) in a local memory area and returns to the source device the CDS::CreateObject response containing the storage location information. As shown in FIG. 13, the source device writes a character string "http://1.2.3.4:5000/import?id=6" indicating the import destination of the content to be moved in an importUri attribute in the res@protocolInfo attribute. To indicate the acceptance of the move transfer using the res@dtcp:uploadInfo attribute, the CDS::CreateObject response is described as follows:

<res protocolInfo="*:*:application/x-dtcp1; DTCP1HOST=(host);DTCP1PORT=(port);CONTENT-FORMAT=(mimetype):*"> importUri="http://1.2.3.4/import?id=6"dtcp:uploadInfo="C0000000"/>

The source device does not receive error but the CDS::CreateObject response, and determines that the content is movable to the sink device, and reserves the storage location of the content. The upload move transfer process of the selected content thus starts.

Prior to the move transfer, a move AKE procedure for authentication and key exchange between the source device and the sink device is performed. The operational sequence for the move AKE procedure has previously discussed with reference to FIGS. 10, 16, and 17. However, in response to the MV-CHALLENGE command, a scrambling method different from the ordinary AKE procedure is used to prevent the move transfer from being spoofed by copy transfer (as previously discussed).

The move AKE procedure may be the operational sequence of FIG. 27. In this case, the sink device initializes the download move transfer using the move protocol for transmitting the MV-INITIATE command, thereby initiating the MOVE RTT-AKE process. In the RTT-AKE process, mutual authentication is performed in accordance with a challenge-response procedure as in the standard AKE procedure. Key is thus exchanged in response to an MV_EXCHANGE_KEY command (as previously discussed).

When the move AKE process is completed, the content move transfer process starts. To move the content to the sink device in response to a user operation at the source device, the source device operates as an HTTP client while the sink device operates as an HTTP server. The content is thus moved in an upload fashion using the HTTP protocol. More specifically, the source device as the HTTP client transmits an HTTP post request, and the sink device as the HTTP server returns an HTTP post response. The content selected in the content selection phase is thus moved in an upload fashion from the source device to the sink device. The word post refers to an HTTP method for transmitting a request to transmit information to a particular URI as known in the known art.

To move in an upload fashion the content through the HTTP protocol, the source device sets C1 to the E-EMI mode (i.e., move mode as shown in Table 1). The sink device does not handle the received content as content to be moved if an E-EMI mode other than C1 is received as previously discussed.

The source device starts the upload move transfer process by transmitting the HTTP post request having a header containing "MOVE.dtcp.com:<$K_{XM}$_label>" (or "BLK-MOVE.dtcp.com" instead of "MOVE.dtcp.com). The source device encrypts the requested content with the encrypting key $K_c$ acquired from the key $K_{XM}$ for move corresponding to $K_{XM}$_label, sets E-EMI to C1, and then transmits the resulting content as a subsequent post request.

Figure 15A:
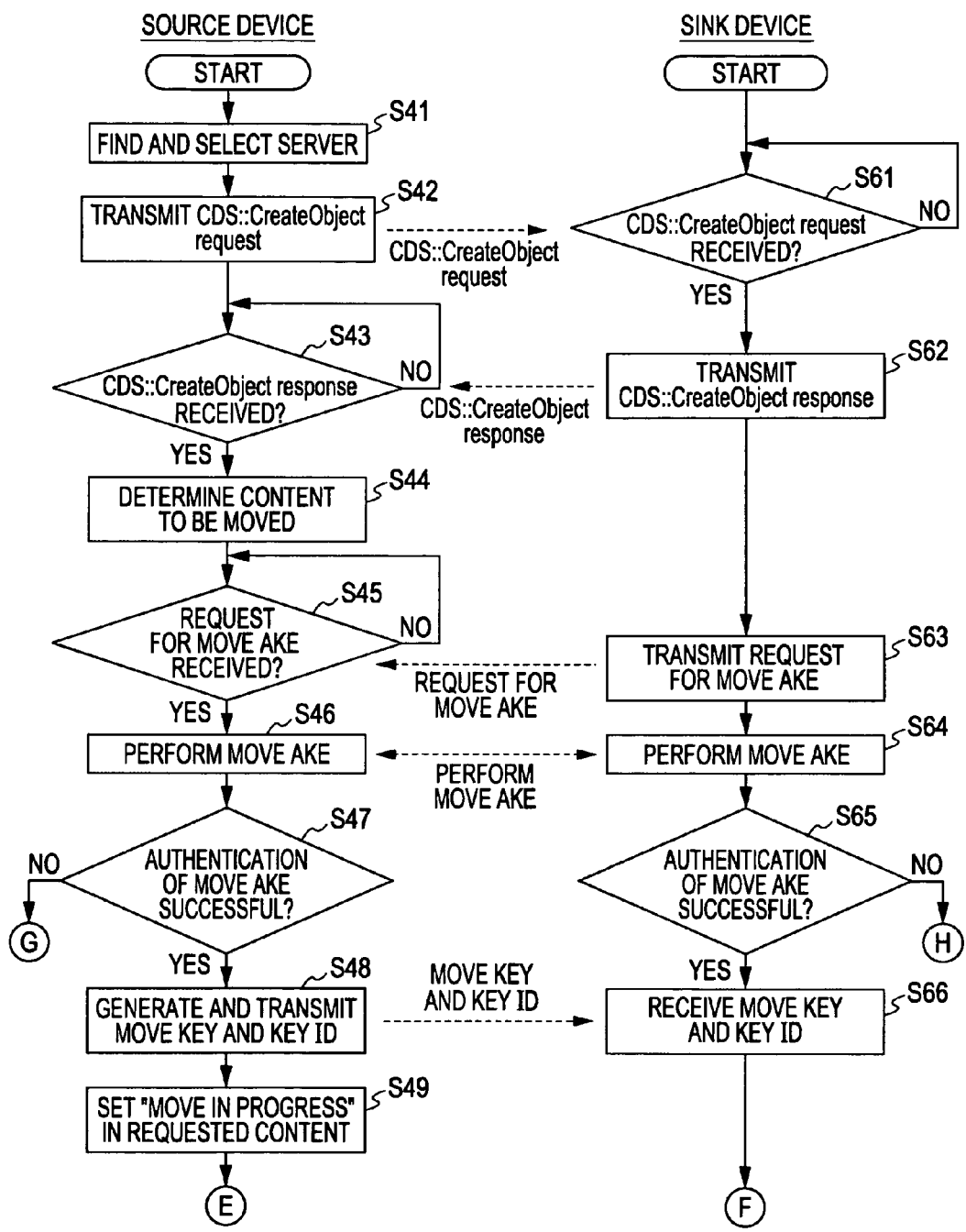
FIG. 15A is a flowchart illustrating of a process performed by each of the source device and the sink device when the source device moves the content to the sink device in an upload fashion.
Figure 15B:
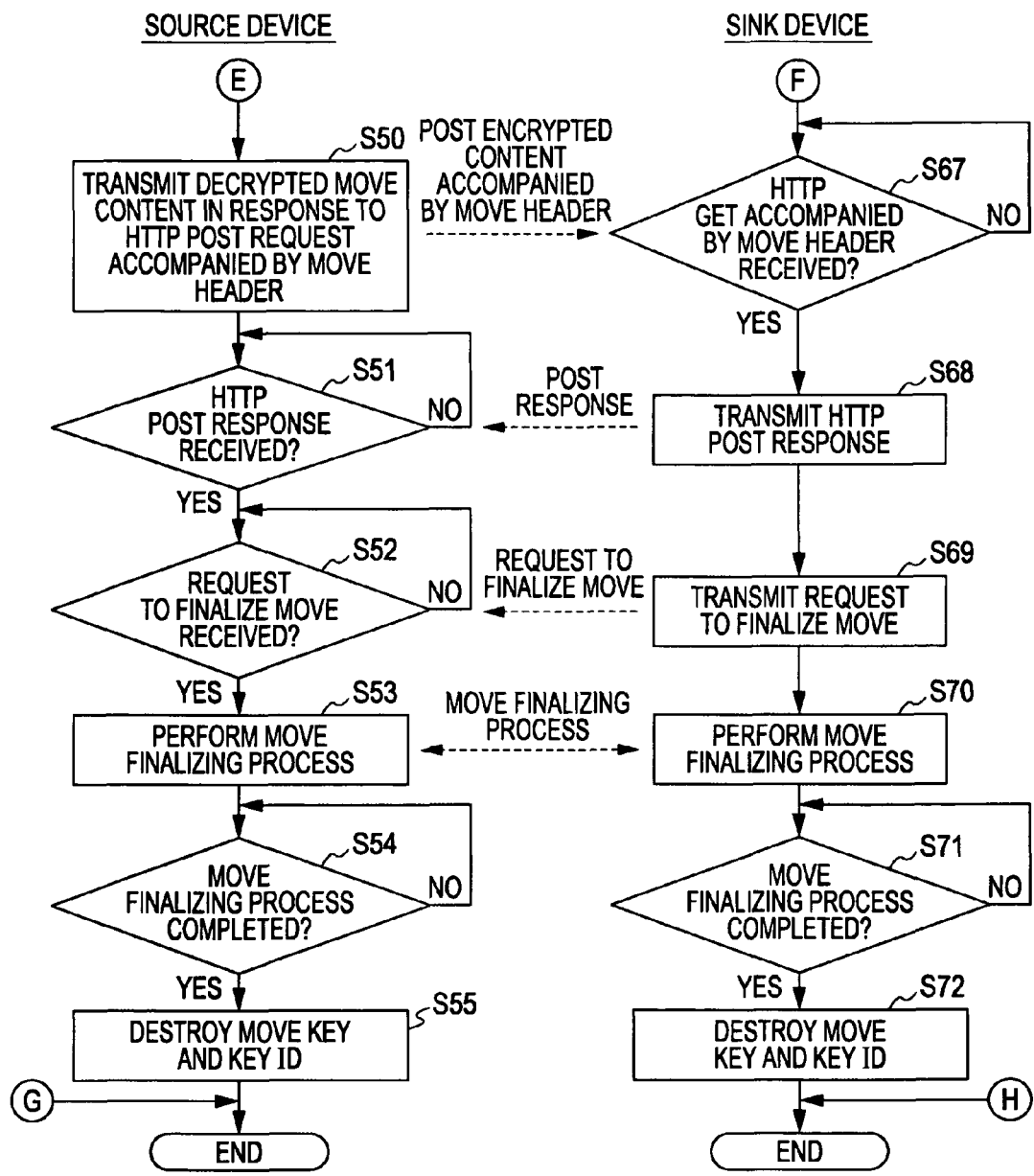
FIG. 15B is a continuation of the flowchart of FIG. 15A.

FIGS. 15A and 15B are flowcharts of a process of each of the source device and the sink device to move the content from the source device as an HTTP client to the sink device as an HTTP server in the upload move transfer process.

The source device detects a sink device operating as a server as a content upload destination (step S41), transmits to the sink device a CDS::CreateObject request to request the sink device to create a storage location of the content (step S42), and then waits on standby for a response (step S43).

Upon receiving the CDS::CreateObject request from the source device (step S61), the sink device returns the response in reply to the request (step S62).

Upon receiving the CDS::CreateObject response from the sink device, the source device determines the content to be moved (step S44), and then waits on standby for a move AKE request (step S45).

Upon receiving the CDS::CreateObject response, the sink device requests the source device to perform the move AKE process (step S63).

The move AKE process starts between the source device and the sink device, and is executed (steps S46 and S64). If the move AKE authentication is successful (steps S47 and S65), the source device generates and then transmits a key and a key ID to the sink device (step S48). The sink device receives the key and key ID from the source device (step S66). If the move AKE authentication is unsuccessful between the source device and the sink device, each of the source device and the sink device skips subsequent steps and terminates the routine.

The source device sets a "move in progress" flag in the content to be uploaded to the sink device (step S49), and encrypts the content with the key for move, and transmits the encrypted content using the HTTP post request accompanied by the header information "MOVE.dtcp.com:"$K_{XM}$_label>" (step S50). If the "move in progress" flag is set, the corresponding content is shifted into a locked state. The source device waits on standby for an HTTP post response from the sink device (step S51).

Upon completing the move AKE procedure, the sink device waits on standby for the HTTP post request from the source device (step S67). The sink device receives the request and all the encrypted content, and returns the HTTP post response to the source device (step S68).

If the encrypted content is successfully uploaded from the source device to the sink device, the source device waits on standby for a move finalizing request from the sink device (step S52). The sink device transmits the move finalizing request to the source device (step S69). The source device and the sink device respectively perform the move finalizing process (steps S53 and S70), i.e., the sink device validates the content while the source device invalidates the original content. The operational sequence of the move finalizing process between the source device and the sink device has already been discussed with reference to FIGS. 11 and 18.

The source device and the sink device respectively complete the move finalizing process (steps S54 and S71), destroying respective keys and key IDs (steps S55 and S57) to terminate the routine.

The content to be moved is locked to exclude another sink device from placing a move request during the upload move transfer process of FIGS. 15A and 15B. The occurrence of multiple moves is thus prevented. When the content is moved in an upload fashion, the sink device operates as a server. The previously described Table 2 may be used to manage each content as to whether the move of the content is in progress.

While the upload move transfer process is performed in the block move, the sink device cannot use the content except rendering the content on a real-time basis because the content is not yet validated. The rendering mechanism has already been discussed with reference to FIG. 7.

Interruption processes for interrupting the move transfer, such as cancel or abort, can be initiated during the move AKE process and the content move transfer process. The interruption process will be described in detail later.

If the source device has successfully downloaded the desired content to the predetermined sink device operating as the HTTP server using the HTTP post request, the finalizing process of the upload move transfer is performed. The sink device validates the uploaded content while the source device deletes the original content. The move finalizing process is performed in accordance with the same operational sequence as the one discussed with reference to FIGS. 11 and 18.

The method of validating the content at the sink device subsequent to the end of the upload move transfer is not limited to any particular method. If the content is validated at the sink device, the content encrypted and recorded in no more copies state by the content recorder becomes usable at the sink device (for example, the content encrypted at the recording may be decrypted). As a result, the encrypted content is supplied to the content reproducing block 31 to be converted (rendered) into vide and audio signals. Video and sound may thus be output from an AV unit such as a display. The sink device can now operate as a source device and move the no more copies content to another sink device in a download fashion, or in an upload fashion as will be described later.

The method of deleting the original content at the source device subsequent to the end of the upload move transfer is not limited to any particular method. The entity of the content data may be deleted from the recording medium such as a hard disk having stored the content. Alternatively, the entity of the content recorded in the encrypted state may be left but the decrypting key may be inhibited in use.

If, after receiving content from the source device in the upload move transfer, the sink device as a source device provides the content, the sink device needs to delete DTCPOP=MOVE in res tag (or res@dtcp: uploadInfo attribute) and modify a host name and port of the socket information to those of the sink device. To permit another sink device to move out the content, the sink device adds an allowedUse attribute containing in the res tag a character string "MOVE:1" indicating that the content is movable (or adds the above-described DTCP.COM_FLAGS parameter to the fourth field of the res@protocolInfo attribute).

In the operational sequence of FIG. 13, the source device notifies the sink device of the socket information (DTCP socket Info) required for the sink device to establish a TCP/IP connection for the move AKE procedure using the CDS::CreateObject request. However, when the move finalizing process is resumed subsequent to interruption, this notification requires that the source device issue again the CDS::CreateObject request for the upload move transfer of the same content to notify of the socket information. This can violate the requirement of the DTCP specification that the move transfer be permitted only once.

The inventors of this invention proposes another notification method other than the notification method of FIG. 13. Prior to the move AKE procedure but subsequent to the process of CDS::CreateObject, socket information (DTCP socket Info) is written in a header of the HTTP post request for the source device to notify the sink device of the socket information. For example, the socket information is written in a content-type header as follows:

Content-Type:application/x-dtcp1: DTCP1HOST=<host>; DTCP1PORT=<port>; CONTENTFORMAT=<mimetype>

Since the content is not decrypted until the completion of the AKE procedure, the source device does not transfer the content using the post request. The source device transfers the content after the completion of the AKE procedure. The HTTP post request notifying of the socket information may not be necessarily accompanied by the content. Unlike the process of FIG. 13, the transfer of the socket information with the CDS::CreateObject is not necessary.

Figure 30:
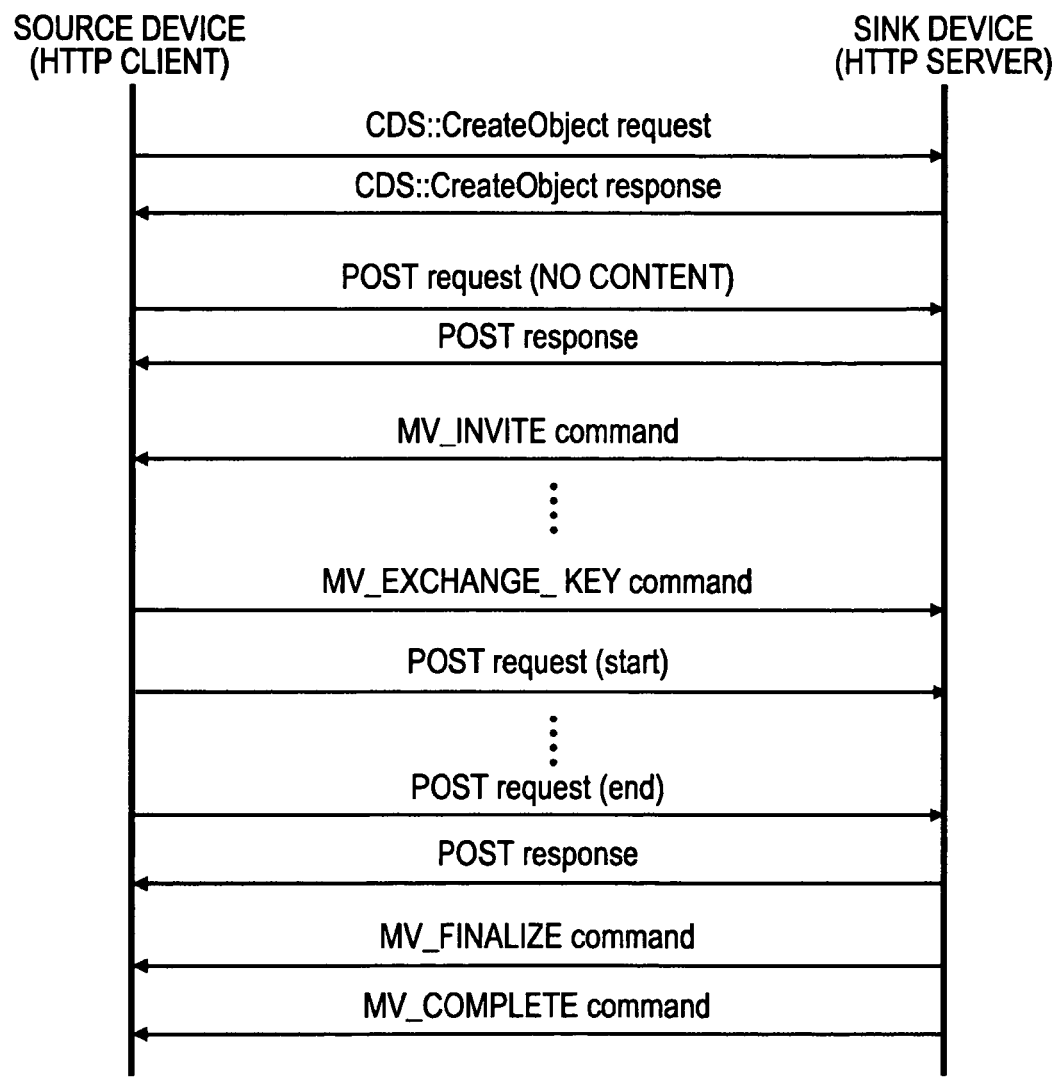
FIG. 30 illustrates an operational sequence to perform an upload move transfer between the source device and the sink device (when the source device notifies the sink device of socket information using a post request)

FIG. 30 illustrates an operational sequence of the upload move transfer performed between the source device and the sink device wherein the source device notifies the sink device of the socket information using the post request.

Using the CDS::CreateObject request, the source device requests the sink device to create an object as a content transfer destination. In this case, the source device requests a move-based transaction in the res@uploadInfo attribute from the sink device. In reply, the sink device returns an HTTP post URI in the res@importUri attribute in the CDS::CreateObject response.

The source device transmits an HTTP post request responsive to the URI acquired from the CDS::CreateObject response, thereby notifying the sink device of the socket information for authentication and key exchange. The socket information is transmitted in the content type header. The HTTP post request used to notify of the socket information includes no content.

Upon receiving the socket information, the sink device establishes a TCP/IP connection for authentication and key exchange. The sink device transmits an MV-INITIATE command, thereby initiating the move RTT-AKE process to initialize the upload move transfer.

When the move RTT-AKE process ends, the source device transfer the encrypted content by transmitting the HTTP post request containing the BLKMOVE.dtcp.com header information.

Upon receiving all the move content, the sink device transmits an MV_FINALIZE command to initiate the move finalizing process. The move finalizing process is executed in accordance with the operational sequence of FIG. 11.

Figure 31:
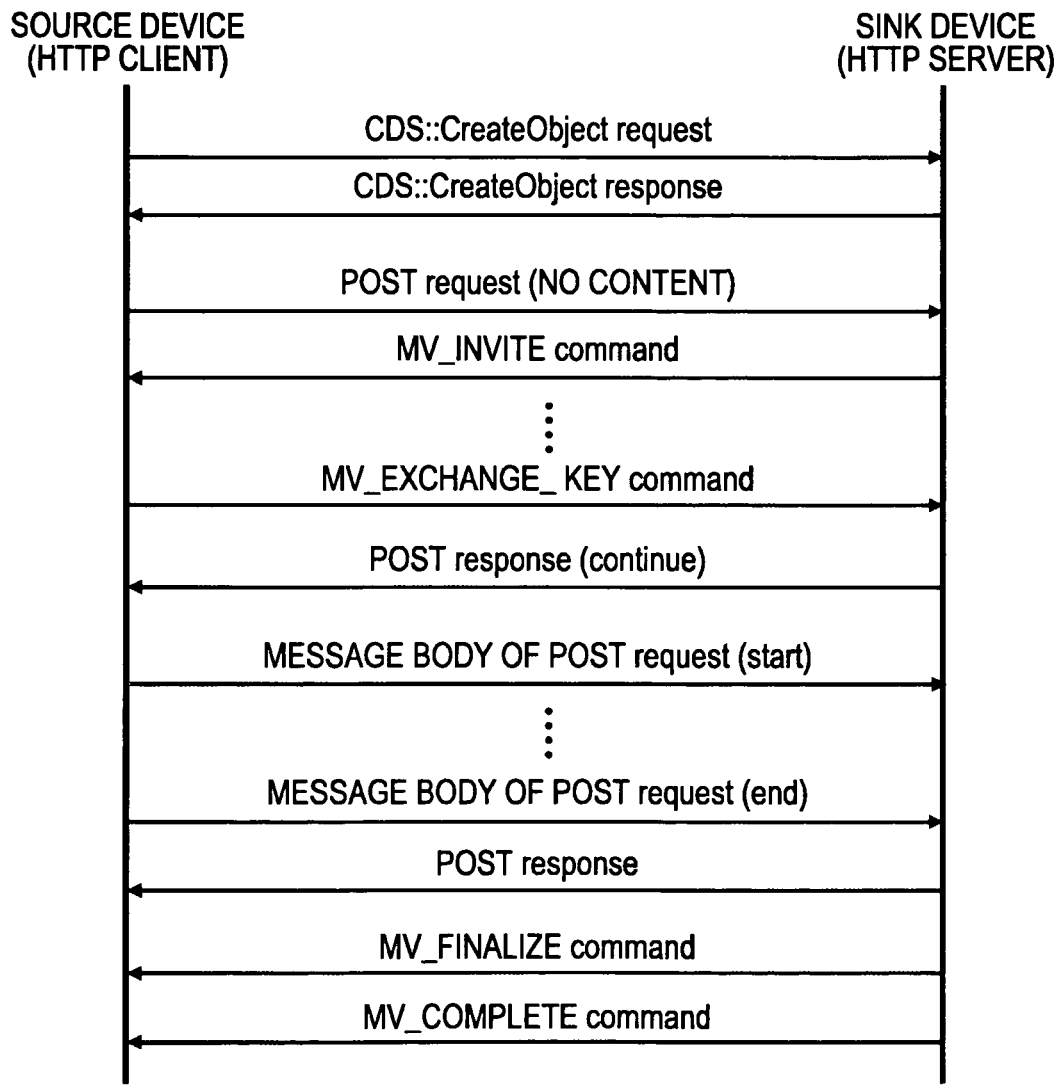
FIG. 31 illustrates an operational sequence to perform the upload move transfer between the source device and the sink device (when the sink device returns the post response, subsequent to the AKE procedure, in response to the post request accompanied by the socket information transmitted from the source device, and the source device transmits a message body corresponding to the post request)

As shown in FIG. 31, the source device may transmit the socket information in the post request header accompanied by no content, and the sink device may establish the TCP/IP connection for authentication and key exchange, and return a post response after the end of the AKE procedure. In such an operational sequence, $K_{XM\_}$label shared in the AKE procedure is transmitted from the sink device in the post response using a MOVE.dtcp.com (or BLKMOVE.dtcp.com) header, such as in "MOVE.dtcp.com:<$K_{XM\_}$label>". The exchange key $K_{XM}$ to be applied to the content encrypting is reliably learned even if the source device performs a plurality of move transfer processes at a time.

In another method having the same advantage as the operational sequence of FIG. 31, the sink device is reliably associated with the exchange key $K_{XM}$ by making unique the socket information sent to the sink device when a plurality of move transfer processes are performed. In this case, the sink device may transmit a post response not accompanied by the MOVE.dtcp.com (or BLKMOVE.com) header may be transmitted prior to the end of the AKE procedure. Subsequent to the post response, the content transfer may be transmitted as a post request prior to the AKE procedure rather than a new pose request.

The notification method of the socket information is applicable to not only the upload move transfer but also to an upload copy transfer.

Figure 32A:
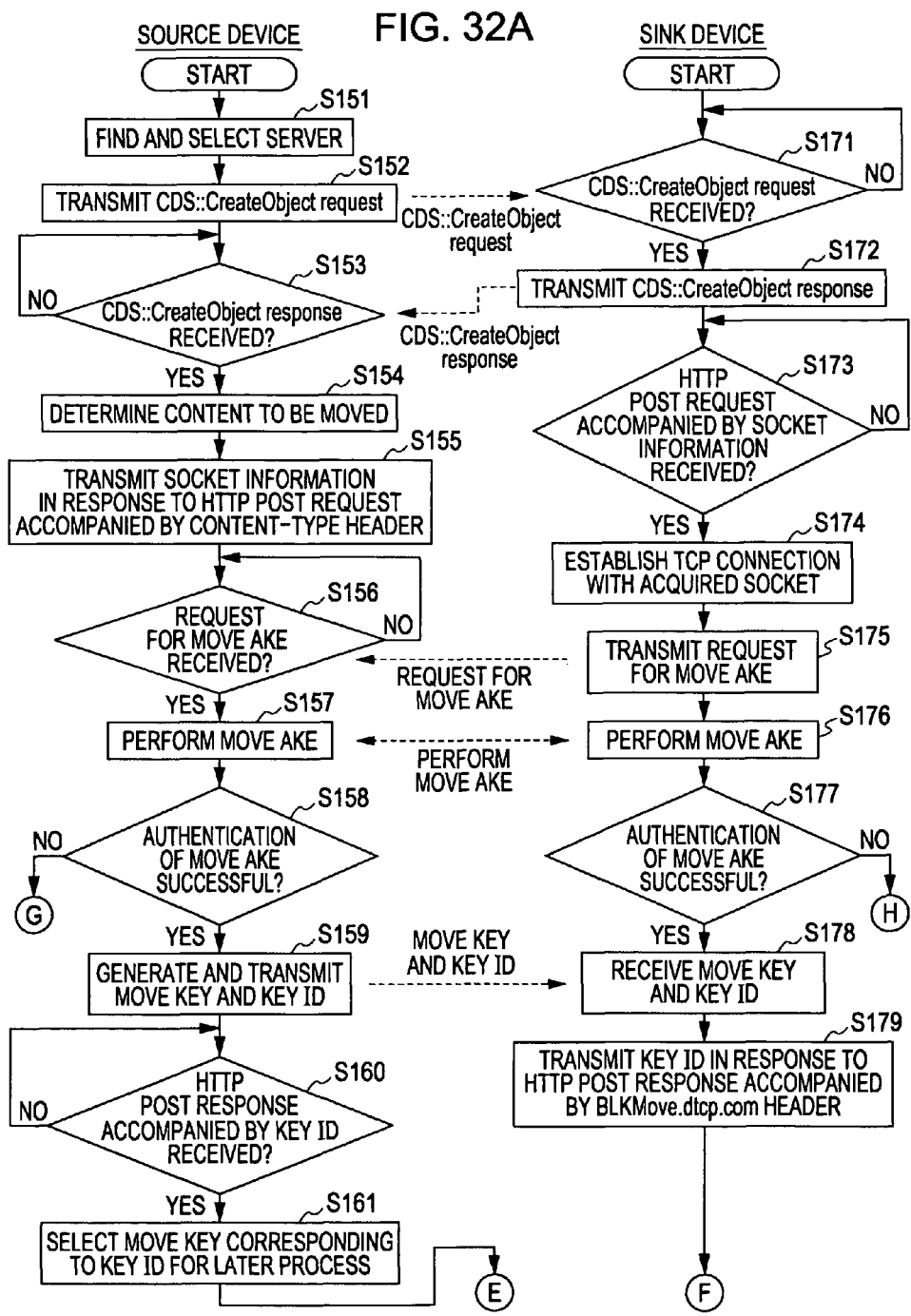
FIG. 32A is a flowchart illustrating a process performed by each of the source device and the sink device when the source device transmits the content to the sink device in the upload move transfer.

FIGS. 32A and 32B are flowcharts of a process of each of the source device and the sink device when the source device operating as an HTTP client moves content in an upload fashion to the sink device operating as an HTTP server in the operational sequence of FIG. 31.

Upon detecting a sink device operating as a server as a content upload destination (step S151), the source device transmits a CDS::CreateObject request to the sink device to request the sink device to create a storage location of the content (step S152). The source device then waits on standby for a response from the sink device (step S153).

Upon receiving the CDS::CreateObject request from the source device (step S171), the sink device returns the response in reply to the request (step S172).

When the CDS::CreateObject request is received from the sink device, the source device determines content to be moved (step S154). After transmitting to the sink device the socket information in the HTTP post request accompanied by the content-type header (step S155), the source device waits on standby for a move AKE request (step S156).

Upon receiving the HTTP post request associated with the socket information from the source device (step S173), the sink device establishes the TCP/IP connection with a socket acquired from the request (step S174), and requests the source device to perform the move AKE process (step S175).

The move AKE procedure starts between the source device and the sink device. The source device and the sink device thus mutually performs the move AKE process with each other (steps S157 and S176). If the move AKE process has been successfully completed (steps S158 and S177), the source device generates and transmits a move key and a key ID to the sink device (step S159). If the move AKE process is unsuccessful between the source device and the sink device, each of the source device and the sink device skips subsequent steps thereof, and ends the routine.

Upon receiving the move key and the key ID from the source device (yes in step S178), the sink-device transmits the key ID in the HTTP post response accompanied by the BLK-MOVE.dtcp.com header (step S179).

The source device receives the HTTP post response accompanied by the key ID from the sink device (yes in step S160), and selects the move key corresponding to the key ID to be used in subsequent processes (step S161).

The source device sets a "move in progress" flag in the content to be upload to the sink device (step S162), encrypts the content with the move key, and transmits the encrypted content as a message body of the HTTP post request accompanied by the socket information (step S163). When the "move in progress" flag is set, the content is locked. The source device waits on standby for the HTTP post response from the sink device (step S164).

The sink device completes the move AKE process, and waits on standby for the encrypted content as the message body in the HTTP post request from the source device (step S181). Upon acquiring the encrypted content through receiving the request, the sink device returns the HTTP post response (step S182).

If the encrypted content has been successfully uploaded from the source device to the sink device, the source device waits on standby for the reception of a move finalizing request (step S165). The sink device transmits to the source device the request for the move finalizing process (step S183). The source device and the sink device respectively perform the move finalizing process (steps S166 and S184). The source device validates the content while the source device invalidates the original content. The operational sequence of the move finalizing process between the source device and the sink device has already been discussed with reference to FIGS. 11 and 18.

When the source device and the sink device terminate the move finalizing process (steps S166 and S185), the source device and the sink device destroy the move key and the key ID thereof (steps S167 and S186) and end the routine.

Even if the entity of the content has been successfully uploaded from the source device to the sink device, the finalizing process of the move transfer may be interrupted due to a power failure in one of the devices, for example. The interruption of the finalizing process can make it difficult for the source device and the sink device to use the moved content. If the move finalizing process is interrupted, the finalizing process may resume in accordance with the procedures of FIG. 19 through 20 so that the content is prevented from being invalidated at both the source device and the sink device.

In order to enable the resumption of the finalizing process of the upload move transfer, each of the source device and the sink device stores data required to resume the finalizing process using a non-volatile memory such as NVRAM when the finalizing process of the upload move transfer starts. The sink device stores the parameter ($K_{XM\_}$label) for use in CMD1 namely MV_FINALIZE command and MAC6A in a non-volatile fashion.

When waiting for commitment information subsequent to interruption, the source device notifies the corresponding sink device of the socket information and prompts the sink device to resume the finalizing process. In the commitment process, the source device stores, in a non-volatile fashion, UUID required to detect the sink device, the object ID required to detect the post destination URI, $K_{XM\_}$label as the key ID, and MAC5B and MAC6B. The resuming process is initiated by the sink device in principle.

In the above-described method, the source device transmits to the sink device the HTTP post request having the socket information (DTCP socket Info) written on the header thereof. This method is different from the method of notifying the sink device of the socket information using the CDS:: CreateObject in that the sink device can acquire the socket information relating to the content to be moved without any problems even when the move transfer process is resumed after interruption.

FIG. 33 is a flowchart of a process that is performed between the source device and the sink device to establish the TCP/IP connection when the move finalizing process is resumed.

The source device selects one UUID from among IDs stored in a non-volatile fashion (step S191), and then checks whether any device (sink device) having the same UUID is present using device finding protocol of UPnP (step S192). When the sink device having the same UUID as the one stored in a non-volatile fashion is detected, the source device transmits to the sink device the CDS::Browse request with the OjbectID specified therewithin (step S193).

Upon receiving the CDS::Browse request from the source device (step S201), the sink device returns a CDS::Browse response (step S202).

Upon receiving the CDS::Browse response from the sink device (yes in step S194), the source device acquires res@importUri as a transfer destination of the socket information from the response (step S195). The source device transmits to the sink device the HTTP post request having the Content-Type header containing the socket information therewithin (step S196).

The sink device receives the HTTP post request containing the socket information from the source device (step S203), references the socket information contained in the request, and then establishes a TCP/IP connection for communication of the AKE command with the source device (step S204). Using the TCP/IP connection, the move transfer finalizing process is resumed in accordance with the sequences of FIGS. 19 through 21 subsequent to interruption.

Regardless of whether the content is moved in a download fashion or an upload fashion, the sink device can cancel or abort the move transfer process if processing is still prior to the transmission of the move finalizing command CMD1.

The source device and the sink device can cancel the move process by transmitting a MV-CANCEL subfunction to each other.

In accordance with the present embodiment, the canceling of the move process is arranged to be executed as part of the AKE process. The TCP/IP connection for the AKE process is established in response to a trigger from the sink device. In the normal content transfer for content streaming and content copying, the TCP/IP connection for authentication and key exchange is disconnected once the key is shared in AKE. However, the TCP/IP connection for authentication and key exchange needs to be maintained to permit the MV-CANCEL subfunction from the source device during the move process.

When transmitting or receiving the MV-CANCEL subfunction prior to the start of the move finalizing process, the source device terminates the move process, unlocks the content to be moved (more specifically, setting the content to off state in Table 2), and opens the content for accepting another move request. Along with the end of the move process, the source device destroys the exchange key $K_{XM}$. The source device hereinafter rejects a request relating to the terminated move process from the sink device.

When transmitting or receiving the MV-CANCEL subfunction prior to the start of the move finalizing process, the sink device terminates the move process and deletes the content moved thereto. Along with the end of the move process, the sink device destroys the exchange key $K_{XM}$.

If communication is interrupted between the source device and the sink device prior to the start of the move finalizing process, each of the source device and the sink device aborts the move process. In this case, each of the source device and the sink device operates in the same way as when each of the source device and the sink device transmits or receives the MV-CANCEL.

Figure 22:
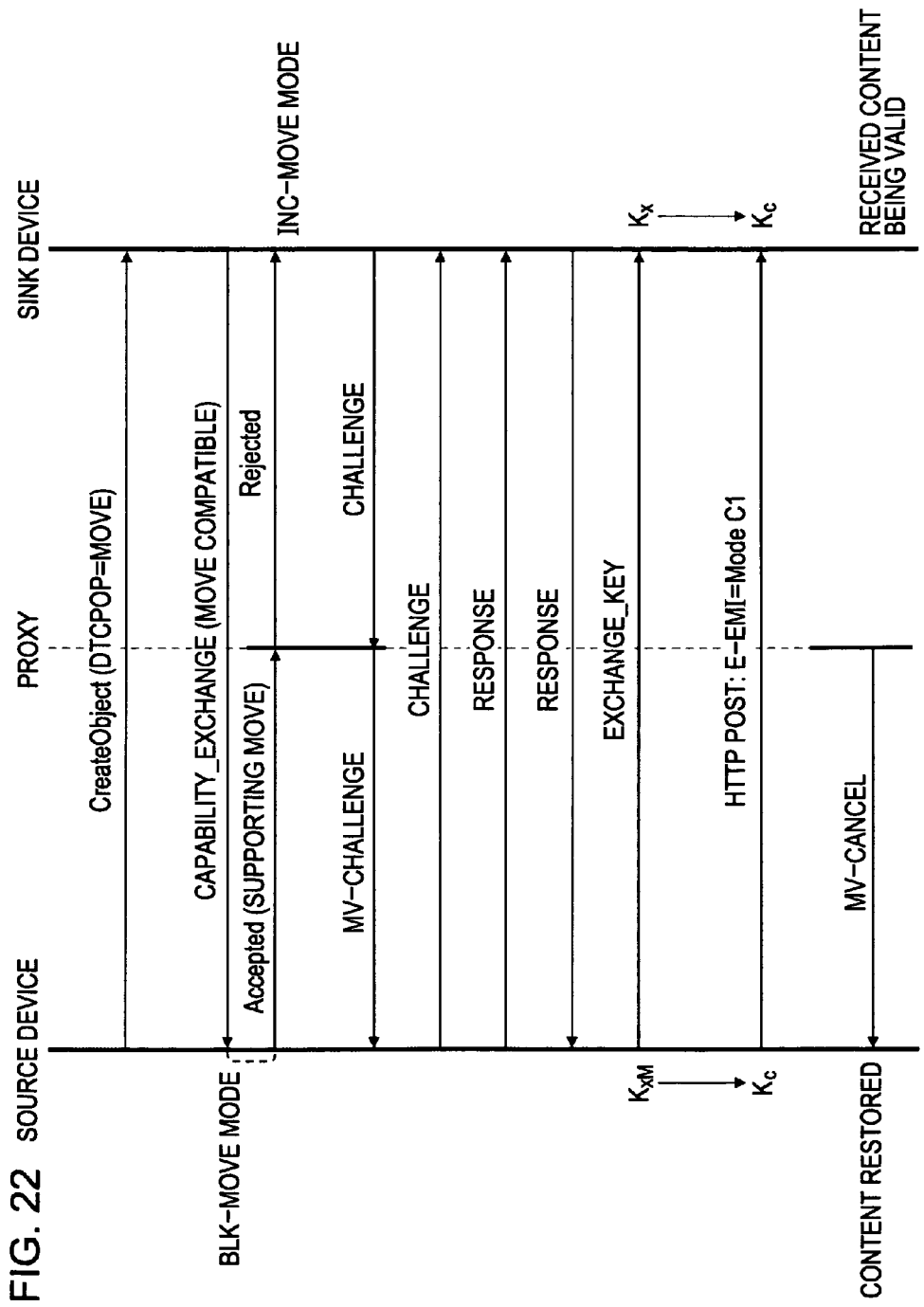
FIG. 22 illustrates an operational sequence in which a move mode spoofing attack is mounted on the sink device.

In accordance with DTCP-IP, communication data can be easily altered in an unauthorized manner by setting up an unauthorized proxy composed of a personal computer over a transmission path between the source device and the sink device. In a system, the block move is initiated subsequent to the capability verification (see FIGS. 16 and 17) between the source device and the sink device. If the implementation of the verification is not required in such a system, the proxy can spoof, to the sink device, that the source device does not support the block move although the source device actually supports the block move, and can cause the sink device to perform the incremental move. In the operational sequence of FIG. 22, the proxy transmits to the source device a CAPABILITY_EXCHANGE message, as is, from the sink device stating that the sink device supports the block move, but spoofs a CAPABILITY_EXCHANGE message from the source device stating that the source device does not support the block move. The proxy rejects the block move request and spoofs that the source device does not support the block move. Although the source device performs the content transfer process in the block move mode in response to the request from the sink device, the sink device performs a content reception process with the mode switched to the incremental move mode.

If such a move mode spoofing attack is mounted, the sink device validates data each time the data is received from the source device. When the content transfer process ends, the proxy cancels the content transfer process to the source device. This permits the same valid content to be present both the source device and the sink device in duplication, and violates the rule of DTCP-IP specification.

The move mode at the sink device may be spoofed by tampering the device capability between the source device and the sink device or the content may be copied by spoofing a move transfer with any means. The content transfer system of one embodiment of the present invention incorporates several methods to control such spoofing.

For example, the proxy might tamper with the CAPABILITY_EXCHANGE message from the source device, and reject the block move request, thereby spoofing that the source device cannot support the block move. In such a case, in the subsequent AKE process, the sink device notifies the source device of the set move mode. The source device checks the notified mode against the move mode thereof determined through the capability verification process. The source device can thus detect spoofing. In the source and content selection step of FIG. 8, and the sink and content selection step FIG. 12, the source device causes the sink device to understand correctly that the content move is to be performed so that a copy transfer may not be performed in error.

Figure 23:
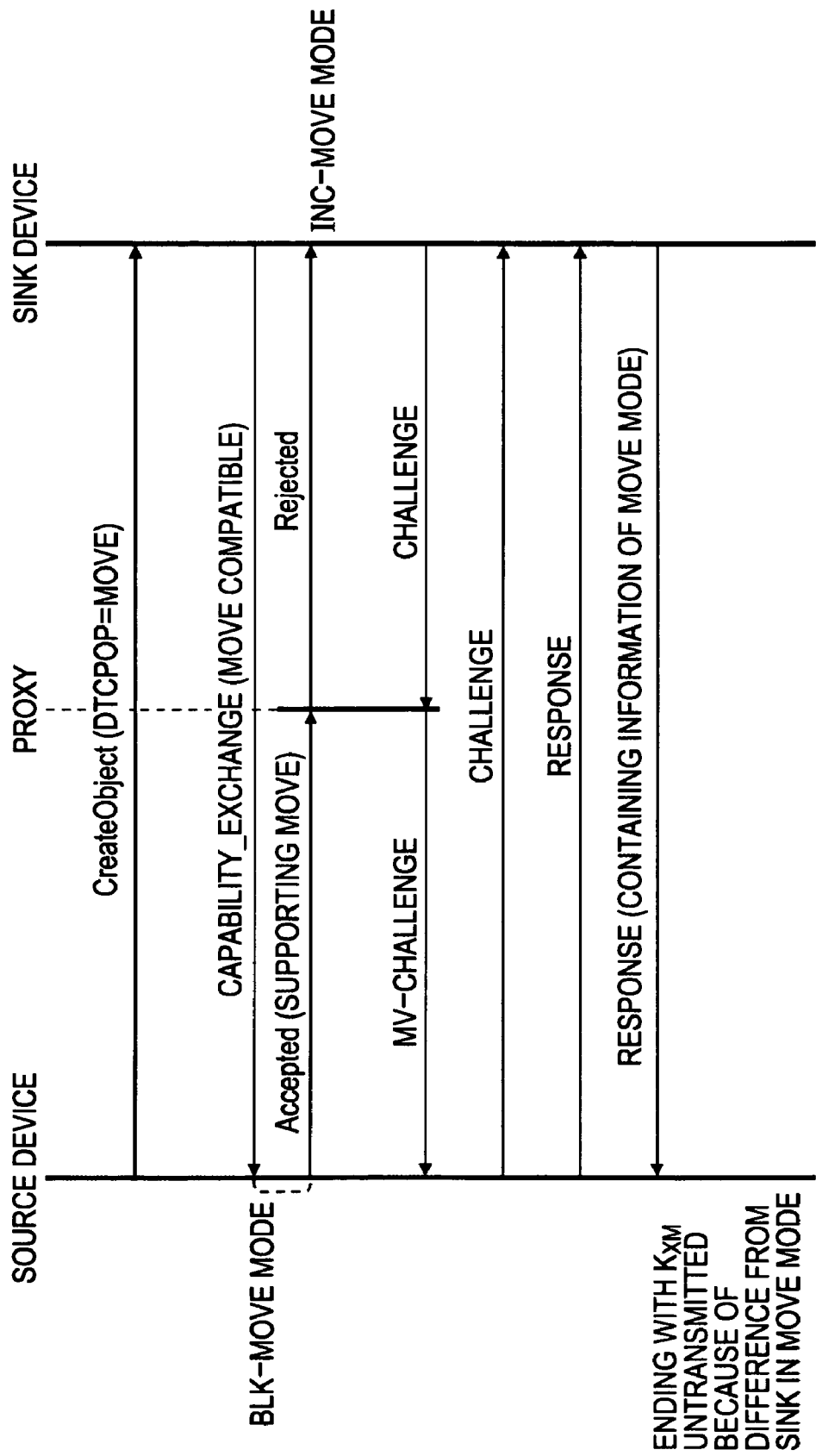
FIG. 23 illustrates an operational sequence that takes a preventive step against a move mode spoofing attack.

In the operational sequence of FIG. 23, the sink device includes information, relating to the operation mode thereof, in the response to be transmitted to the source device using the challenge-response step performed in the AKE authentication procedure. Preferably, information protected by signature includes information relating to move mode. The mode is different from the block mode set by the source device after receiving the response. The source device having received the response can thus notice that the move mode is spoofed and that a transfer path between the source device and the sink device is exposed to risk. The source device does not transmit the exchange key $K_x$ to the sink device, and terminates the move process without starting the content transfer via such a spoofed network.

Figure 24:
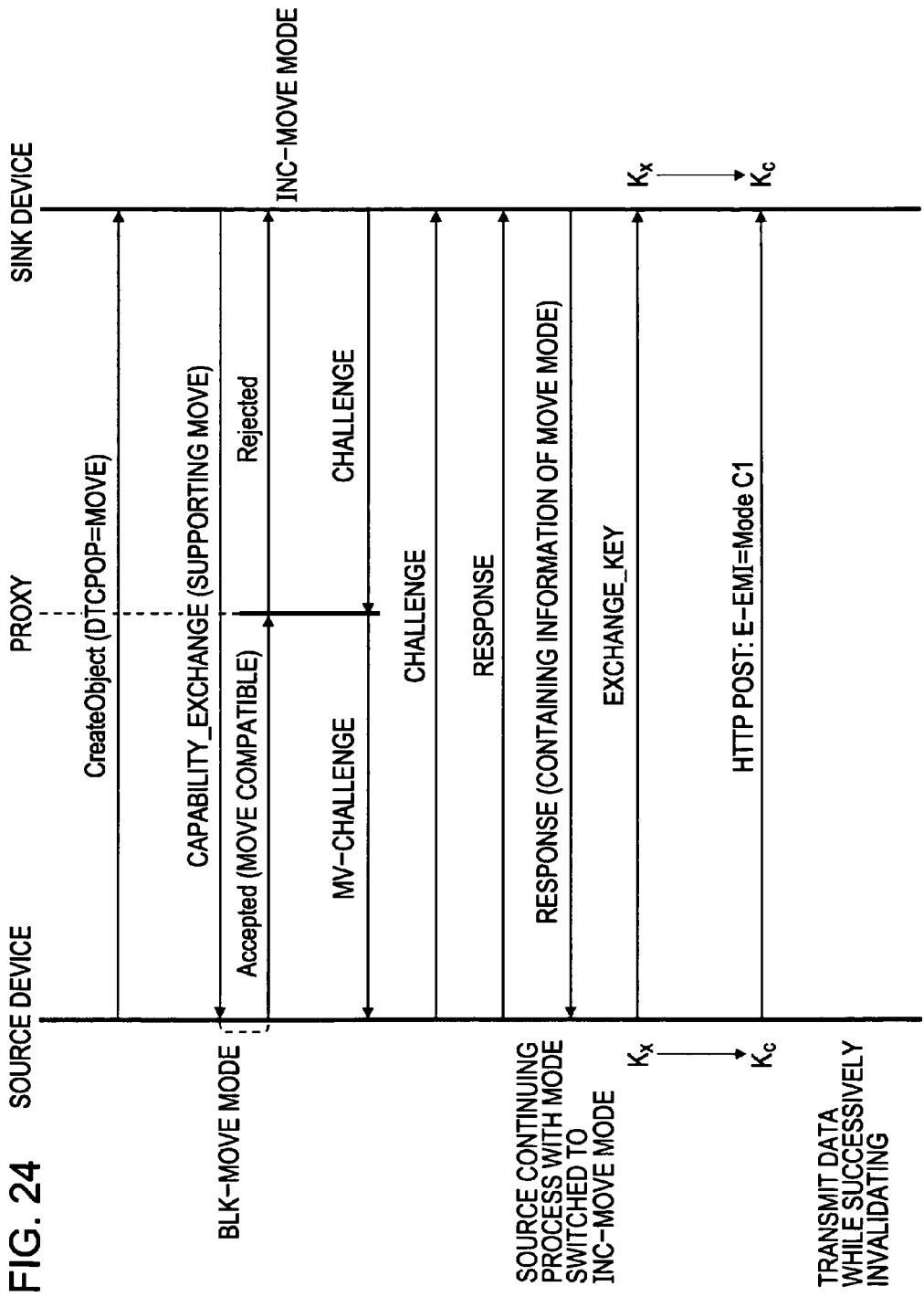
FIG. 24 illustrates an operational sequence that takes a preventive step against a move mode spoofing attack.

FIG. 24 illustrates an operational sequence modified from the operational sequence of FIG. 23. In the operational sequence of FIG. 24, the sink device includes information, relating to the move mode, in information protected by signature in the response to be transmitted to the source device in the AKE authentication process. The source device having received the response notices that the move mode is spoofed because the move mode in the response is different from the block move mode set thereby. The source device switches from the block mode to the incremental mode, thereby transmitting the exchange key $K_x$ to the sink device. The source device and the sink device generate the content encrypting key $K_C$ by performing a predetermined calculation on the exchange key $K_x$, and then starts transmitting the encrypted content to be moved.

Figure 25:
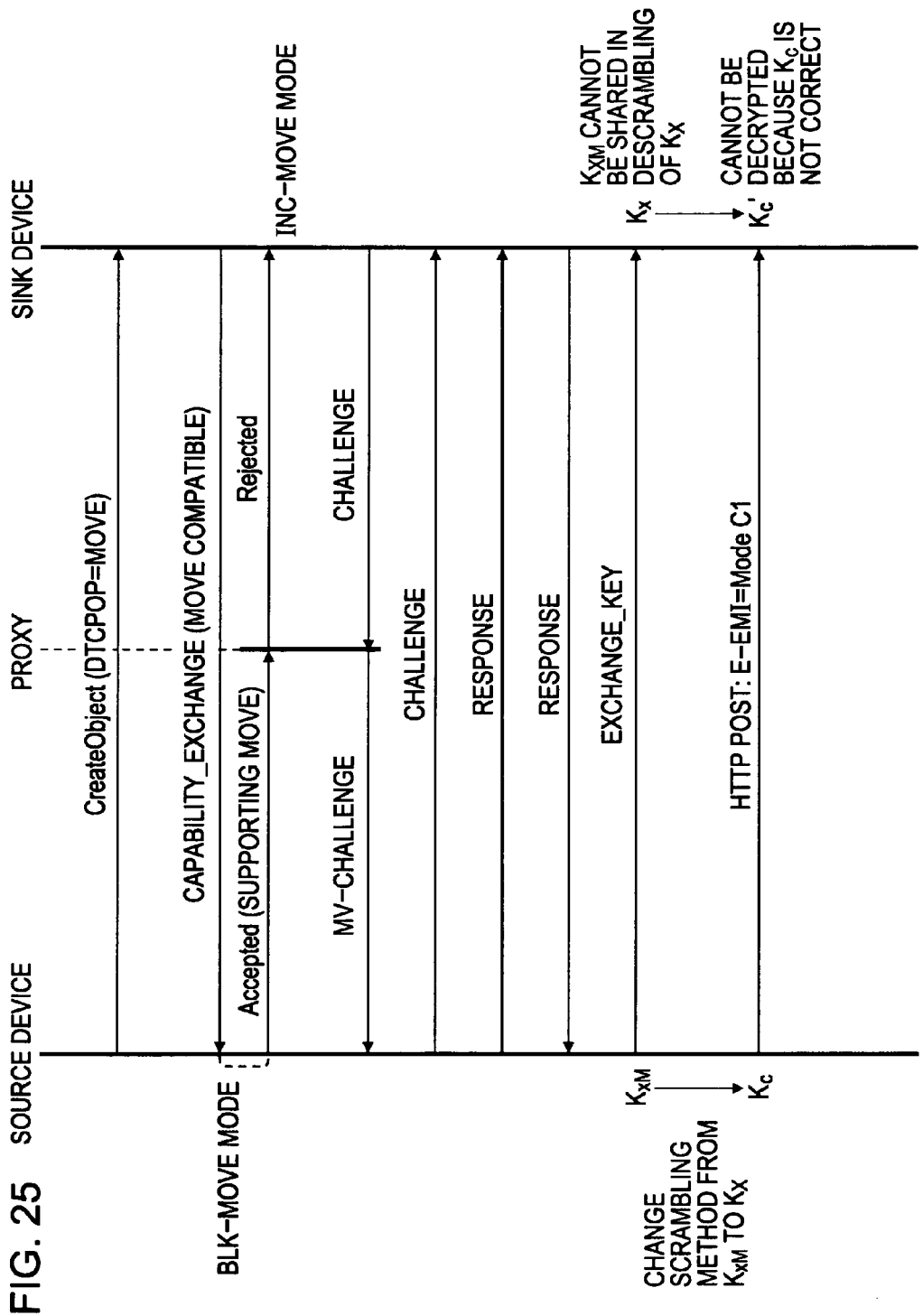
FIG. 25 illustrates an operational sequence that takes a preventive step against a move mode spoofing attack.

To prevent the move mode from being spoofed, another method is available in which the method of scrambling the exchange key $K_x$ is changed from move mode to move mode. FIG. 25 illustrates an operational sequence in such a method. In the block move, the source device processes a one-time key for use in scrambling the exchange key $K_x$ with a hash function. The sink device in the incremental move mode cannot share the exchange key $K_{XM}$ for block move in the descrambling method of the exchange key $K_x$. More specifically, since the descrambling of the exchange key $K_x$ is inhibited in a mode other than the block mode, the sink device cannot produce a correct content encrypting key $K_C$ and cannot decrypt the moved content.

Figure 26:
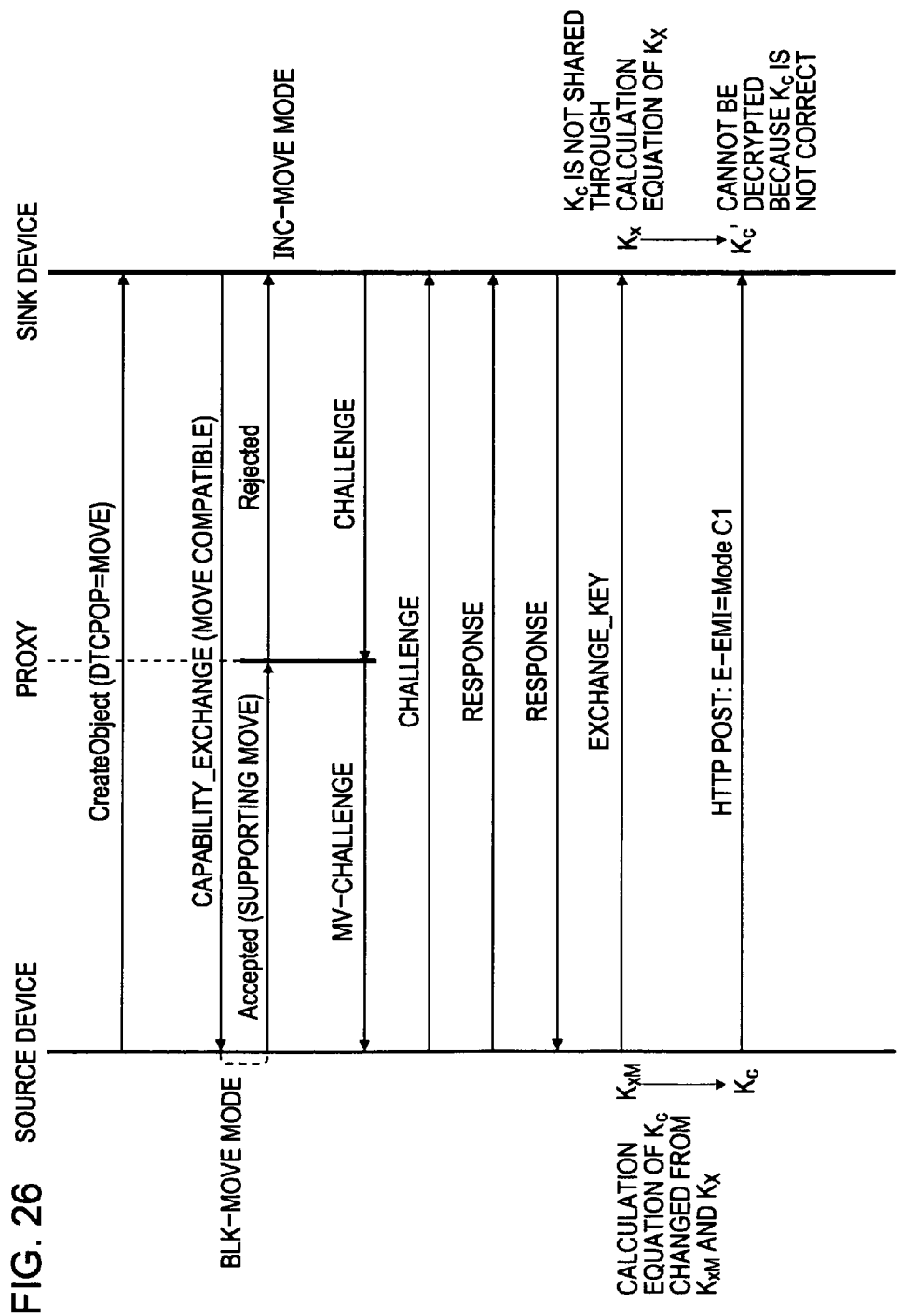
FIG. 26 illustrates an operational sequence that takes a preventive step against a move mode spoofing attack.

To prevent the move mode from being spoofed, a further method is available in which calculation equation for generating the content encrypting key $K_C$ from the exchange key $K_x$ is changed from move mode to mode. FIG. 26 illustrates an operational sequence in such a method. To perform the block move, the source device changes, to a particular value, a constant contained in the equation for generating the content encrypting key $K_C$ from the exchange key $K_x$. The sink device in the incremental move mode attempts to calculate from the exchange key $K_x$ in accordance with a standard calculation equation but cannot generate the correct content encrypting key $K_C$ (in other words, the calculation of the content encrypting key $K_C$ from the exchange key $K_{XM}$ is inhibited). The sink device cannot decrypt the moved content.

Each of the above methods prevents the content transfer system from violating the rule of DTCP-IP that requires that the same content shall not be present at both the source device and the sink device in duplication even if an unauthorized proxy is present over a transfer path.

FIG. 16 illustrates the CAPABILITY_EXCHANGE sequence protecting the system from a move transfer mode spoofing attack. The sequences of FIGS. 23 through 26 may also protect the system from a move transfer mode spoofing attack. In such cases, any secure information exchange procedure using the CAPABILITY_EXCHANGE sequence is not necessary.

It should be understood by those skilled in the art that various modifications, combinations, sub-combinations and alterations may occur depending on design requirements and other factors insofar as they are within the scope of the appended claims or the equivalents thereof.

What is claimed is:

1. A content transfer system for transferring content between a source device transmitting the content and a sink device receiving the content, comprising:
 a processor;
 a content specifying unit for specifying the content to be transferred between the source device and the sink device;
 an authentication unit for performing an authentication exchange key process between the source device and the sink device;
 a content transfer unit for performing a content transfer process by encrypting and transferring the content specified by the content specifying unit from the source device to the sink device using a key exchanged by the authentication unit;
 a content transfer finalizing unit for performing a content transfer finalizing process by validating the content at the sink device and invalidating the specified content at the source device in response to the end of the content transfer process performed by the content transfer unit, the content thus being moved from the source device to the sink device; and
 a content transfer finalizing process resuming unit for using the processor to resume the content transfer finalizing process when the process performed by the content transfer finalizing-unit is interrupted, wherein:
  the content transfer finalizing process resuming unit shifts a state of the specified content at the source device to an interim invalid state, the interim invalid state indicating that the specified content is temporarily unusable by the source device; and
  the content transfer finalizing process resuming unit resumes the content transfer finalizing process regardless of a successful ending of the content transfer process performed by the content transfer unit to encrypt and transfer specified content from the source device to the sink device by using the exchanged key.

2. The content transfer system according to claim 1, wherein together with the authentication and key exchange process, the authentication unit verifies a capability of each of the source device and the sink device as to whether both the source device and the sink device comply with the finalizing process of the content transfer finalizing unit.

3. The content transfer system according to claim 1, wherein:
 the content specifying unit specifies the content using a content directory service (CDS) defined by universal play and plug (UPnP) standards; and
 the authentication unit, the content transfer unit, and the content transfer finalizing unit perform the respective processes thereof using digital transmission content protection-Internet protocol (DTCP-IP).

4. The content transfer system according to claim 3, wherein the content is moved when the sink device operated by a user transfers the content in a download fashion from the source device functioning as a server providing the content.

5. The content transfer system according to claim 4, wherein the content specifying unit at the sink device acquires socket information for authentication and key exchange of the content to be moved based on information contained in a CDS::Browse response supplied from the source device in response to a CDS::Browse request and determines whether the content is movable from the source device.

6. The content transfer system according to claim 4, wherein the content transfer unit at the sink device acquires the encrypted content from the source device using a hyper text transfer protocol (HTTP) get method with a header containing header information indicating movement of the content.

7. The content transfer system according to claim 1, wherein the source device operated by a user transfers the content in an upload fashion to the sink device operating as a server providing the content, thereby moving the content.

8. The content transfer system according to claim 7, wherein:
   the content specifying unit at the source device requests the sink device to produce a destination location of the content using a CDS::CreateObject request, and receives a uniform resource identifier (URI) as a reply from the sink device in response to the request; and
   the content transfer unit transmits the encrypted content from the source device to the URI received as the destination location of the content using a hyper text transfer protocol (HTTP) post method.

9. The content transfer system according to claim 8, wherein:
   the content specifying unit at the source device notifies the sink device of socket information for authentication and key exchange using the CDS::CreateObject request; and
   the authentication unit allows the sink device to establish a transmission control protocol (TCP) connection for authentication and key exchange based on the socket information.

10. The content transfer system according to claim 8, wherein:
    the content specifying unit at the source device notifies the URI of the content movement destination at the sink device, received in response to the CDS::CreateObject request, of socket information for authentication and key exchange using header information of the HTTP post method (containing no content); and
    the authentication unit allows the sink device to establish a TCP connection for authentication and key exchange based on the socket information.

11. The content transfer system according to claim 7, wherein the content transfer unit at the source device transmits to the sink device the encrypted content using a hyper text transfer protocol (HTTP) post method with a header containing header information indicating movement of the content.

12. The content transfer system according to claim 2, wherein the authentication unit exchanges a key dedicated to content movement in accordance with an authentication and key exchange (AKE) procedure on a per content basis of each content to be moved.

13. The content transfer system according to claim 12, wherein the authentication unit destroys the exchange key dedicated to content movement at the source device and the sink device in response to the end of the content transfer finalizing process of the content transfer finalizing unit.

14. The content transfer system according to claim 1, wherein while the content is being moved to the sink device, the source device rejects another sink device's request to move the content.

15. The content transfer system according to claim 1, wherein the sink device comprises reproducing unit for reproducing content that is being moved from the source device but not yet validated.

16. The content transfer system according to claim 2, further comprising:
    a content transfer canceling unit for canceling the content transfer process using a transmission control protocol (TCP) connection for authentication and key exchange in response to a request from at least one of the sink device and the source device before the content transfer unit completes the content transfer process, wherein the authentication unit stores the TCP connection for authentication and key exchange until the content transfer unit ends the content transfer process.

17. The content transfer system according to claim 16, wherein the content transfer canceling unit invalidates the content transmitted to the sink device when canceling the content transfer process.

18. The content transfer system according to claim 1, further comprising:
    a content transfer process aborting unit for aborting the content transfer process in response to a request from at least one of the sink device and the source device when communication is interrupted between the sink device and the source device before the content transfer unit completes the content transfer process.

19. The content transfer system according to claim 1, wherein the content transfer finalizing unit:
    shifts the specified content at the source device to an interim invalid state in response to a transmission of a first command indicating the end of content reception from the sink device to the source device;
    validates the content, transmitted to the sink device, in response to a first response replied from the source device in response to the first command transmitted from the sink device, and destroys a key dedicated to content movement and information transmitted in the first command, each stored on the sink device; and
    invalidates the specified content at the source device in response to a second command, transmitted from the sink device to the source device, the second command indicating validation of the content, and destroys the key dedicated to content movement and information in the first response, each stored on the source device.

20. The content transfer system according to claim 1, wherein the content transfer finalizing process resuming unit shifts the specified content at the source device to the interim invalid state and returns a first response from the source device to the sink device in response to a first command when the source device stores the exchange key dedicated to content movement and the information transmitted in the first response when the source device receives the first command indicating the end of the content reception from the sink device.

21. The content transfer system according to claim 1, wherein the content transfer finalizing process resuming unit invalidates the specified content at the source device, destroys the key dedicated to the content movement and the information transmitted in a first response, stored on the source device, and returns a second response from the source device to the sink device in response to a second command, when the source device stores the exchange key dedicated to content movement and the information transmitted in the first response when the source device receives the second command indicating the end of the content reception from the sink device.

22. The content transfer system according to claim 1, wherein the content transfer finalizing process resuming unit establishes a connection to the source device as a source device of content when the sink device stores the exchange key dedicated to the content movement and the information transmitted in a first command, transmits the first command to the source device when the corresponding content is in an invalid state at the sink device, and transmits a second command when the corresponding content is already validated at the sink device.

23. The content transfer system according to claim 1, wherein the content transfer finalizing process resuming unit comprises a unit for establishing a connection between the sink device and the source device to resume the content transfer finalizing process.

24. The content transfer system according to claim 23, wherein when the content transfer finalizing process in a download fashion is resumed, the content transfer finalizing process resuming unit at the sink device acquires socket information for authentication and key exchange based on information contained in a CDS::Browse response from the source device responsive to a CDS::Browse request, thereby establishing a connection with the source device.

25. The content transfer system according to claim 23, wherein when the content transfer finalizing process in an upload fashion is resumed, the content transfer finalizing process resuming unit at the source device notifies the sink device of socket information for authentication and key exchange (containing no content) using an HTTP post method, thereby establishing a connection with the sink device.

26. The content transfer system according to claim 1, further comprising:
an anti-spoofing unit for preventing a move transfer acknowledged by the authentication unit between the source device and the sink device from being spoofed.

27. The content transfer system according to claim 26, wherein the anti-spoofing unit changes, from content transfer method to content transfer method, the method of generating a content encrypting key from the key exchanged by the authentication unit.

28. The content transfer system according to claim 26, wherein the anti-spoofing unit changes, from content transfer method to content transfer method, the method of scrambling the key exchanged by the authentication unit.

29. The content transfer system according to claim 26, wherein the anti-spoofing unit includes information, relating to a content transfer method, in a communication message from the sink device to the source device in a challenge-response procedure for authentication and key exchange.

30. A content transfer device functioning as a source device transmitting content in accordance with digital content transmission protection (DTCP) specification, comprising:
a processor;
a content specifying unit for specifying the content to be transmitted to a sink device;
an authentication unit for performing an authentication and key exchange (AKE) process with the sink device in accordance with an AKE procedure;
a content transfer unit for performing a content transfer process by encrypting and transferring the content specified by the content specifying unit to the sink device using a key exchanged by the authentication unit;
a content transfer finalizing unit for performing a content transfer finalizing process by invalidating specified content in response to the end of the content transfer process of the content transfer unit, the content thus being moved to the sink device; and
a content transfer finalizing process resuming unit for using the processor to resume the content transfer finalizing process when the process performed by the content transfer finalizing unit is interrupted, wherein:
the content transfer finalizing process resuming unit resumes the content transfer finalizing process regardless of a successful ending of the content transfer performed by the content transfer unit to encrypt and transfer specified content to the sink device by using the exchanged key; and
a state of the specified content at the source device is shifted to an interim invalid state, the interim invalid state indicating that the specified content is temporarily unusable by the source device.

31. The content transfer device according to claim 30, wherein together with the authentication and key exchange process, the authentication unit verifies a capability as to whether the sink device supports the content transfer finalizing unit.

32. The content transfer device according to claim 30, wherein:
when the source device operating as a server providing the content downloads the content to the sink device in response to a user operation at the sink device, the content specifying unit returns a CDS::Browse response describing socket information for authentication and key exchange of each content and describing whether the content is movable from the source device, in response to a CDS::Browse request from the sink device; and
the content transfer unit transmits the encrypted content using a hyper text transfer protocol (HTTP) get method with a header containing header information indicating movement of the content.

33. The content transfer device according to claim 30, wherein:
when the source device transfers the content in an upload fashion to the sink device in response to a user operation with the sink device operating as a server providing the content, the content specifying unit requests the sink device to create a destination location of the content using a CDS:: CreateObject request, and receives a uniform resource identifier (URI) as a reply from the sink device in response to the request; and
the content transfer unit transmits the encrypted content to the URI received as the destination location of the content using a hyper text transfer protocol (HTTP) post method with a header containing header information indicating movement of the content.

34. The content transfer device according to claim 33, wherein:
the content specifying unit notifies the sink device of socket information for authentication and key exchange using the CDS::CreateObject request; and
the authentication unit allows the sink device to establish a transmission control protocol (TCP) connection for authentication and key exchange based on the socket information.

35. The content transfer device according to claim 33, wherein:
the content specifying unit notifies the URI of the content movement destination at the sink device, received in response to the CDS::CreateObject request, of socket information for authentication and the key exchange (containing no content) using the header information of the hyper text transfer protocol (HTTP) post method (containing no content); and
the authentication unit allows the sink device to establish a transmission control protocol (TCP) connection for authentication and key exchange using the HTTP post method based on the socket information.

36. The content transfer device according to claim 30, wherein the authentication unit exchanges a key dedicated to content movement using an authentication and key exchange (AKE) procedure on a per content basis of each content moved to the sink device.

37. The content transfer device according to claim 30, wherein the authentication unit destroys the exchange key dedicated to content movement in response to the end of the content transfer process of the content transfer unit.

38. The content transfer device according to claim 30, wherein while the content is being moved to the sink device, the content transfer unit rejects a request of another source device to move the content.

39. The content transfer device according to claim 30, further comprising:
a content transfer canceling unit for canceling the content transfer process using a transmission control protocol (TCP) connection for authentication and key exchange before the content transfer unit completes the content transfer process, wherein the authentication unit stores the TCP connection for authentication and key exchange until the content transfer unit ends the content transfer process.

40. The content transfer device according to claim 30, further comprising:
a content transfer process aborting unit for aborting the content transfer process when communication is interrupted between the sink device and the source device before the content transfer unit completes the content transfer process.

41. The content transfer device according to claim 30, wherein the content transfer finalizing unit shifts the specified content to an interim invalid state in response to a reception of a first command indicating the end of content reception from the sink device, returns to the sink device a first response in response to the first command, and invalidates the specified content at the source device in response to a second command indicating content validation from the sink device.

42. The content transfer device according to claim 30, wherein the content transfer finalizing process resuming unit shifts the specified content to the interim invalid state and returns a first response to the sink device in response to a first command when the authentication still unit stores the exchange key dedicated to content movement and the information transmitted in the first response when the source device receives the first command indicating the end of the content reception from the sink device.

43. The content transfer device according to claim 30, wherein the content transfer finalizing process resuming unit invalidates the specified content, destroys the key dedicated to content movement stored on the authentication unit, and returns to the sink device a second response in response to the second command when the authentication unit stores the exchange key dedicated to content movement and the information transmitted in a first response when the source device receives the second command indicating the end of the content reception from the sink device.

44. The content transfer device according to claim 30, wherein the content transfer finalizing process resuming unit comprises a unit for establishing a connection with the sink device to resume the content transfer finalizing process.

45. The content transfer device according to claim 44, wherein when the content transfer finalizing process in a download fashion is resumed, the content transfer finalizing process resuming unit returns a CDS::Browse response containing socket information for authentication and key exchange responsive to a CDS:: Browse request from the sink device, thereby establishing a connection with the sink device.

46. The content transfer device according to claim 44, wherein when the content transfer finalizing process in an upload fashion is resumed, the content transfer finalizing process resuming unit notifies the sink device of socket information for authentication and key exchange using an hyper text transmission protocol (HTTP) post method, thereby establishing a connection with the sink device.

47. The content transfer device according to claim 30, further comprising:
an anti-spoofing unit for preventing a move transfer to the sink device acknowledged by the authentication unit from being spoofed.

48. The content transfer device according to claim 47, wherein the anti-spoofing unit changes, from content transfer method to content transfer method of device capability, the method of generating a content encrypting key from the key exchanged by the authentication unit.

49. The content transfer device according to claim 47, wherein the anti-spoofing unit changes, from content transfer method to content transfer method, the method of scrambling the key exchanged by the authentication unit.

50. A content transfer device functioning as a sink device receiving content in accordance with digital transmission content protection (DTCP) specification, comprising:
a processor;
a content specifying unit for specifying with a source device the content to be transferred;
an authentication unit for performing an authentication and key exchange (AKE) process with the source device in accordance with an AKE procedure;
a content transfer unit for performing a content transfer process by encrypting and transferring the content specified by the content specifying unit from the source device using a key exchanged by the authentication unit;
a content transfer finalizing unit for performing a content transfer finalizing process by validating the received content in response to the end of the content transfer process of the content transfer unit, the content thus being moved from the source device; and
a content transfer finalizing process resuming unit for using the processor to resume the content transfer finalizing process when the process performed by the content transfer finalizing unit is interrupted, wherein:
the content transfer finalizing process resuming unit resumes the content transfer finalizing process regardless of a successful ending of the content transfer performed by the content transfer unit to encrypt and transfer specified content to the sink device by using the exchanged key; and
a state of the specified content at the source device is shifted to an interim invalid state, the interim invalid state indicating that the specified content is temporarily unusable by the source device.

51. The content transfer device according to claim 50, wherein together with the authentication and key exchange process, the authentication unit verifies a capability as to whether the sink device supports the content transfer finalizing unit.

52. The content transfer device according to claim 50, wherein:
when the sink device transfers the content in a download fashion from the source device operating as a server providing the content in response to a user operation, the content specifying unit transmits a CDS::Browse response, acquires socket information for authentication and key exchange of the content to be moved, based on information contained in a CDS::Browse response from the source device, and determines whether the content is movable from the source device; and the content transfer unit acquires the encrypted content using a hyper text transfer protocol (HTTP) get method with a header containing header information indicating movement of the content.

53. The content transfer device according to claim 50, wherein:

when the sink device operating as a server providing the content transfer the content in an upload fashion from the source device in response to a user operation at the source device, the content specifying unit creates a destination location of the content based on a CDS::CreateObject request received from the source device; and the content transfer unit receives the encrypted content using a hyper text transfer protocol (HTTP) post method with a header containing header information indicating movement of the content.

54. The content transfer device according to claim 50, wherein the authentication unit destroys the exchange key dedicated to content movement in response to the end of the content transfer process of the content transfer unit.

55. The content transfer device according to claim 50, further comprising:

a reproducing unit for reproducing content that is being moved from the source device but not yet validated.

56. The content transfer device according to claim 50, further comprising:

a content transfer canceling unit for canceling the content transfer process using a transmission control protocol (TCP) connection for authentication and key exchange before the content transfer unit completes the content transfer process.

57. The content transfer device according to claim 56, wherein the content transfer canceling unit invalidates the content transferred from the source device when canceling the content transfer process.

58. The content transfer device according to claim 50, further comprising:

a content transfer process aborting unit for aborting the content transfer process when communication with the source device is interrupted before the content transfer unit completes the content transfer process.

59. The content transfer device according to claim 50, wherein the content transfer finalizing unit transmits to the source device a first command indicating the end of content reception, validates the content transmitted to the sink device in response to a first response transmitted in response to the first command from the source device to the sink device, and destroys a key dedicated to content movement and information transmitted in the first command, stored on the authentication unit.

60. The content transfer device according to claim 50, wherein the content transfer finalizing process resuming unit establishes a connection with the source device when the authentication unit stores the exchange key dedicated to content movement and the information transmitted in a first command, transmits the first command to the source device when the corresponding content is in an invalid state, and transmits a second command when the corresponding content is validated at the sink device.

61. The content transfer device according to claim 50, wherein the content transfer finalizing process resuming unit comprises a unit for establishing a connection with the source device to resume the content transfer finalizing process.

62. The content transfer device according to claim 61, wherein when the content transfer finalizing process in a download fashion is resumed, the content transfer finalizing process resuming unit acquires socket information for authentication and key exchange based on information contained in a CDS::Browse response from the source device responsive to a CDS:: Browse request, thereby establishing a connection with the source device.

63. The content transfer device according to claim 61, wherein when the content transfer finalizing process in an upload fashion is resumed, the content transfer finalizing process resuming unit notifies the sink device of socket information for authentication and key exchange using an hyper text transmission protocol (HTTP) post method (containing no content), thereby establishing a connection with the source device.

64. The content transfer device according to claim 50, further comprising:

an anti-spoofing unit for preventing a move transfer from the source device acknowledged by the authentication unit from being spoofed.

65. The content transfer device according to claim 64, wherein the anti-spoofing unit includes information, relating to a content transfer method, in a communication message to the source device in a challenge-response procedure for authentication and key exchange.

66. A content transfer method of transmitting content from a DTCP source device including a processor executing the content transfer method, comprising steps of:

specifying the content to be transferred to a sink device;

performing an authentication and key exchange (AKE) process with the sink device in accordance with an AKE procedure;

performing a content transfer process by encrypting and transferring the specified content to the sink device using the exchanged key;

performing a content transfer finalizing process by invalidating the specified content in response to the end of the content transfer process, the content thus being moved to the sink device; and resuming the content transfer finalizing process when the finalizing process is interrupted, wherein the content transfer finalizing process is resumed regardless of a successful ending of the content transfer performed to encrypt and transfer specified content to the sink device by using the exchanged key, the resuming comprising:

shifting a state of the specified content at the source device to an interim invalid state, the interim invalid state indicating that the specified content is temporarily unusable by the source device.

67. A content transfer method of receiving content at a DTCP sink device including a processor executing the content transfer method, comprising steps of:

specifying with a source device the content to be transferred;

performing an authentication and key exchange (AKE) process with the source device in accordance with an AKE procedure;

performing a content transfer process by encrypting and transferring the specified content from the source device using the exchanged key;

performing a content transfer finalizing process by validating the received content in response to the end of the content transfer process, the content thus being moved from the source device; and resuming the content transfer finalizing process when the finalizing process is interrupted, wherein the resuming comprises:

resuming the content transfer finalizing process regardless of a successful ending of the content transfer performed to encrypt and transfer specified content to the sink device by using the exchanged key, wherein a state of the specified content at the source device is shifted to an interim invalid state, the interim invalid state indicating that the specified content is temporarily unusable by the source device.

68. A non-transitory computer readable program for causing a computer system as a DTCP source device to transmit content, comprising steps of:
- specifying the content to be transmitted to a sink device;
- performing an authentication and key exchange (AKE) process with the sink device in accordance with an AKE procedure;
- performing a content transfer process by encrypting and transferring the specified content to the sink device using the exchanged key;
- performing a content transfer finalizing process by invalidating the specified content in response to the end of the content transfer process, the content thus being moved to the sink device; and
- resuming the content transfer finalizing process when the finalizing process is interrupted, wherein the content transfer finalizing process is resumed regardless of a successful ending of the content transfer performed to encrypt and transfer specified content to the sink device by using the exchanged key,
- wherein a state of the specified content at the source device is shifted to an interim invalid state, the interim invalid state indicating that the specified content is temporarily unusable by the source device.

69. A non-transitory computer readable program for causing a computer system as a DTCP sink device to receive content, comprising steps of:
- specifying with a source device the content to be transferred;
- performing an authentication and key exchange (AKE) process with the source device in accordance with an AKE procedure;
- performing a content transfer process by encrypting and transferring the specified content from the source device using the exchanged key;
- performing a content transfer finalizing process by validating the received content in response to the end of the content transfer process, the content thus being moved from the source device; and
- resuming the content transfer finalizing process when the finalizing process is interrupted, wherein the content transfer finalizing process is resumed regardless of a successful ending of the content transfer performed to encrypt and transfer specified content to the sink device by using the exchanged key,
- wherein a state of the specified content at the source device is shifted to an interim invalid state, the interim invalid state indicating that the specified content is temporarily unusable by the source device.

70. A content transfer system for transferring content between a source device transmitting the content and a sink device receiving the content, comprising:
- a content specifying unit specifying the content to be transferred between the source device and the sink device;
- an authentication unit performing an authentication exchange key process between the source device and the sink device;
- a content transfer unit performing a content transfer process by encrypting and transferring the content specified by the content specifying unit from the source device to the sink device using a key exchanged by the authentication unit;
- a content transfer unit performing a content transfer process by encrypting and transferring the content specified by the content specifying unit from the source device to the sink device using a key exchanged by the authentication unit;
- a content transfer finalizing unit performing a content transfer finalizing process by validating the content at the sink device and invalidating the specified content at the source device in response to the end of the content transfer process performed by the content transfer unit, the content thus being moved from the source device to the sink device; and
- a content transfer resuming unit for using a processor to resume the content transfer finalizing process when the process performed by the content transfer finalizing unit is interrupted, wherein:
  - the content transfer resuming unit shifts a state of the specified content at the source device to an interim invalid state, the interim invalid state indicating that the specified content is temporarily unusable by the source device; and
  - the content transfer resuming unit resumes the content transfer finalizing process regardless of a successful ending of the content transfer performed by the content transfer unit to encrypt and transfer specified content from the source device to the sink device by using the exchanged key.

71. A content transfer device functioning as a source device transmitting content in accordance with DTCP, comprising:
- a content specifying unit specifying the content to be transmitted to a sink device;
- an authentication unit performing an authentication and key exchange process (AKE) with the sink device in accordance with an AKE procedure;
- a content transfer unit performing a content transfer process by encrypting and transferring the content specified by the content specifying unit to the sink device using a key exchanged by the authentication unit;
- a content transfer finalizing unit performing a content transfer finalizing process by invalidating the specified content in response to the end of the content transfer process of the content transfer unit, the content thus being moved to the sink device; and
- a content transfer resuming unit for resuming the content transfer finalizing process when the process performed by the content transfer finalizing unit is interrupted, wherein:
  - the content transfer resuming unit shifts a state of the specified content at the source device to an interim invalid state, the interim invalid state indicating that the specified content is temporarily unusable by the source device; and
  - the content transfer resuming unit resumes the content transfer finalizing process is resumed regardless of a successful ending of the content transfer performed by the content transfer unit to encrypt and transfer specified content from the source device to the sink device by using the exchanged key.

72. A content transfer device functioning as a sink device receiving content in accordance with DTCP, comprising:
- a content specifying unit specifying with a source device the content to be transferred;

an authentication unit performing an authentication and key exchange (AKE) process with the source device in accordance with an AKE procedure;

a content transfer unit performing a content transfer process by encrypting and transferring the content specified by the content specifying unit from the source device using a key exchanged by the authentication unit;

a content transfer finalizing unit performing a content transfer finalizing process by validating the received content in response to the end of the content transfer process of the content transfer unit, the content thus being moved from the sink device; and a content transfer resuming unit for using a processor to resume the content transfer finalizing process when the process performed by the content transfer finalizing unit is interrupted, wherein:

the content transfer resuming unit resumes the content transfer finalizing process regardless of a successful ending of the content transfer performed by the content transfer unit to encrypt and transfer specified content from the source device to the sink device by using the exchanged key; and a state of the specified content at the source device is shifted to an interim invalid state, the interim invalid state indicating that the specified content is temporarily unusable by the source device.

* * * * *